(12) United States Patent
Murphy

(10) Patent No.: US 12,185,727 B2
(45) Date of Patent: Jan. 7, 2025

(54) TEAR-OFF BAKING CONTAINER

(71) Applicant: INASTIR HOLDINGS, LLC, Oklahoma City, OK (US)

(72) Inventor: Michael Murphy, Oklahoma City, OK (US)

(73) Assignee: INASTIR HOLDINGS, LLC, Oklahoma City, OK (US)

( * ) Notice: Subject to any disclaimer, the term of this patent is extended or adjusted under 35 U.S.C. 154(b) by 822 days.

(21) Appl. No.: 17/264,592

(22) PCT Filed: Aug. 1, 2019

(86) PCT No.: PCT/US2019/044570
§ 371 (c)(1),
(2) Date: Jan. 29, 2021

(87) PCT Pub. No.: WO2020/028604
PCT Pub. Date: Feb. 6, 2020

(65) Prior Publication Data
US 2021/0227836 A1   Jul. 29, 2021

Related U.S. Application Data

(60) Provisional application No. 62/713,294, filed on Aug. 1, 2018.

(51) Int. Cl.
*B65D 85/36* (2006.01)
*A21B 3/13* (2006.01)
(Continued)

(52) U.S. Cl.
CPC ............. *A21B 3/131* (2013.01); *A21B 3/133* (2013.01); *A21B 3/135* (2013.01); *B65D 3/263* (2013.01);
(Continued)

(58) Field of Classification Search
CPC ......... A21B 3/131; A21B 3/133; A21B 3/135; B65D 3/263; B65D 3/265; B65D 3/267;
(Continued)

(56) References Cited

U.S. PATENT DOCUMENTS 1,774,019 A * 8/1930 Wah ................... A01G 23/02
47/73
1,811,566 A * 6/1931 Scott .................. A21B 3/131
249/141
(Continued)

FOREIGN PATENT DOCUMENTS

CA       2117167 A1    9/1995
DE    103 00 220 A1    7/2004
(Continued)

OTHER PUBLICATIONS

Preliminary Office Action issued Aug. 1, 2023, in corresponding Brazilian Patent Application BR 11 2021 001790-9, 2 pages.
(Continued)

*Primary Examiner* — King M Chu
(74) *Attorney, Agent, or Firm* — Oblon, McClelland, Maier & Neustadt, L.L.P.

(57) ABSTRACT

A baking container having one or more rupture lines for case of removal and separation from a baked foodstuff is described herein. The baking container has a sidewall and a planar bottom face. One or more rupture lines may run down a height of the sidewall and across a portion or all of the planar bottom face. Rupture lines having even spacing may form a strip, and the strip may have a pull tab to easily tear through the sidewall. The strip may be reinforced with a string or ribbon. The rupture lines may be formed by perforating or weakening areas of the baking container.

20 Claims, 33 Drawing Sheets

(51) Int. Cl.
    *B65D 3/26* (2006.01)
    *B65D 81/34* (2006.01)

(52) U.S. Cl.
    CPC .............. *B65D 3/265* (2013.01); *B65D 3/267* (2013.01); *B65D 81/343* (2013.01); *B65D 85/36* (2013.01); *B65D 2581/3405* (2013.01); *B65D 2585/36* (2013.01)

(58) Field of Classification Search
    CPC ................. B65D 81/343; B65D 85/36; B65D 2581/3405; B65D 2585/36; B65D 3/261; B65D 3/262; B65D 3/264; B65D 3/266; A21D 13/80
    USPC ....... 206/551; 220/573.1, 270, 4.24; 249/61, 249/DIG. 1
    See application file for complete search history.

(56) References Cited

U.S. PATENT DOCUMENTS

| | | | | |
|---|---|---|---|---|
| 2,594,307 | A | * | 4/1952 | Valenzuela ............ A01G 9/029 47/73 |
| 3,065,570 | A | * | 11/1962 | Fukuhara ................. A01G 9/02 47/73 |
| 3,580,484 | A | | 5/1971 | Schneider |
| 5,582,389 | A | * | 12/1996 | Greene ................... A21B 3/137 249/117 |
| 2002/0056716 | A1 | | 5/2002 | Banhagel |
| 2003/0209592 | A1 | | 11/2003 | Lawrence Holden |
| 2006/0068070 | A1 | | 3/2006 | Nichols et al. |
| 2008/0028678 | A1 | * | 2/2008 | Banhagel ................. A01G 9/02 47/73 |
| 2016/0073590 | A1 | * | 3/2016 | Brust ....................... A01G 9/02 47/66.7 |
| 2020/0367508 | A1 | | 11/2020 | Friedersdorf |

FOREIGN PATENT DOCUMENTS

| | | | |
|---|---|---|---|
| EP | 2 286 667 A2 | 2/2011 | |
| FR | 2 708 576 A1 | 2/1995 | |
| JP | 2-31872 U | 2/1990 | |
| JP | 3007322 U | 2/1995 | |
| JP | 2001-171676 A | 6/2001 | |
| JP | 2007-28940 A | 2/2007 | |
| JP | 2014-43256 A | 3/2014 | |
| WO | WO-0239805 A1 * | 5/2002 | ............. A01G 9/029 |

OTHER PUBLICATIONS

Search Report and Written Opinion issued Jul. 21, 2023, in corresponding Brazilian Patent Application No. BR112021001790-9, 4 pages.
Examination Report issued Aug. 1, 2023, in corresponding Saudi Patent Application No. 521421163, 10 pages.
Office Action issued Feb. 1, 2021, in corresponding Egyptian Patent Application No. PCT 0168-2021, 4 pages.
Indian Office Action issued Aug. 24, 2022 in Indian Patent Application No. 202117008156, 6 pages.
Extended European Search Report issued Aug. 22, 2022 in European Patent Application No. 19844654.4. 14 pages.
Combined Taiwanese Office Action and Search Report issued May 4, 2023 in Taiwanese Application 108127427, (with English translation of cited categories), 20 pages.
Office Action issued May 24, 2023, in corresponding Philippine Patent Application No. 1/2021/550238, 5 pages.
European Search Report Issued Sep. 7, 2023 in European Application 23181239.7, (with partial English translation), 16 pages.
Philippine Office Action issued Aug. 29, 2023 in Philippine Application 1-2021-550238, (English translation only), 4 pages.
European Office Action issued on May 31, 2023 in European Application No. 19 844 654.4, 4 pages.
Japanese Office Action issued on May 30, 2023 in Japanese Patent Application No. 2021-529240 (with English translation), 8 pages.
International Search Report and Written Opinion issued on Oct. 10, 2019 in PCT/US2019/044570 filed on Aug. 1, 2019.
Eurasian Office Action issued Jul. 5, 2021 in Eurasian Patent Application No. 202190404 (with English language translation), 4 pages.
Partial Supplementary European Search Report issued May 20, 2022, in corresponding European Patent Application No. 19844654.4, 16 pages.
Office Action issued May 23, 2022, in corresponding Eurasian Patent Application No. 202190404 (with English Translation), 3 pages.
Australian Office Action issued May 8, 2024 in Australian Patent Application No. 2019314417, 3 pages.
Combined Chinese Office Action and Search Report issued Dec. 1, 2023, in corresponding Chinese Patent Application No. 201980065330.X (with English Translation of Category of Cited Documents), 19 pages.
European Communication pursuant to Article 94(3) EPC issued Dec. 1, 2023, in corresponding European Patent Application No. 19 844 654.4, 5 pages.
UAE Examination and Search Report issued on Dec. 20, 2023 in United Arab Emirates Patent Application No. P6000154/2021, 8 pages.
Mexican Office Action issued Jun. 20, 2024, in corresponding Mexican Patent Application No. MX/a/2021/001123.
Office Action issued on Aug. 1, 2024, in corresponding Chinese Patent Application No. 201980065330.X with English translation.
Notice of Preliminary Rejection mailed Sep. 20, 2024, in corresponding Korean Patent Application No. 10-2021-7006000 with English translation.
Egyptian Office Action received on Sep. 9, 2024, in corresponding Egyptian Patent Application No. 10-2021-7006000 with English translation.

\* cited by examiner

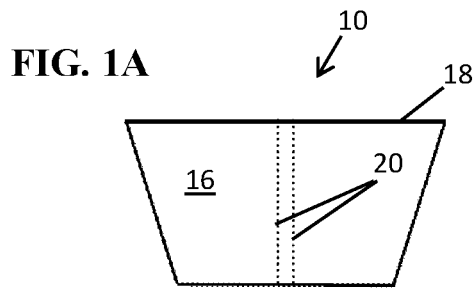
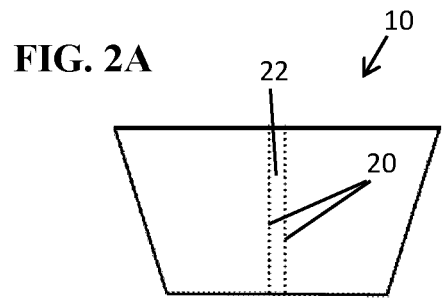
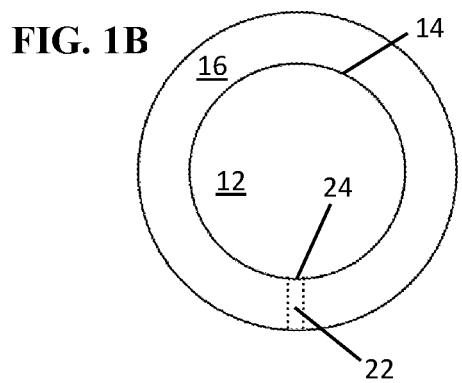
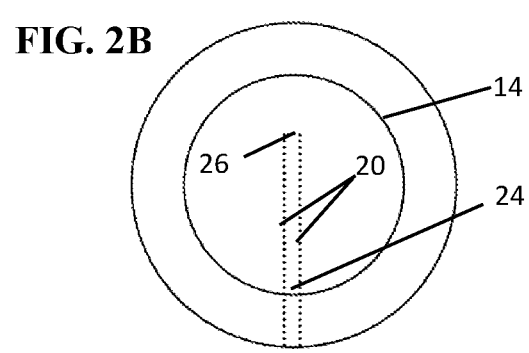
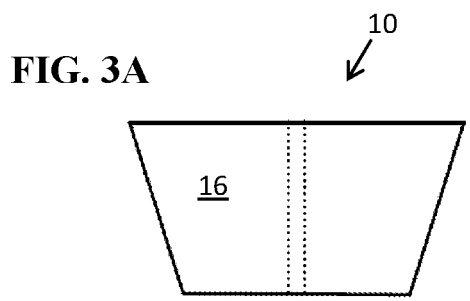
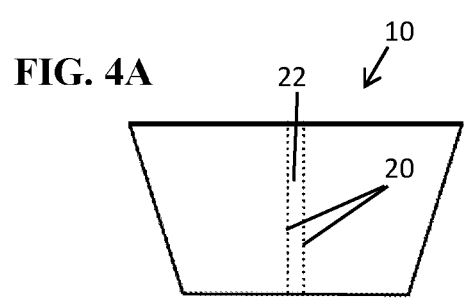
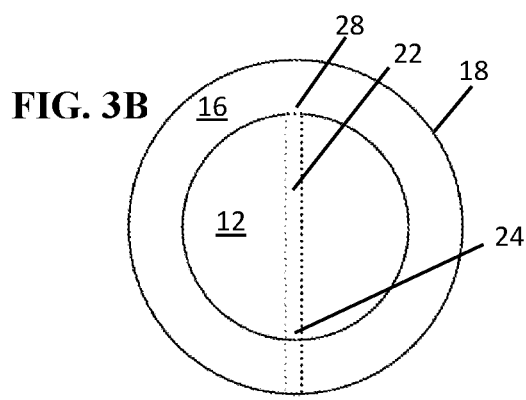
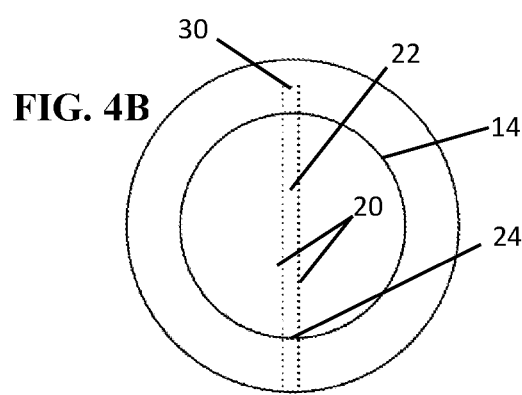

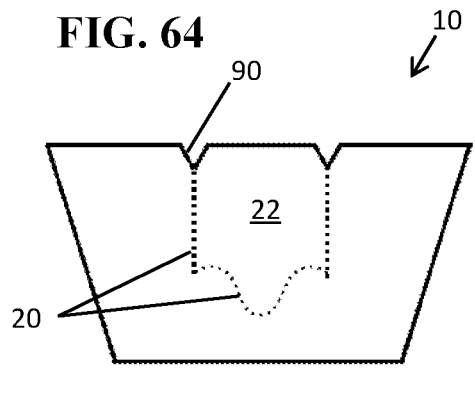
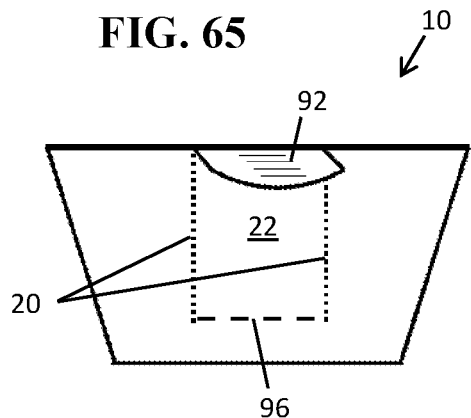
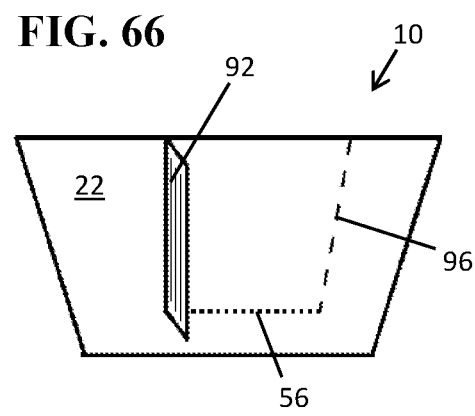
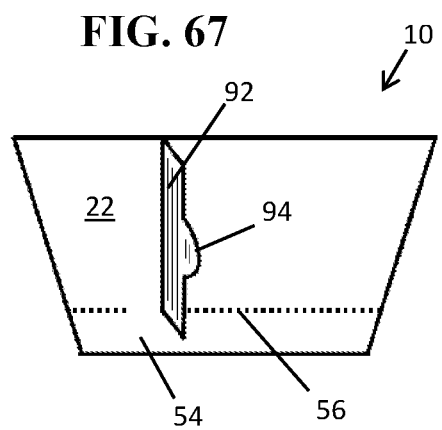
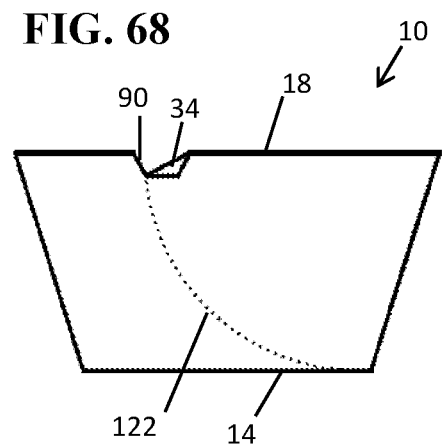
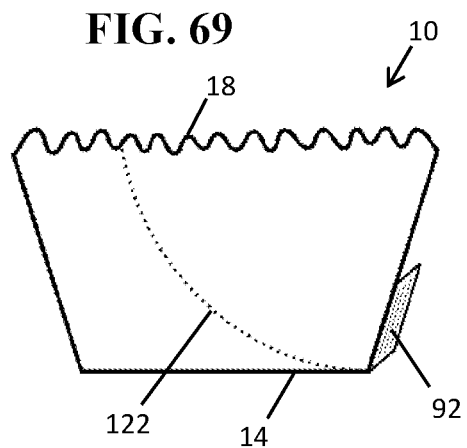

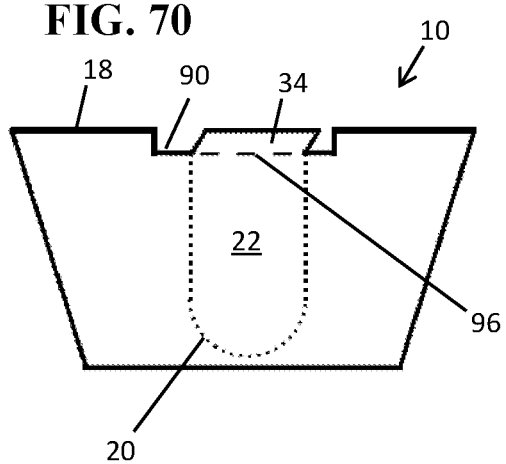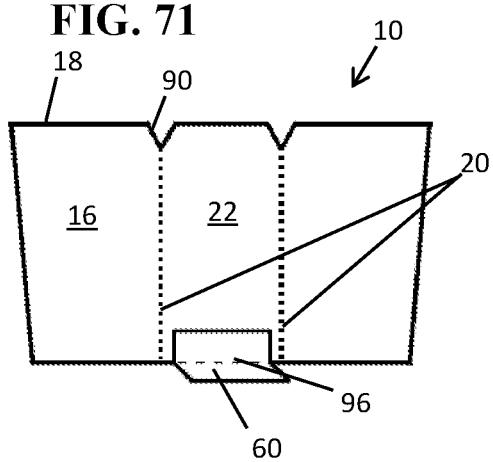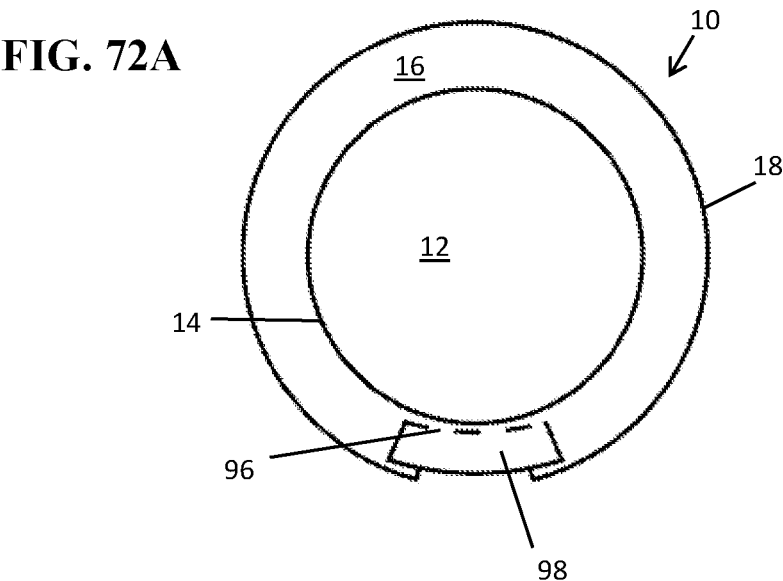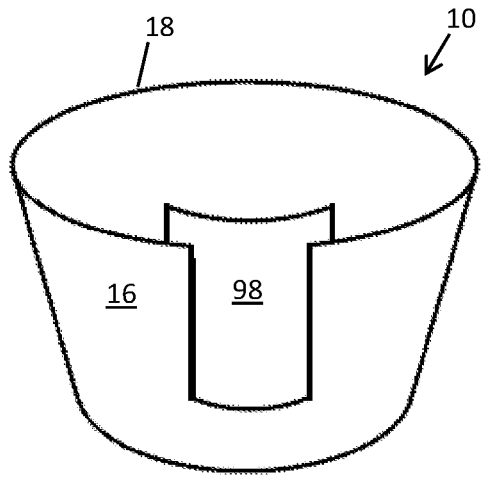

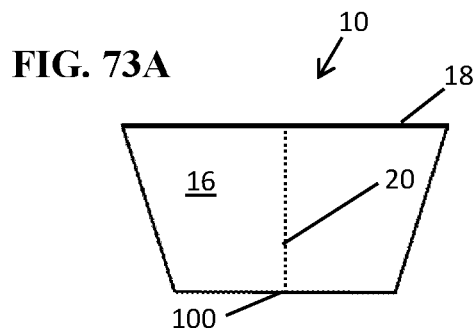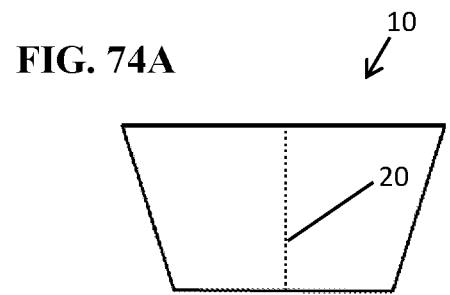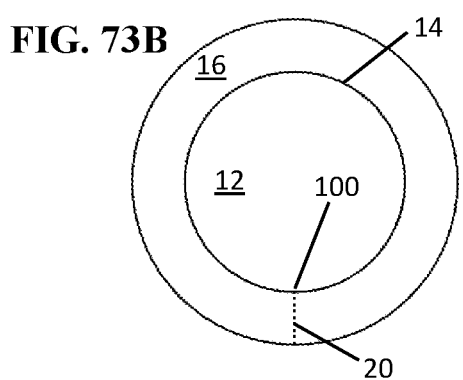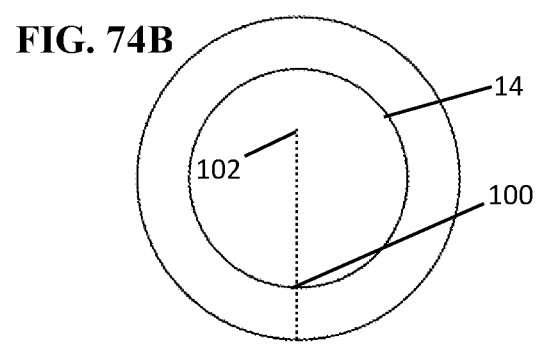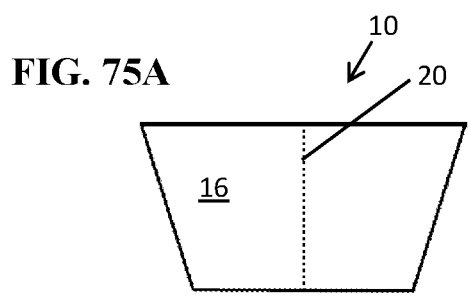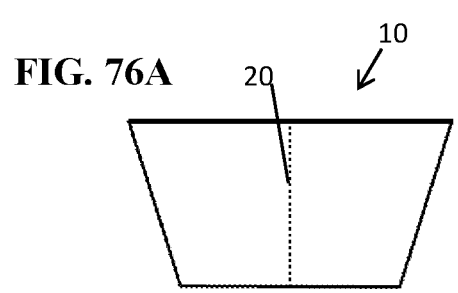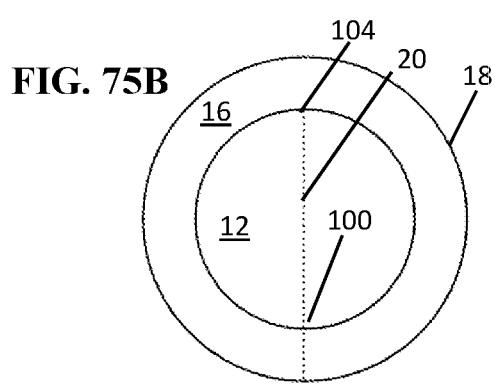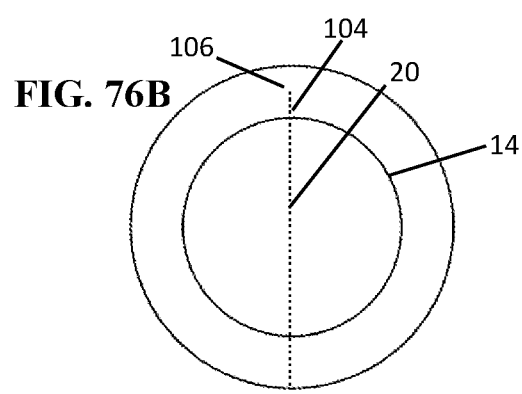

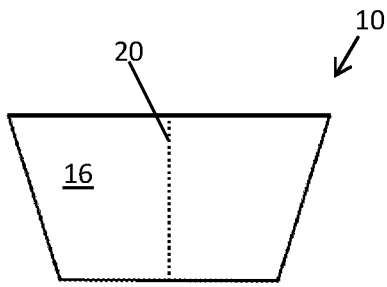
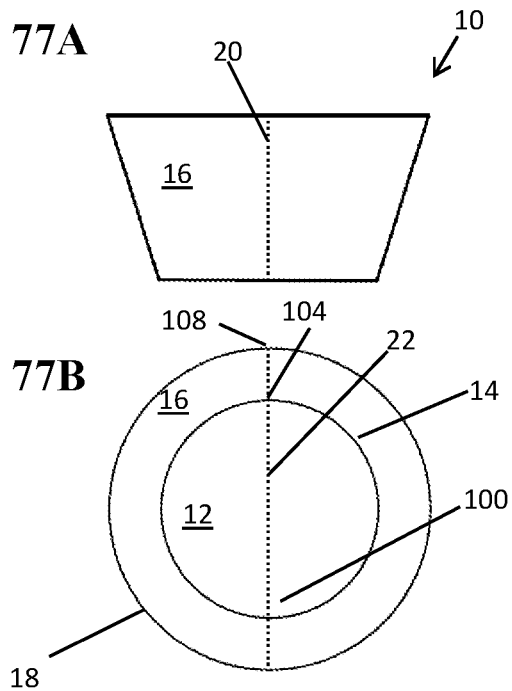
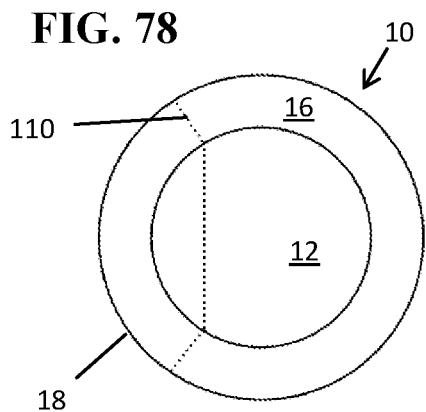
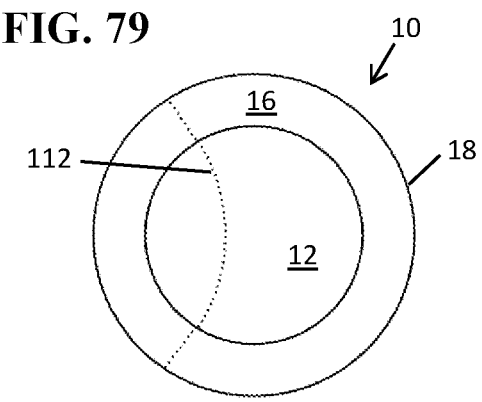

TEAR-OFF BAKING CONTAINER

CROSS REFERENCE TO RELATED APPLICATIONS

This application claims the benefit of priority from U.S. Provisional Application No. 62/713,294 filed Aug. 1, 2018, which is incorporated herein by reference in its entirety.

BACKGROUND OF THE INVENTION

Technical Field

The present invention relates to a baking container with a structure configured for tearing and/or separating a portion of the baking container to ease removal of a baked good contained therein.

Description of the Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

In the baking of wet, formless doughs and batters, ovenable pans and dishes are used to provide shape and support to a finished baked good. While these doughs and batters may be added in direct contact with these pans and dishes, one may instead add the dough or batter to a liner, made from various materials, usually paper, placed within the baking vessel. These liners, also known as baking papers, provide several advantages for baking and serving.

Firstly, these liners ease removal of a baked good from a pan, as the liners tend not to form an attachment with the pan. Furthermore, if the batter or dough is contained within the liner while baking, the cleanup of the pan is kept to a minimum. Alternatively, some liners may be able to stand on their own, without requiring support on their sides.

Secondly, baking liners provide a wrapper on the base of a baked good, allowing ease of transportation and minimization of crumbling. For some baked goods, the baking liner may decrease the amount of drying and better preserve freshness. In addition, the baking liners allow handling of a baked good without directly touching the foodstuff until desired.

Thirdly, as baking liners can be colored or formed into different shapes, they provide a decorative touch to a baked good. Baking liners can easily be detailed with different patterns, graphics, and advertisements.

Finally, baking liners provide a means to consuming a baked good. A handheld baked foodstuff (such as a muffin or cupcake), may be held at one side by the baking liner, and consumed from the opposite side. Alternatively, a baking liner may be separated from the sides of a baked good and flattened, as in a miniature plate to provide an eating surface or to contain crumbs. For larger baked goods, such as a cake loaf, a baking liner may provide a cutting surface to a dull knife or serving utensil. For baked goods of any size, a foodstuff partly consumed may be re-wrapped with a baking liner.

To confer some of the above advantages, baked foodstuffs may often stick to baking liner. Removing a baking liner without deforming the baked good generally involves pinching a sidewall and pulling away from the center. However, this step only separates a portion of the baking liner until its sides squeeze the baked good. Thus, another location on the sidewall must be pinched and pulled, and occasionally even another location, until the baking liner can be removed without disfiguring or tearing apart the bulk of the baked item.

In addition, some baking liners are overfilled with the upper rim of the sidewall buried in cake or toppings, making it very difficult to pull directly from the upper rim to remove the liner. In this situation, one may be motivated to pinch and pull from the upper part of the sidewall. This is especially true in the case of a fluted sidewall, where the involutions at the upper part of the sidewall are deeper and are easier to pinch than the shallower involutions at the bottom part of the sidewall. However, pinching and pulling from the upper rim of the sidewall tends to pull off a portion of the overhanging cake and toppings, leading to a mess.

For persons with differently-abled hand motor skills, for instance, young children, the successful removal of a wrapper may be too difficult for them to perform on their own. Even with assistance, the time it takes to remove a standard baking liner can be significant. For example, a parent removing the wrappers from several cupcakes at a young child's birthday party may not have the luxury of time to carefully separate the wrappers from the cakes.

In view of the foregoing, one objective of the present invention is to provide a baking container that comprises a designated path of tearing along one or more rupture lines on the sidewall and optionally extending to the bottom of the baking container. The sidewall may be reinforced with a ribbon or string to create a strip. A fold, sticker or a pull tab may be present to ease removal of the baking container. By allowing a controlled tear of the baking container, one may be able to efficiently and neatly separate the baking container from the baked good.

BRIEF SUMMARY OF THE INVENTION

According to a first aspect, the present disclosure relates to a baking container. The baking container has a planar bottom face, having a periphery: a sidewall extending from the periphery to a rim; and a rupture line extending from the rim to a first point on the periphery, and extending from the first point on the periphery to a second point on the planar bottom face located within the periphery. The rupture line is configured to be torn to open the sidewall to ease removal from and/or consumption of a baked foodstuff contained therein.

In one embodiment, the rupture line further extends to a third point located on an opposite side of the periphery from the first point.

In one embodiment, the rupture line is not centered across the planar bottom face.

In one embodiment, the rupture line is centered across the planar bottom face.

In one embodiment, the rupture line further extends from the third point to a fourth point located on an opposite side of the sidewall from the first point.

In one embodiment, the rupture line further extends from the third point to a fifth point located on the rim.

In a further embodiment, the baking container is configured to be completely separated into two parts.

In a further embodiment, one part of the baking container is configured to remain in contact with the foodstuff when the baking container is completely separated into two parts.

In a further embodiment, the part of the baking container configured to remain in contact with the foodstuff has a remaining sidewall area that is 55-80% of a total sidewall area of the baking container.

In a further embodiment, the part of the baking container configured to remain in contact with the foodstuff has a remaining planar bottom face area that is 10-40% of a total planar bottom face area of the baking container.

In one embodiment, the rupture line follows a shortest path from the rim to the periphery, forming a substantially perpendicular angle with the periphery.

In one embodiment, the rupture line does not follow a shortest path from the rim to the periphery, and does not form a substantially perpendicular angle with the periphery.

In a further embodiment, the rupture line intersects the periphery forming a smallest angle of 20°-70°.

In one embodiment, a part of the sidewall or planar bottom face that does not form the rupture line resists a maximum force that is 0.2-10 times greater than a maximum force resisted at the rupture line.

In one embodiment, the rupture line is formed by weakening the material of the sidewall, the planar bottom face, or both.

In one embodiment, the rupture line is formed by depressions or scores.

In one embodiment, the rupture line is formed by perforations.

In a further embodiment, the perforations are dots, pinholes, or substantially circular holes.

In one embodiment, the dots, pinholes, or holes have an inner diameter of 0.05-1.00 mm.

In a further embodiment, the perforations on the sidewall, the planar bottom face, or both are spaced by 0.5-1.5 mm.

In one embodiment, the perforations comprise elongated slits having widths of 0.05-1.00 mm and aspect ratios of 1.5:1-5:1.

In a further embodiment, the elongated slits have an elongated axis along the rupture line.

In one embodiment, the elongated slits have an elongated axis that forms an angle of 20°-60° with a path of the rupture line.

In one embodiment, the rupture line is formed by strengthening an adjacent sidewall, an adjacent planar bottom face, or both.

In a further embodiment, the adjacent sidewall is strengthened by increasing its thickness.

In one embodiment, the sidewall is fluted, folded, ribbed, corrugated, or pleated.

In one embodiment, the sidewall is smooth.

In one embodiment, the baking container further comprises a string, a fold, a sticker, or a ribbon located along the rupture line.

In one embodiment, a fold is present, and the fold is configured to be pinched and pulled to rupture the rupture line.

In one embodiment, the string, fold, sticker, or ribbon has a width or diameter of 0.5-6 mm.

In one embodiment, the string, fold, sticker, or ribbon has a total length of 2-40 cm.

In one embodiment, the baking container further comprises a pull tab located at the rupture line.

In one embodiment, the rupture line is located by different coloring or texturing.

In one embodiment, the baking container further comprises a seam along the rupture line.

In one embodiment, the baking container further comprises a lid attached to a part of the rim.

In one embodiment, the sidewall comprises two layers of material.

In one embodiment, an interior of the sidewall comprises a decoration, an advertisement, a graphic, a picture, a text, or a coloring that is not visible from an exterior of the sidewall.

In one embodiment, the baking container further comprises a second rupture line, wherein the rupture line and the second rupture line form a tear strip having a substantially constant width along a length of the tear strip.

In one embodiment, the planar bottom face is substantially circular.

In a further embodiment, where the planar bottom face is substantially circular, a ratio of a diameter of the rim to a diameter of the periphery is 1:1-2:1.

In one embodiment, the planar bottom face is substantially rectangular with an aspect ratio of 1:1-10:1.

According to a second aspect, the present disclosure relates to a baking container. The baking container has a planar bottom face, having a periphery: a sidewall extending from the periphery to a rim; and two rupture lines extending from the rim to a first pair of points on the periphery. The two rupture lines form a strip configured to be torn along the two rupture lines, and the strip is configured to be torn to open the sidewall to ease removal from and/or consumption of a foodstuff contained therein.

In one embodiment, the two rupture lines extend from the first pair of points to a second pair of points on the planar bottom face, the second pair of points located within the periphery.

In one embodiment, the two rupture lines further extend to a third pair of points located on an opposite side of the periphery from the first pair of points.

In one embodiment, the two rupture lines further extend from the third pair of points to a fourth pair of points located on an opposite side of the sidewall from the first pair of points.

In one embodiment, the two rupture lines further extend from the third pair of points to a fifth pair of points located on the rim.

In one embodiment, the strip is formed of a material having an average thickness that is greater by a factor of 1.05-10.00 than a material elsewhere forming the sidewall and/or the planar bottom face.

In one embodiment, the strip further comprises a pull tab or a fold configured to be pinched and pulled to tear the strip.

In one embodiment, a pull tab or fold is located on a bottom side of the planar bottom face.

In a further embodiment, a pull tab is present, and the pull tab has a width greater than a width of the strip.

According to a third aspect, the present disclosure relates to a baking container. The baking container has a planar bottom face, having a periphery: a sidewall extending from the periphery to a rim; and two rupture lines extending from the rim to a first pair of points on the sidewall and from the first pair of points along a circumference of the sidewall. The two rupture lines form a strip configured to be torn along the two rupture lines, and the strip is configured to be torn to open the sidewall to ease removal from and/or consumption of a foodstuff contained therein while leaving a bottom portion of the baking container in contact with the foodstuff.

In one embodiment, the bottom portion has a height that is 5-50% of the total height of the sidewall.

According to a fourth aspect, the present disclosure relates to a baking container. The baking container has a planar bottom face, having a periphery: a sidewall extending from the periphery to a rim: a first rupture line extending from the rim to a first pair of points on the sidewall; and a second rupture line and a third rupture line both extending from the first pair of points along a circumference of the sidewall. The second and third rupture lines form a strip configured to be torn along the two rupture lines, and the strip is configured to be torn to open the sidewall to ease removal from and/or consumption of a foodstuff contained therein while leaving a bottom portion of the baking container in contact with the foodstuff.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A is a side view of a baking container with rupture lines that terminate at a periphery of a planar bottom face.

FIG. 1B is the top view of the baking container of FIG. 1A.

FIG. 2A is a side view of a baking container with rupture lines that terminate beyond a periphery of a planar bottom face.

FIG. 2B is the top view of the baking container of FIG. 2A, showing the rupture lines terminating within the periphery of the planar bottom face.

FIG. 3A is a side view of a baking container with rupture lines that terminate beyond a periphery of a planar bottom face.

FIG. 3B is the top view of the baking container of FIG. 3A, showing the rupture lines terminating at an opposite side of the periphery.

FIG. 4A is a side view of a baking container with rupture lines that terminate beyond a periphery of a planar bottom face.

FIG. 4B is the top view of the baking container of FIG. 4A, showing the rupture lines terminating at an opposite side of the sidewall.

FIG. 64 is a side view of a baking container having a tear strip with a curved rupture line bottom, and rupture lines connected to notches in the rim.

FIG. 65 is a side view of a baking container having a wide tear strip with a textured pull tab and a hinge connecting the bottom of the two rupture lines.

FIG. 66 is a side view of a baking container having a wide, horizontally traversing tear strip having a pull tab, the tear strip attached at a hinge.

FIG. 67 is a side view of a baking container having a single rupture line following most of a sidewall circumference, which forms a wide, horizontal tear strip having a pull tab.

FIG. 68 is a side view of a baking container having both a notch and a fold as a pull tab in the rim at the top of a curved rupture line.

FIG. 69 is a side view of a baking container having a curved rupture line connected to a pull tab near a bottom of the sidewall.

FIG. 70 is a side view of a baking container having square-shaped notches and a pull tab in the rim connecting a wide tear strip having a curved bottom.

FIG. 71 is a side view of a baking container having notches in the rim and a bottom pull tab attached to a tear strip by an adhesive.

FIG. 72A is a top view of a baking container having a pull tab similar to a tongue of a shoe.

FIG. 72B is a perspective view of FIG. 72A.

FIG. 73A is a side view of a baking container with a rupture line that terminates at a periphery of a planar bottom face.

FIG. 73B is the top view of the baking container of FIG. 73A.

FIG. 74A is a side view of a baking container with a rupture line that terminates beyond a periphery of a planar bottom face.

FIG. 74B is the top view of the baking container of FIG. 74A, showing the rupture line terminating within the periphery of the planar bottom face.

FIG. 75A is a side view of a baking container with a rupture line that terminates beyond a periphery of a planar bottom face.

FIG. 75B is the top view of the baking container of FIG. 75A, showing the rupture line terminating at an opposite side of the periphery.

FIG. 76A is a side view of a baking container with a rupture line that terminates beyond a periphery of a planar bottom face.

FIG. 76B is the top view of the baking container of FIG. 76A, showing the rupture line terminating at an opposite side of the sidewall.

FIG. 77A is a side view of a baking container with a rupture line that terminates beyond a periphery of a planar bottom face.

FIG. 77B is the top view of the baking container of FIG. 77A, showing the rupture line terminating at an opposite side of the rim.

FIG. 78 is a top view of a baking container with an off-center rim-to-rim rupture line.

FIG. 79 is a top view of a baking container with an off-center curved rupture line.

DETAILED DESCRIPTION OF THE EMBODIMENTS

Figure 5A:
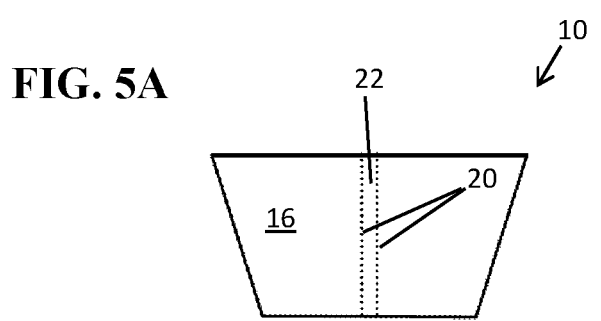
FIG. 5A is a side view of a baking container with rupture lines that terminate beyond a periphery of a planar bottom face.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "substantially," "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. As used herein in the specification and claims, including as used in the examples and unless otherwise expressly specified, all numbers may be read as if prefaced by the word "substantially," "about," or "approximately," even if the term does not expressly appear. Also, all values and subranges within a numerical limit or range are specifically included as if explicitly written out.

As used herein, easing removal of or removing a baking container, easing removal of or removing a foodstuff, or separating a baking container from a foodstuff (or vice versa), are considered equivalent actions. A baking container may be removed in whole or in part, and a foodstuff may be consumed while a portion of a baking container remains intact or attached to the foodstuff. The baking container described herein may also be considered a baking liner, muffin liner, display cup, confection cup, a baking paper, a cupcake paper, a cupcake wrapper, a pie plate, a pie tin, a loaf liner, an éclair liner etc. Additionally terminology used herein is for the purpose of describing particular embodiments and is not intended to be limiting of the invention.

According to a first aspect, the present disclosure relates to a baking container comprising a planar bottom face, having a periphery: a sidewall extending from the periphery to a rim; and two rupture lines extending from the rim to a first pair of points on the periphery. The two rupture lines form a strip configured to be torn along the two rupture lines. One such embodiment is shown in FIGS. 1A and 1B.

In one embodiment, the strip is configured to be torn to open the sidewall to ease removal from and/or consumption of a foodstuff contained therein. Thus, the strip may be considered a "tear strip." In other embodiments, the rupture lines, and thus the strip, may extend along the bottom and/or up the opposite side of the sidewall. These embodiments may not only allow the sidewall to be opened to ease removal of an item, but to split the baking container into two sides. In a further embodiment, these two sides may be similar to two halves of the container, and opening these two sides may be similar to opening a pair of outward-swinging doors (for example, the doors of a side-by-side refrigerator).

For instance, in one embodiment, the two rupture lines further extend from a first pair of points to a second pair of points located within the periphery of the planar bottom face. One such embodiment is shown in FIGS. 2A and 2B. Where the second pair of points is located within a substantially circular periphery, the second pair of points may be located at a location that is 10-90%, preferably 20-80%, or 30-75%, 30-40%, 40-50%, 50-60%, 60-70%, 70-80% of the length of a diameter or chord. Additionally, the rupture lines connecting the first pair of points with the second pair of points may be located along a diameter or radius of a substantially circular planar bottom face, as shown in FIG. 2B. Alternatively, the rupture lines connecting the first and second pair of points may be off-center, and not located along a diameter or radius of a substantially circular planar bottom face but along a chord that is 10-90%, preferably 20-80%, or 30-75%, 30-40%, 40-50%, 50-60%, 60-70%, 70-80% of the length of the diameter. For baking containers that do not have substantially circular planar bottom faces and peripheries, the second pair of points may be located a distance that is 10-90%, preferably 20-80%, or 30-75%, 30-40%, 40-50%, 50-60%, 60-70%, 70-80% along a diagonal or other line connecting two points of the periphery. This diagonal or other line may or may not intersect the geometric centroid of the planar bottom face.

In a further embodiment, the two rupture lines further extend from the second pair of points to a third pair of points. Here, the third pair of points is located on an opposite side of the periphery from the first pair of points. One such embodiment is shown in FIGS. 3A and 3B.

In a further embodiment, the two rupture lines further extend from the third pair of points to a fourth pair of points located on an opposite side of the sidewall from the first pair of points. One such embodiment is shown in FIGS. 4A and 4B.

Figure 5B:
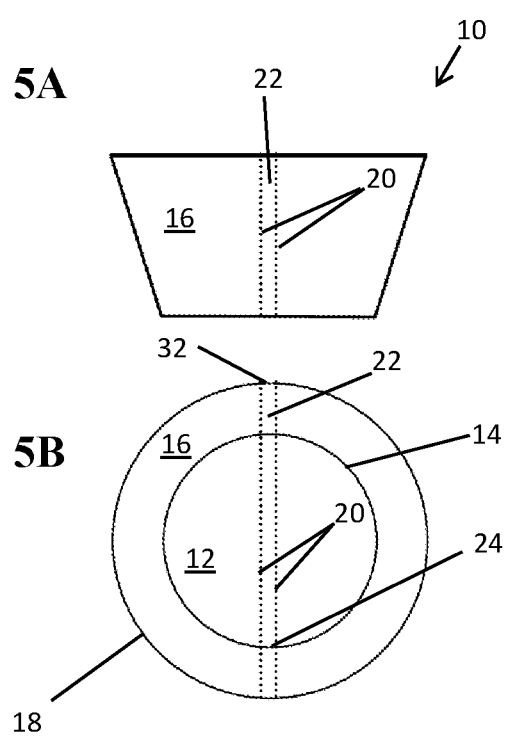
FIG. 5B is the top view of the baking container of FIG. 5A, showing the rupture lines terminating at an opposite side of the rim.

In a further embodiment of the baking container, the two rupture lines may extend to a fifth pair of points located on an opposite side of the rim from where the rupture lines first extended. One such embodiment is shown in FIGS. 5A and 5B.

In the embodiments where one or more rupture lines connect two locations on the periphery of the planar bottom face, the one or more rupture lines may be centered across the planar bottom face, for instance, by intersecting the geometric centroid of the planar bottom face. For a substantially circular periphery, this would mean that the one or more rupture lines lie along a diameter of the planar bottom face. FIGS. 3B, 4B, 5B, 10, 17B show embodiments where the one or more rupture lines or tear strip are centered across the planar bottom face. In other embodiments, the one or more rupture lines may not be centered across the planar bottom face. For instance, the one or more rupture lines may not intersect the center or geometric centroid of the planar bottom face. The length of the one or more rupture lines may be 10-90%, preferably 20-80%, or 30-75%, 30-40%, 40-50%, 50-60%, 60-70%, 70-80% of the length of the diameter or longest length across the planar bottom face. FIGS. 12, 46, 78-81, and 87-92 show embodiments where the one or more rupture lines are not centered across the planar bottom face. The one or more rupture lines on the planar bottom face may be straight and linear; however, in other embodiments, one or more rupture lines may be curved and/or angled. For instance, FIGS. 79-83, 87, and 91 show rupture lines on the planar bottom face that are more than just single straight lines connected two different points on the periphery. Here, the rupture lines are curved, jagged, and wavy. In other embodiments, one or more rupture lines on the planar bottom face may be rotationally symmetrical and/or centered, such as in FIGS. 2B, 3B, 4B, 5B, 10, 11, 74B, 75B, 76B, 77B, and 82-85.

Additionally, the planar bottom face may have multiple rupture lines, which may or may not intersect with one another. It is envisioned that for an elongated baking container, such as shown in FIG. 92, spaced, non-intersecting rupture lines may enable a user to more easily control the length of the remaining baking container. A baking container having a substantially circular planar bottom face may also have multiple rupture lines crossing the planar bottom face, where the multiple rupture lines do not intersect with one another. Examples of intersecting rupture lines on the planar bottom face include FIGS. 10, 11, 84, 85, and 91. In one embodiment, one or more rupture lines, or one or more strips, may be torn from any direction and may be partially torn or completely torn. In certain embodiments, a rupture line may be torn not from either end but from a segment starting from within the rupture line.

In one embodiment, the strip has a substantially constant width, meaning that along its length, the width varies from the average width by less than 7% of the average width, preferably less than 5% of the average width. In one embodiment, the baking container may have a strip with a width of 0.5-2.5 cm, preferably 0.6-2.2 cm, more preferably 0.8-2.0 cm. In another embodiment, the baking container may have a wide strip, for instance, having a width in a range of 2.0-5.5 cm, preferably 2.2-5.0 cm, preferably 2.5-4.5 cm, more preferably 2.6-4.2 cm. This wide strip may function more like a door on the sidewall and/or planar bottom face of the baking container in order to open a larger portion of the baking container. Again, in some embodiments, a strip may be considered to be a portion of the sidewall and/or planar bottom face between any two rupture lines, and thus, the width of the strip may be considered to be the distance between any two rupture lines.

In one embodiment, the one or more rupture lines follow a shortest path from the rim to the periphery, forming a substantially perpendicular angle with the periphery. As defined here, a substantially perpendicular angle refers to the smallest angle formed being 80°-100°, preferably 85°-95°, or about 90°.

Figure 29:
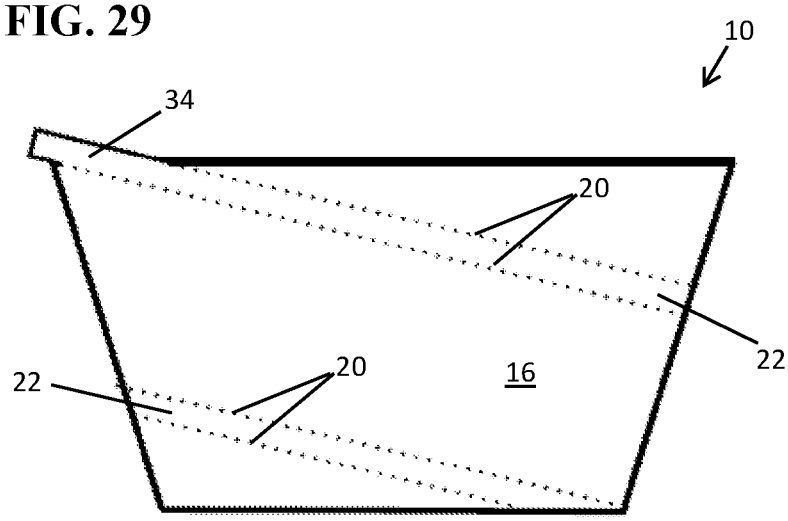
FIG. 29 is a side view of a baking container having a pull tab attached to a strip that winds around the sidewall.
Figure 86:
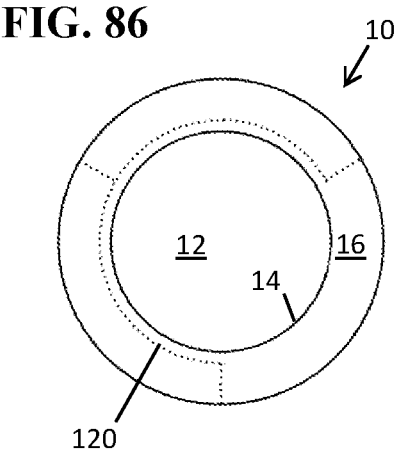
FIG. 86 is a top view of a baking container with multiple rupture lines on the sidewall and no rupture lines on the planar bottom face.

In one embodiment, one or more rupture lines do not follow a shortest path from the rim to the periphery, and do not form a substantially perpendicular angle with the periphery. For instance, the rupture lines may wrap around a portion of the sidewall. In one embodiment, the rupture lines may wrap around a portion of a cylindrical or frustoconical sidewall, as is shown in FIGS. 29 and 86. In a further embodiment, the rupture lines may wrap entirely around a cylindrical or frustoconical sidewall. In these embodiments, the rupture lines may intersect the periphery forming a smallest angle of 20°-70°, preferably 25°-60°, more preferably 30°-50°. However, in some embodiments, the rupture lines may intersect the periphery forming a smallest angle that is smaller than 20° or larger than 70°. In another embodiment, the rupture lines may follow curved paths on the sidewall as shown in FIGS. 64, 68-70, and 87-98. Likewise, in some embodiments, one or more rupture lines do not form a substantially perpendicular angle with the rim, instead forming angles as mentioned for the rupture lines intersecting the periphery.

In one embodiment, one or more rupture lines may intersect the rim at a notch, and may provide a starting point for a rupture line to be torn by weakening that portion of the rim. In another embodiment, a notch may provide a user with a visual or tactile clue to locate a rupture line. The notch may be formed by cutting away a portion of the sidewall from the rim. The notch may have a height of 0.5-10 mm, preferably 0.8-8 mm, more preferably 1-5 mm, and may have a width of 0.2-8 mm, preferably 0.5-6 mm. The notch may have V shape, a rectangular shape, or some other shape. A notch with a V shape may have an angle in a range of 5°-80°, preferably 10°-50°, more preferably 15°-45°. FIGS. 60, 63, 64, 71, and 90 show V-shaped notches: FIG. 70 shows rectangular notches. Two notches in a rim may form a pull tab between them. In other embodiments, a lack of material may form a notch in the rim, or a cut having a similar length as a notch, without necessarily removing material.

Figure 39:
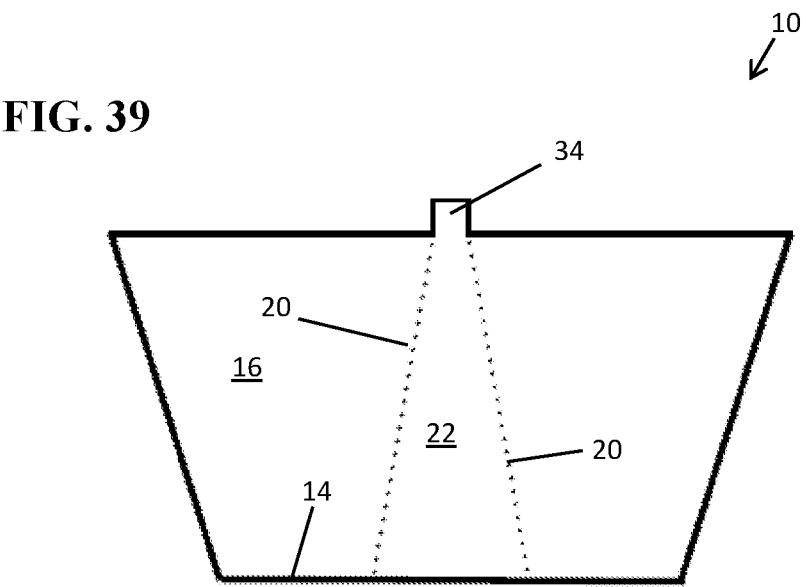
FIG. 39 is a side view of a baking container with a pull tab and rupture lines spaced at varying widths.
Figure 61:
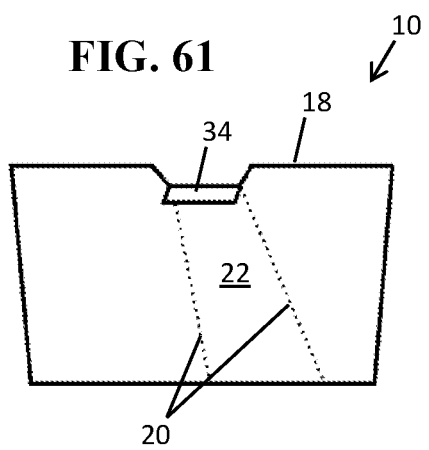
FIG. 61 is a side view of a baking container having a pull tab and notches in the rim, with an off-centered, widening tear strip.

In another embodiment, the rupture lines do not have a substantially constant width, but may have an increasing width closer to the periphery. In this embodiment, the rupture lines may intersect the sidewall at symmetric angles or at different angles. In one embodiment, the rupture lines may move closer together and/or farther apart in order to create different shapes or patterns of the strip. In another related embodiment, the width of the rupture lines may increase towards the periphery, and possibly along the planar bottom face, enabling the consumer means of removing a large portion of the baking container at once. FIGS. 39 and 61 each illustrate one such embodiment.

In one embodiment, where the rupture lines end at a location within the baking container (as shown in FIGS. 1A, 2A, 3A, and 4A), rather than connect rim-to-rim (as in FIGS. 5A and 12), the rupture lines may or may not be connected by an additional rupture line segment. For instance, where the rupture lines terminate at an additional connecting rupture line that is substantially perpendicular, as in FIGS. 2B and 59, the strip may be cleanly torn off as a rectangular piece with a clean edge. This additional rupture line segment may be formed by perforations or by other means described for rupture lines. Alternatively, the two rupture lines that define the strip may be connected by a curved rupture line segment as shown in FIGS. 64 and 70.

Figure 58:
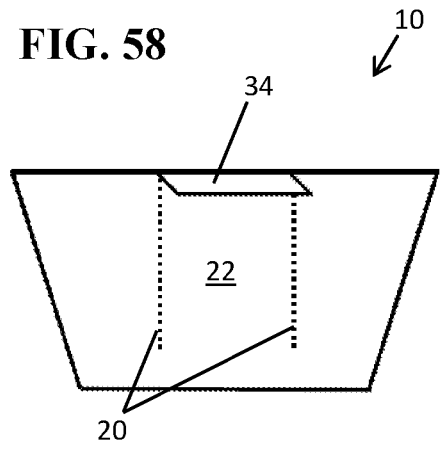
FIG. 58 is a side view of a baking container having a wide tear strip with a pull tab.

In other embodiments, the rupture lines may terminate without an additional perpendicular rupture line segment. One such example is shown in FIG. 58. More generally, in this particular embodiment, the strip may be separated at the rupture line termination point, or depending on the materials used, a tear may continue along the sidewall and/or planar bottom face of the baking container. In related embodiments, where rupture lines end at a location within the baking container, they may intersect at an angle, so that the strip is torn off and removed with a pointed end, such as the strip shown in FIG. 62. This angle may be in a range of 5°-80°, preferably 7°-70°, more preferably 10°-60°, even more preferably 15°-60°. In another embodiment, one or more rupture lines may terminate at a hinge, fulcrum, or crease in the sidewall and/or planar bottom face, as shown in FIGS. 65 and 66. At a hinge, the baking container may be opened by folding the hinge: however, the hinge is not intended to tear. Thus, a hinge may be formed by weakening the material as described for forming rupture lines, but not weakened to the same extent as rupture lines. In the embodiments where one or more rupture lines connect to a hinge, the hinge may allow a portion of the baking container to be opened like a door, similar to a mailbox, a safe deposit box, or an oven. In some embodiments, the hinge may be similar to that described for the connection of a lid to a baking container.

In one embodiment, where a rupture line connects rim-to-rim and is off-centered, such as in FIGS. 78-81 and 87-90, separating the baking container completely along the rupture line produces a smaller portion and a larger portion. In one embodiment, the smaller portion has a bottom face with an area of about ⅓ or about ¼ of the original planar bottom face area. In another embodiment, the smaller portion has a bottom area that is 5-45%, preferably 15-44%, more preferably 20-40% of the original planar bottom face area. In a related embodiment, a rupture line on a planar bottom face may follow an arc or a single curve as in FIGS. 79, 80, and 91. These embodiments allow for a consumer to leave different amounts of paper attached to a foodstuff. For instance, a consumer using the baking container of FIG. 80 may remove the smaller portion of the baking container from the foodstuff while completely separating along the rupture line, and while holding the larger portion of the baking container. This larger portion of the baking container remains in contact with the foodstuff, and in FIG. 80, the larger portion is more accommodating to the shape of one or more bites of the foodstuff. In this way, the larger portion of the baking container has more sidewall and less of the planar bottom face than the smaller portion of the baking container. More sidewall generally provides more of a surface to hold the baking container, and less planar bottom face provides more of the foodstuff to be accessible for consumption.

For instance, in one embodiment, where the baking container is configured to be separated into two parts, with a part remaining in contact with the foodstuff, the part in contact with the foodstuff may have a remaining sidewall area that is 55-80%, preferably 60-75%, more preferably 65-70% of a total sidewall area of the baking container. In another embodiment, the part remaining in contact with the foodstuff may have a remaining planar bottom face area that is 10-40%, preferably 20-38% more preferably 25-35%, or about 25% or about 33% of a total planar bottom face area of the baking container.

In one embodiment, the strip is formed of a thicker material than the material elsewhere forming the sidewall and/or the planar bottom face. The material of the strip may have an average thickness that is greater by a factor of 1.05-10.0, preferably 1.1-5.0, more preferably 1.2-3.0.

However, in other embodiments, the strip is formed of a thinner material than a material elsewhere forming the sidewall and/or the planar bottom face. For instance, the strip may be thinner, but stronger than the material elsewhere forming the sidewall and/or the planar bottom face.

The material of the strip may comprise the same composition as the material forming the rest of the sidewall and/or the planar bottom face. For instance, the strip may simply be formed by perforated rupture lines. Alternatively, in this embodiment, the strip may be formed by folding over a part of the sidewall, planar bottom face, and/or rim.

In another embodiment, the material of the strip may be similar to the material elsewhere on the sidewall and/or planar bottom face, but may comprise additional compounds. For instance, in one embodiment, the sidewall and/or planar bottom face may have an overlapping seam which forms the strip, where the strip further comprises an adhesive to hold the seam together. Preferably the adhesive is food-grade and heat resistant. Similarly, the strip may be formed by folding the sidewall and/or rim, and securing the fold with an adhesive. In another embodiment, the strip may be impregnated with a synthetic polymer, a plant fiber, or some other material in order to increase the strength of the strip.

In one embodiment, the baking container further comprises a string, a sticker, a fold, or a ribbon attached along a portion of the strip, or else near a rupture line. The string, sticker, fold, or ribbon may be located or impregnated within the strip (for instance, sandwiched between two overlapping pieces of sidewall). The string, sticker, fold, or ribbon may have a width or diameter of 0.5-6 mm, preferably 0.6-5 mm, more preferably 0.8-3 mm. However, in other embodiments, the string, sticker, fold, or ribbon may have a width or diameter of less than 0.5 mm or greater than 6 mm. The string, sticker, fold, or ribbon may have a total length of 2-40 cm, preferably 3-30 cm, more preferably 4-10 cm, though in some embodiments, the total length may be less than 2 cm or greater than 40 cm. In one embodiment, a single string may be folded or looped back on itself. The string may be considered a "reinforcing string," and the ribbon may be considered a "reinforcing ribbon." In one embodiment, the ribbon or the sticker may be a non-porous material, though in other embodiments, it may be porous, such as a ribbon comprising a woven material or a mesh. In related embodiments, two or more strings could be adhered next to each other to form a material similar to a ribbon.

In the embodiment where the baking container further comprises a string, a sticker, a fold, or a ribbon, preferably the string, sticker, fold, or ribbon comprises a heat resistant, food-grade material. In one embodiment, the string, sticker, fold, or ribbon comprises at least one material selected from the group consisting of a plant fiber, polypropylene, crystallized polyethylene terephthalate (CPET), polytetrafluoroethylene (PTFE), fluorinated ethylene propylene (FEP), perfluoroalkoxy alkanes (PFA), parchment paper, silicone, metal, ceramic, polylactic acid, a protein-based plastic, cellulose acetate, and silicone rubber.

In one embodiment, the string, sticker, fold, or ribbon may comprise a material considered a synthetic fiber. In another embodiment, the string, sticker, fold, or ribbon may comprise a material considered a natural fiber. In another embodiment, the string, sticker, fold, or ribbon may be derived from a natural fiber or a natural source, which is chemically treated to yield a fiber.

In one embodiment, where the string, sticker, fold, or ribbon comprises a plant fiber, the plant fiber may be derived from softwood, hardwood, wheat straw, rice straw, flax, esparto grass, reed, hemp, Indian hemp, jute, tossa jute, white jute, kenaf, ramie, roselle, sunn, urena, abaca, cantala, henequen, maguey, Mauritius hemp, phormium, sisal, akund floss, bagasse, bamboo, bombax cotton, coir, cotton, flosssilk tree, kapok, milkweed floss, or some other plant fiber.

In another embodiment, the string, sticker, fold, or ribbon may be attached to an outside of the baking container. In another embodiment, the string, sticker, fold, or ribbon may be attached to an inside of the baking container. In a further embodiment, where the string, sticker, fold or ribbon may be attached to an inside of the baking container, the string, sticker, fold, or ribbon may be attached to the inside at one end of the string, sticker, fold, or ribbon, while the length of the string, sticker, fold, or ribbon rests within the baking container. In this embodiment, the attachment at only one end may be required as the length of the string, sticker, fold, or ribbon would be held in place once the baking container is filled with an item. In some embodiments, the string, sticker, fold, or ribbon may protrude from the baking container and be visible, though in other embodiments, the string, sticker, fold, or ribbon may be completely hidden, for instance, if the entire length of the string, sticker, fold, or ribbon is embedded within the sidewall or covered with a coating.

As defined herein, a rupture line is the preferred path of a tear on the sidewall and/or the planar bottom face, and may be created by weakening a path on the sidewall and/or the planar bottom face relative to the material elsewhere of the sidewall and planar bottom face.

In one embodiment, the baking container is able to resist a maximum force against the sidewall and/or planar bottom face until tearing along a rupture line. For instance, if this force is 0.5 N, a strip on the sidewall may be pulled with a force of 0.1 or 0.4 N without tearing along a rupture line. However, pulling with a force of 0.5 N or higher will result in tearing along the rupture line. In one embodiment, this maximum force may be 0.05-1.0 N, preferably 0.08-0.9 N, more preferably 0.15-0.8 N, even more preferably 0.3-0.7 N. In other embodiments, the maximum force may be smaller than 0.05 N or greater than 1.0 N, and may also depend on the angle of pulling.

In one embodiment, a rupture line may be formed by weakening the material of the sidewall and/or planar bottom face, for instance, by shaving, folding, perforating with needles, a die or a punch, rubbing with an abrasive material, irradiating, scoring, or etching. It should be noted that while dotted lines may appear similar to perforations, the rupture lines 20 depicted in the drawings may or may not be formed by perforations, or may or may not be perforations. In another embodiment, a rupture line may be formed by strengthening the adjacent sidewall and/or adjacent planar bottom face, for instance, by increasing the thickness of material (as previously described), or by adding a string or ribbon to the baking container. In another embodiment, a rupture line may be formed by both weakening the material of the sidewall and/or planar bottom face, and strengthening the adjacent sidewall and/or the adjacent planar bottom face. In one embodiment, the sidewall and/or planar bottom face that does not form a rupture line is able to resist a maximum force 0.2-10 times greater than the maximum force resisted at the rupture line, preferably 0.8-8 times greater, more preferably 1.5-7 times greater. However, in other embodiments, this maximum force may be more than 10 times greater. In one embodiment, having a greater difference between the two forces reduces the occurrence of the baking container accidentally tearing or breaking outside of a rupture line.

In one embodiment, a rupture line is formed by perforations. Preferably, these perforations are formed with a size and geometry so that the baking container does not leak a liquid ingredient through the perforations. For example, in one embodiment, a needle may puncture all the way through a sidewall in order to create a perforated hole, but due to the elasticity of the sidewall, the hole may close and seal itself. In another related embodiment, a perforated hole may be large enough to allow passage of air, but small enough to retain a viscous liquid, such as a cake batter.

In one embodiment, the perforations are dots, pinholes, or substantially circular holes. Here, the dots, pinholes, or holes may have an inner diameter of 0.05-1.00 mm, preferably 0.10-0.85 mm, more preferably 0.30-0.80 mm. However, in some embodiments the dots, pinholes, or holes may have inner diameters smaller than 0.05 mm or larger than 1.00 mm. In one embodiment, the perforations may be considered micro perforations.

In one embodiment, the perforations may comprise elongated slits, having widths of 0.05-1.00 mm, preferably 0.10-0.85 mm, more preferably 0.30-0.80 mm, and aspect ratios (length:width) of 1.5:1-5:1, preferably 1.7:1-4:1, more preferably 1.8:1-3:1, though in some embodiments, the slits may have aspect ratios of less than 1.5:1 or greater than 5:1. As mentioned previously, in some embodiments, the slits may not be a continual opening through the sidewall and/or planar bottom face, but may instead be sealed or shut by the elasticity of the material.

In one embodiment, the perforations comprise elongated slits having an elongated axis along a rupture line. In a different embodiment, the perforations comprise elongated slits having an elongated axis at an angle to a rupture line, for instance, the slits may form an angle of 20°-60°, preferably 30°-55° to the path of the rupture line, where the path of the rupture line is defined by connecting the center of each elongated slit. In other embodiments, perforations or other structures may form rupture lines of different shapes or patterns. For instance, rupture lines may be formed with shapes similar to a sawtooth wave, a sinusoidal wave, a rectangular wave, a trapezoidal wave, or some other variation. In one embodiment, the forms of two or more ruptures lines may be symmetric with each other, or asymmetric.

In one embodiment, the perforations on the sidewall and/or the planar bottom face may be spaced by 0.5-1.5 mm, preferably 0.7-1.2 mm, more preferably 0.8-1.0 mm, though in some embodiments, the perforations may be spaced by less than 0.5 mm or greater than 1.5 mm.

Figure 41:
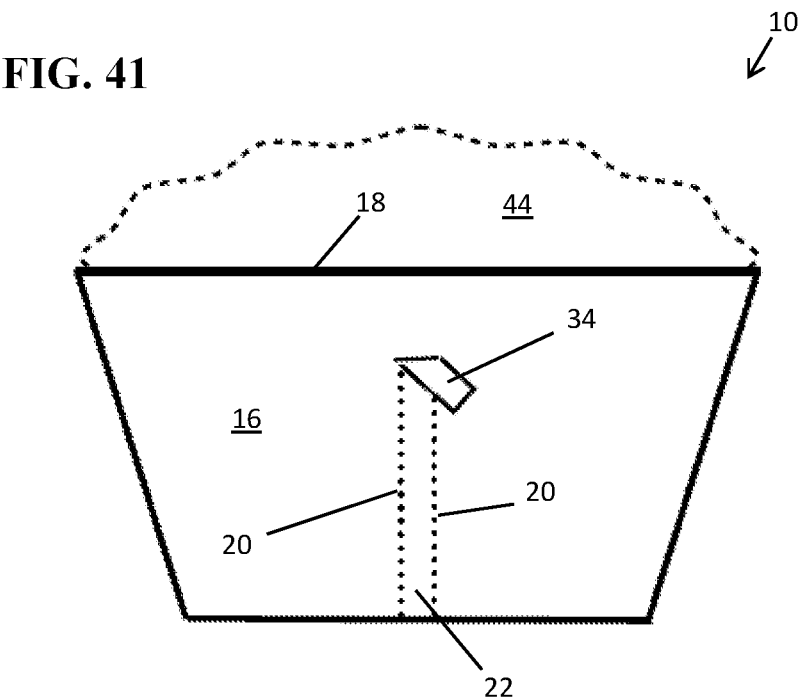
FIG. 41 is a side view of a baking container containing a foodstuff and having a strip and pull tab that start partway up the sidewall.

In one embodiment, a rupture line may be formed by shapes similar to those mentioned for the perforations, except that the shapes are merely depressions or scores on the sidewall and/or planar bottom face, rather than openings or apertures that traverse through the sidewall and/or planar bottom face to the interior of the baking container. In some embodiments, perforations, scores, a fold, a sticker, a ribbon, or a string may not be continuous along an edge of the baking container. For instance, a strip may start partway up a sidewall, as shown in FIG. 41, or may start on the planar bottom face. In another embodiment, where perforations, scores, a fold, a sticker, a ribbon, or a string do not continue along an edge, the container may not be configured to be torn at one end, or may be configured to have a relatively uncontrolled tear, which may remove a greater portion of the baking container. Depending on the mechanical properties of the materials used, it may be sufficient to provide rupture lines for a controlled tear of a short distance, which then leads to an uncontrolled tear that connects with an opposite side of the baking container.

In another embodiment, the perforations may be a mix of shapes, for instance, perforations may be formed with pinholes and elongated slits, for instance, in a pattern of alternating dots and dashes. Similarly, a rupture line may comprise varying perforations or weakened areas in order to require varying forces for tearing. For instance, a rupture line or strip may tear easily to a certain point on the sidewall or planar bottom face, and then require a slightly greater force to continue the tear. This feature may provide a tactile sensation to tearing the rupture line or strip to certain extents, for instance, halfway across a sidewall.

In one embodiment, a baking container may have a single rupture line. Here the baking container may comprise a planar bottom face, having a periphery: a sidewall extending from the periphery to a rim; and a rupture line extending from the rim to a first point on the periphery, and extending from the first point to a second point on the periphery. Preferably, in this embodiment, a string, a sticker, a fold, or a ribbon is located along the rupture line, similar to the embodiments shown in FIGS. 44 and 45. Alternatively, a notch, cut, depression, fold, or a lack of material in the rim may be present to locate a single rupture line, as shown in FIGS. 63, 68, 69, and 90. In related embodiments, a baking liner with a single rupture line may have a rupture line following any sort of path as mentioned for a strip in the other embodiments described herein. This includes its path or position on the side wall, planar bottom face, and/or connecting different points on the baking container.

For instance, the baking container may have a single rupture line extending from the rim to a first point on the periphery, and extending from the first point on the periphery to a second point on the planar bottom face located within the periphery. Similar to the strip, the rupture line is also configured to be torn to open the sidewall to ease removal from and/or consumption of a baked foodstuff contained therein. In one embodiment, the rupture line further extends to a third point located on an opposite side of the periphery from the first point. In another embodiment, rupture line further extends from the third point to a fourth point located on an opposite side of the sidewall from the first point. In another embodiment, a rupture line further extends from the third point to a fifth point located on the rim.

In one embodiment, a baking container has a planar bottom face, having a periphery; a sidewall extending from the periphery to a rim; a first rupture line extending from the rim to a first pair of points on the sidewall; and a second rupture line and a third rupture line both extending from the first pair of points along a circumference of the sidewall. The second and third rupture lines form a strip configured to be torn along the two rupture lines, and the strip is configured to be torn to open the sidewall to ease removal from and/or consumption of a foodstuff contained therein while leaving a bottom portion of the baking container in contact with the foodstuff.

Figure 8A:
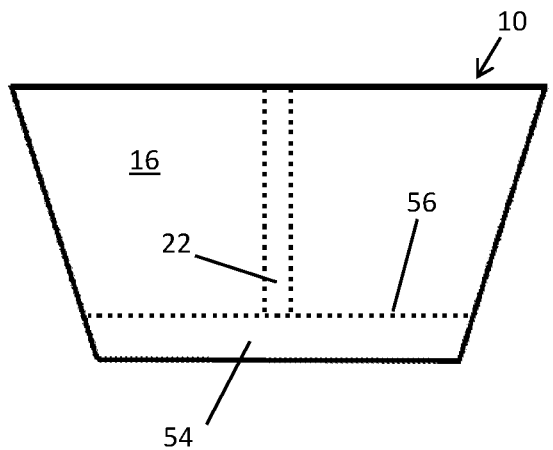
FIG. 8A is a baking container having a strip intersecting with circumferential rupture lines.
Figure 12:
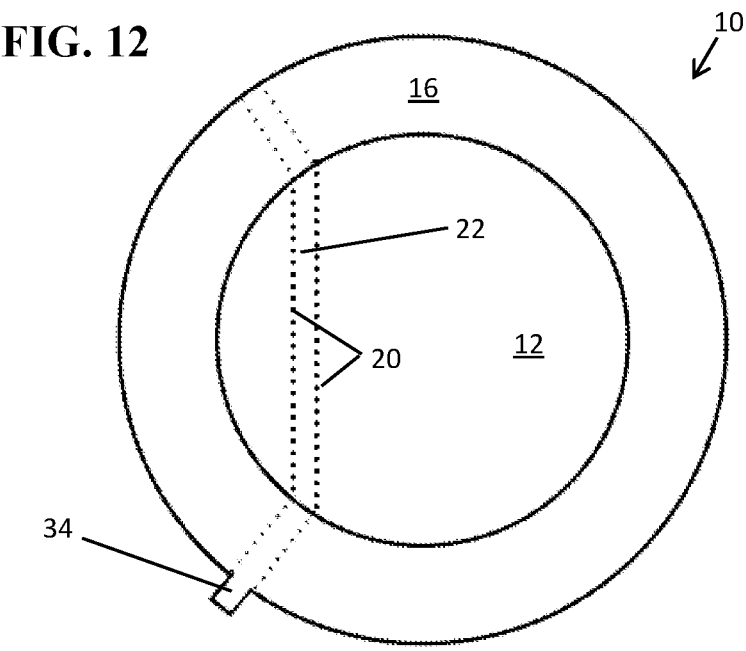
FIG. 12 is a top view of a baking container showing an off-center strip with a pull tab.

In one embodiment, a baking container may have a combination of both double rupture lines forming a strip, and a single rupture line that does not form a strip. Preferably the double and single rupture lines in this embodiment are connected with one another, as in FIG. 8A, though in other embodiments, they may not be connected. It is equally envisioned that for any embodiment described herein that mentions single ruptures lines, double rupture lines forming a strip, or baking containers having a combination of both, it would be possible to adopt embodiments where single rupture lines are exchanged for double rupture lines forming a strip, and double rupture lines or a tear strip are exchanged for a single rupture line. For instance and without limitation, as indicated by the drawings, FIGS. 73A-B, 74A-B, 75A-B, 76A-B, 77A-B have single rupture lines in positions similar to the tear strips of FIGS. 1A-B, 2A-B, 3A-B, 4A-B, and 5A-B. FIG. 12 has a tear strip following a path similar to the single rupture line of FIG. 78.

Figure 10:
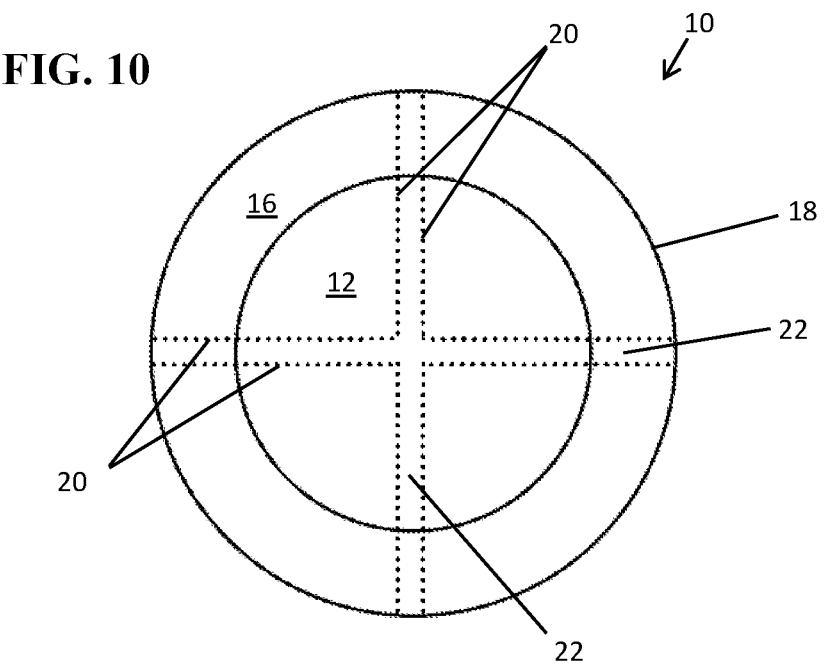
FIG. 10 is a top view of a baking container showing multiple, intersecting strips.
Figure 11:
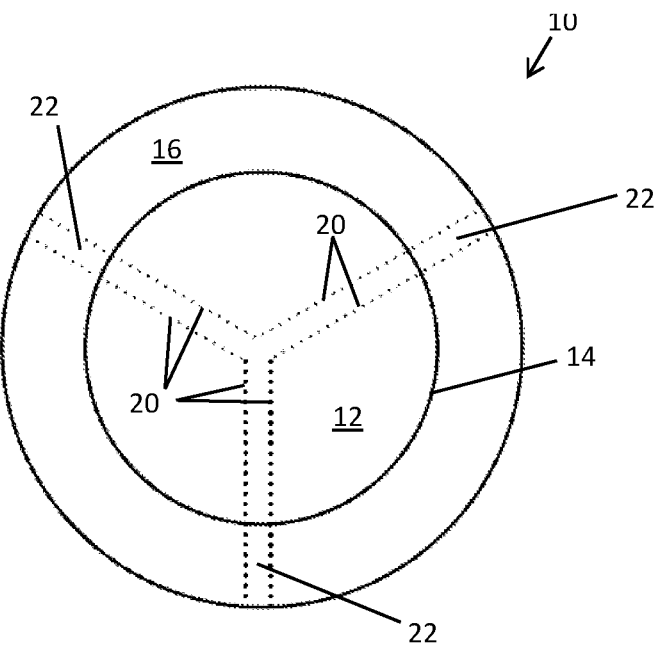
FIG. 11 is another top view of a baking container showing multiple, intersecting strips.

In one embodiment, a baking container may comprise more than one strip, fold, sticker, ribbon, or string, or more than two rupture lines. FIGS. 10 and 11 show examples of related embodiments. In one embodiment, rather than pulling a strip, fold, sticker, ribbon, or string away from the baking container, a strip, fold, sticker, ribbon, or string may be pulled through the interior of the baking container, and thus through a foodstuff inside. In this embodiment, the strip, fold, sticker, ribbon, or string is designed to cut through a soft foodstuff, such as a cheesecake, and multiple strips, folds, stickers, ribbons, or strings in this configuration may be used to create portions of a foodstuff, for instance, dividing a cake into six similar pieces. In one embodiment, a ribbon, fold, sticker, or string may be pulled through the interior of the foodstuff to cut it, while the strip along the original location of the ribbon, fold, sticker, or string may be pulled away from the baking container, in order to separate the container. In other embodiments, a strip, with or without a reinforcing ribbon, fold, sticker, or string, may be pulled through a foodstuff to simultaneously cut the foodstuff and separate the container.

In one embodiment, the sidewall and the planar bottom face are formed from the same material. In a further embodiment, the sidewall and the planar bottom face may be formed from a planar piece of material which is shaped into the baking container. This shaping may involve folding, pleating, or fluting the sidewall. In another embodiment, the sidewall may be cut and adhered with an overlap in order to form the rim or the planar bottom face. In other embodiments, the baking container may be formed from two or more pieces of material folded, adhered, stapled, or otherwise attached together. For instance, some baking containers may be constructed by attaching the sidewall to the planar bottom face, in a manner similar to a DIXIE cup or some other paper cup. In related embodiments, where a baking container is formed by attaching a sidewall to a planar bottom face, the planar bottom may have an upward or downward turned edge, for instance, forming the shape of a U or an inverted U. FIGS. 24-28 show different configurations of how the sidewall and planar bottom face may be attached together.

In one embodiment, a strip may be formed within or placed inside a baking container, as shown in FIGS. 72A and 72B, which is a similar arrangement to a tongue of a shoe. Here, the strip is attached to an interior sidewall, near the periphery within the baking container. The strip is mostly visible through a cut in the sidewall, except along the side and bottom edges of the strip. It is envisioned that similar to the tongue of a shoe, the sides of the strip are not attached to the sidewall. Instead, the sides of the strip may be held in place by frictional coupling with the interior sidewall, especially if a foodstuff is within the baking container. The top of the strip may then be pulled outwards from the top to open the baking container from the side, easily opening a large portion of the sidewall. It is similarly envisioned that this embodiment may be adapted to having the sides of the strip attached by folding the sidewall inward, or may be adhered to the sidewall with an adhesive. The embodiment may be adapted to a baking container being formed of a single material, and the strip may or may not have rupture lines along its edges.

Figure 17A:
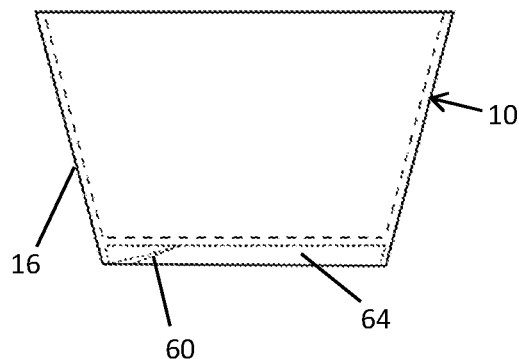
FIG. 17A is a sagittal view of a baking container having a bottom fold and a recessed bottom.
Figure 17B:
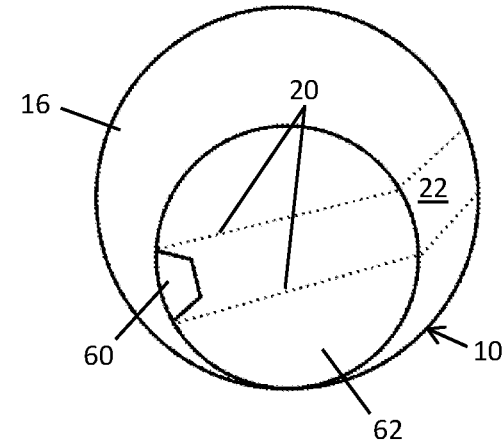
FIG. 17B is a bottom view of the baking container in FIG. 17A, having a strip that crosses the bottom from the bottom fold.

In one embodiment, a baking container has a recessed bottom, or in other words, has a bottom edge projecting from the periphery in a direction away from the rim. In this embodiment, the bottom edge may enable a baking container to sit on a flat surface with a space between the planar bottom face and the flat surface. In one embodiment, the bottom edge may enclose a plane that is substantially parallel to the planar bottom face, though in some embodiments, the bottom edge may enclose a plane that is not substantially parallel to the planar bottom face. In one alternative embodiment, protrusions, feet, or other supports may extend from the periphery or from the planar bottom face. A benefit of the recessed bottom is that it may keep the bottom side of the planar bottom face, which may be greasy from baking, from touching a surface. Another benefit of the recessed bottom may be that a pull tab folded under the bottom of the baking container is easily accessible, as it may not lie flat against the planar bottom face. An example of this is shown in FIG. 17A. In another variation, a baking container having a recessed bottom may not have a bottom folded pull tab as shown in FIG. 17B, but may instead have a part of the bottom edge of the sidewall forming a pinch point for tearing. Or, in other words, a pull tab may form part of the bottom edge of the sidewall.

In one embodiment, a recessed bottom may have a height of 1-7 mm, preferably 2-6 mm, more preferably 3-5 mm above the bottom edge of the sidewall, though in some embodiments, the height may be less than 1 mm or greater than 7 mm. A baking container having a recessed bottom does not require a continuous bottom edge of the sidewall, as it may be possible to have breaks in the bottom edge of the sidewall while providing support to the baking container.

In one embodiment, a baking container has a strip that is shaped as a pull tab or further comprises a pull tab. The pull tab may have a longest dimension or length of 1-3 cm, preferably 1.2-2.8 cm, more preferably 1.5-2.5 cm, though in some embodiments, the pull tab may have a length of shorter than 1 cm or longer than 3 cm. In some embodiments, the pull tab may have a length smaller, substantially similar to, or larger than the width of a strip.

For instance, the pull tab may have a width of 0.5-2.5 cm, preferably 0.6-2.2 cm, more preferably 0.8-2.0 cm, though in some embodiments, the pull tab may have a width smaller than 0.5 cm or larger than 2.5 cm. The pull tab may have a width smaller, substantially similar to, or larger than the width of the strip. In some embodiments, the pull tab may be substantially flat (with a thickness similar to the sidewall), while in other embodiments, the pull tab may be folded into a shape or have a three-dimensional shape, with a thickness larger than the sidewall.

In one embodiment, the pull tab is formed by the strip extending beyond the rim, though in other embodiments, the pull tab may be formed by adhering or attaching an additional material to the strip or sidewall, such as a sticker. For instance, a sticker may have an adhesive on only one segment, enabling a non-adhered region to either protrude from the surface or be lifted easily by a person's fingers. FIG. 71 shows an example of a pull tab having a protruding region and an adhered region. Additionally, a pull tab may be formed by two or more notches in the rim, as shown by the square notches in FIG. 70 and the V-shaped notches in FIG. 71. A pull tab formed by a notch in the rim may additionally have a fold or sticker, for instance, FIG. 68 has both a notch and a fold.

Due to the greasiness that sometimes results from baking, a pull tab may have additional texture in order for a user to easily grasp a pull tab without it slipping. A pull tab may have an additional protrusion to provide more surface area for grasping, as shown in FIG. 67. Thin pull tabs with the additional texture, such as in FIGS. 66 and 69, enable the pull tabs to be easily grasped without using more of the baking liner material. It is envisioned that such texturing may be achieved by depressions or scores (such as those mentioned for the rupture line) or by coating with heat resistant material. Pull tabs may be strengthened or reinforced as previously mentioned for the baking container sidewall.

In an alternative embodiment, a baking container may have no specific rupture lines, but may have one or more stickers attached. In some embodiments, adhered pull tabs may be considered equivalent to stickers, though in some embodiments, stickers may be considered a more ornamental form of a pull tab. The one or more stickers may be configured to pull a sidewall away from a baked foodstuff, with or without tearing. In one embodiment, the one or more stickers may be semicircular and arching, similar to bucket handles or the rings of Saturn. In this alternative embodiment, stickers may have an adhesive strength that allows them to be placed anywhere on an exterior of a baking container so that they can be pulled to tear apart the baking container or separate it from a baked foodstuff.

In one embodiment, a baking container may be configured to be separated from a foodstuff by one hand when placed on a flat surface or on the palm of the opposite hand. In this embodiment, one or more rupture lines may enable the sidewall and/or planar bottom face to be easily torn. It is further envisioned that a baking container with a foodstuff may be lifted from a strip, pull tab, sticker, fold, or string, and the weight of the foodstuff may cause the strip to tear entirely or partially off. Alternatively, if the weight of the foodstuff is not sufficient to tear the sidewall, a person may shake or flick the baking container while grasping a strip, fold, sticker, pull tab, or string. For certain positions of strips and rupture lines on the baking container, such as in FIGS. 29 and 30, this shaking or flicking may rotate or spin the baking container.

In a similar embodiment, a baking container may have one end of a strip being easily torn, while the other end is configured to stay attached to the baking container. In this embodiment, lifting, shaking, or flicking the baking container while grasping a strip, pull tab, or string may tear off the sidewall and remove the remainder of the baking container in one piece.

In one embodiment, a baking container may have more than one strip, more than one pull tab, and/or more than one fold. For instance, a baking container may have more than one pull tab shaped to form a pair of ears, as in FIG. 33, or feet, as in FIG. 34. In another embodiment, a baking container may have at least two pull tabs located across from one another. As the pull tabs may have a low heat capacity, they may cool more quickly after using the baking container for baking. A person may use the two pull tabs to lift a baking container from a baking pan (for instance, lifting a baking container out of a cupcake pan, where the baking container holds a hot, freshly-baked cupcake).

Figure 43:
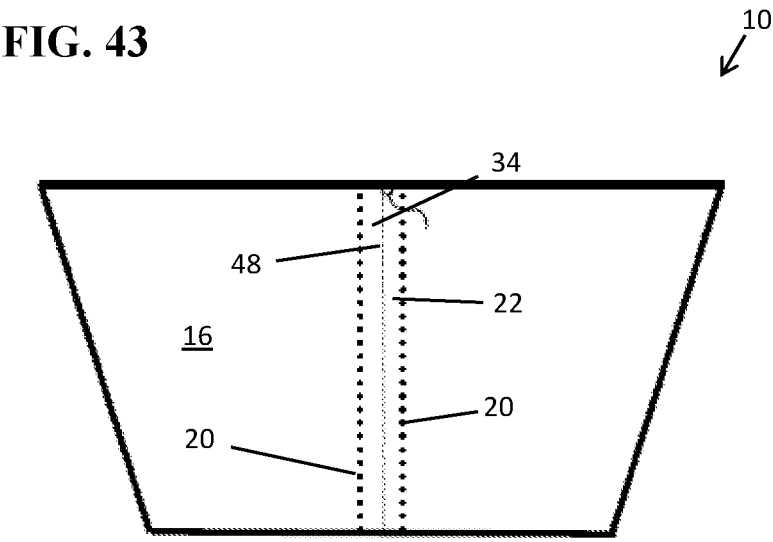
FIG. 43 is a side view of a baking container having a strip reinforced by a string along the middle of the strip.
Figure 44:
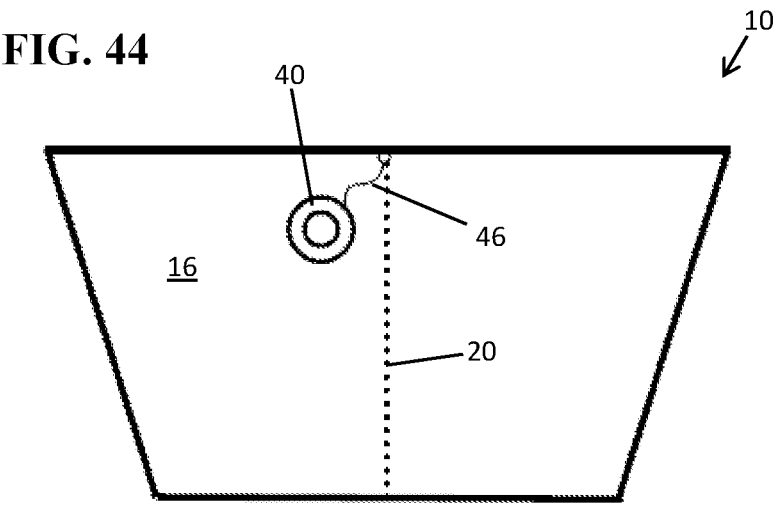
FIG. 44 is a side view of a baking container having a single string with a ring creating a single rupture line.
Figure 45:
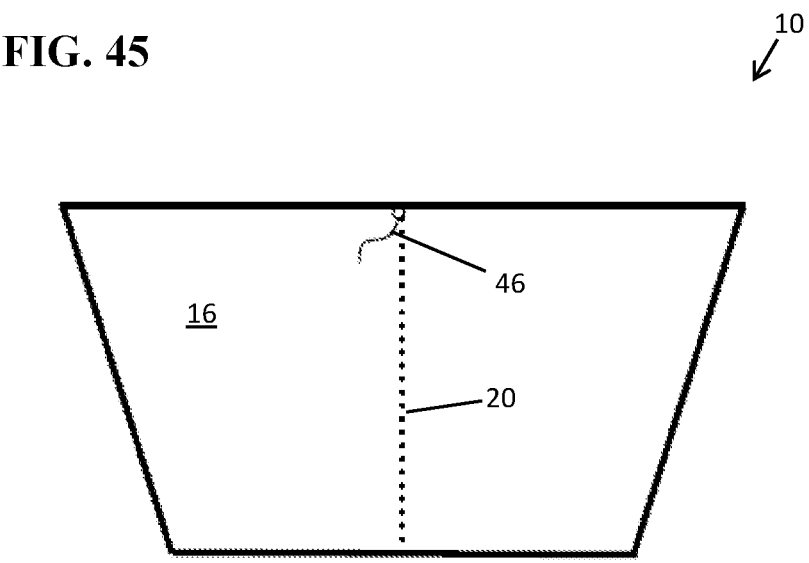
FIG. 45 is side view of a baking container having a single string creating a single rupture line.

In one embodiment, a strip or rupture line on a baking container may be located by different coloring or texturing, or the rupture lines may be formed by perforations or scores that are easily visible. In other embodiments, a pull tab may extend beyond an edge of a baking container and be readily visible, and may furthermore be colored differently than the rest of the container. In some embodiments, a pull tab may be noticeable by being large, decorative, and/or protruding from a part of the sidewall, as in FIGS. 35-38 and 41. In some embodiments, the pull tab may have a width substantially similar to the width of the strip, as shown in FIGS. 6A, 6B, 12, 29, 38, 40-42, 46, 58, and 59. In some embodiments, the pull tab may have a width smaller than the width of the strip, such as in FIGS. 60-62, 64, 70, and 71. In other embodiments, a ring and/or string may be used in place of a pull tab, as shown in FIGS. 43-45.

Figure 13:
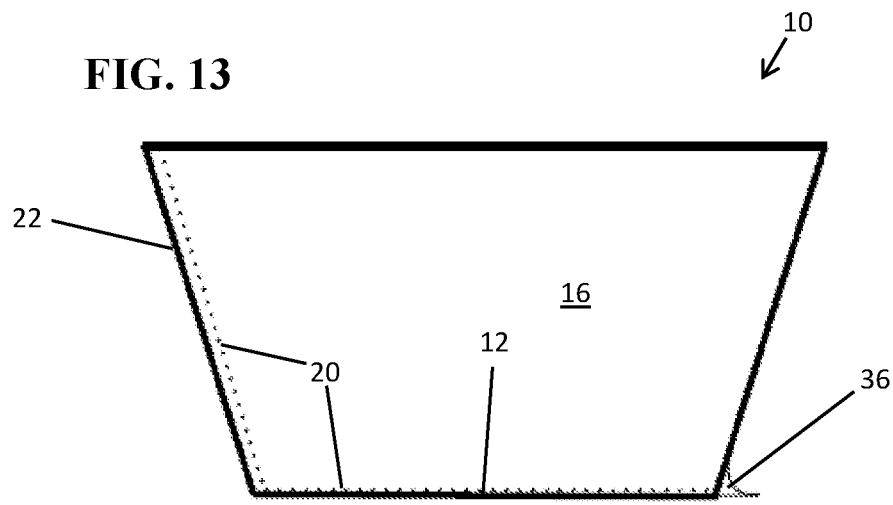
FIG. 13 is a side view of a baking container with a pinch point at the end of the strip.
Figure 14:
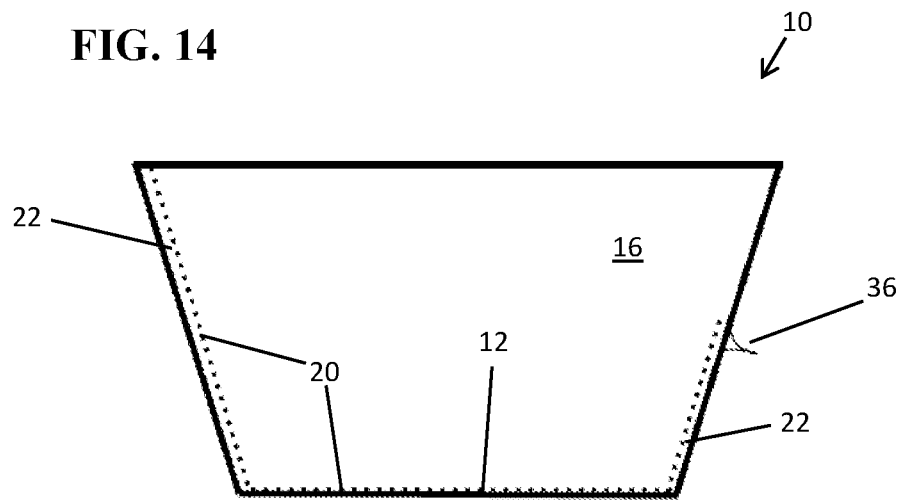
FIG. 14 is a side view of a baking container having a pinch point part way up the sidewall.
Figure 15:
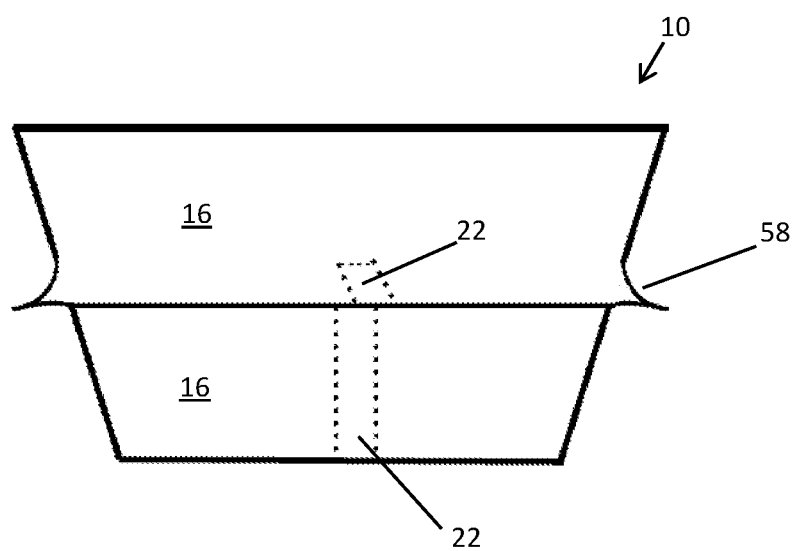
FIG. 15 is a side view of a baking container having a circumferential fold, part of which may be used as a pinch point for tearing.

In one embodiment, a baking container may have an edge or a corner of a strip that forms a pinch point for pulling the strip from the baking container. In one embodiment, this pinch point may simply be a designated part of the periphery (with or without additional coloring or labels), and may or may not have additional reinforcement by string, ribbon, or additional material. In some embodiments, the pinch point may be formed or folded so that it protrudes and is easily visible, as shown in FIGS. 13 and 14. In the embodiment of FIG. 13, the strip may be torn from the periphery, across the planar bottom face, and up the sidewall to the rim. However, the strip may also be torn from the opposite direction and/or from multiple directions. A related pinch point variation has a circumferential horizontal fold with a tear strip, as shown in FIG. 15, or without a tear strip, not figured.

Figure 18:
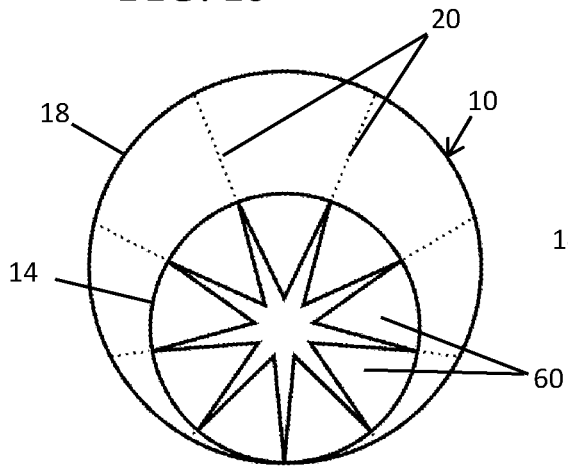
FIG. 18 is a bottom view of a baking container with an arrangement of folds and rupture lines.
Figure 19:
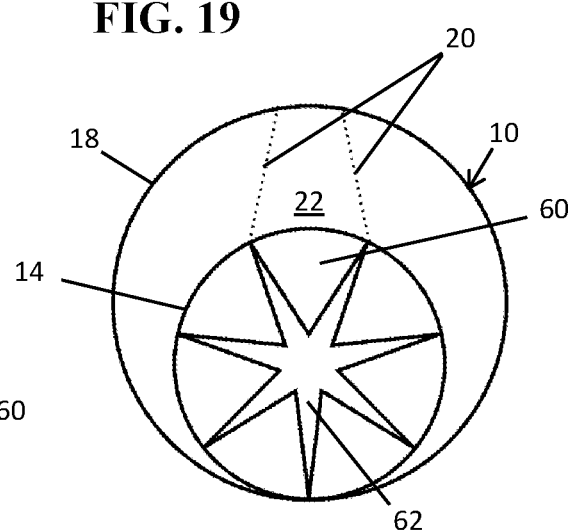
FIG. 19 is a bottom view of another baking container with an arrangement of folds and rupture lines.
Figure 20:
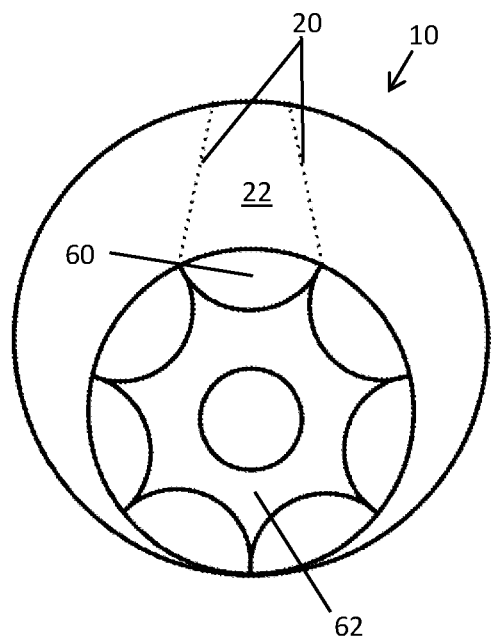
FIG. 20 is a bottom view of another baking container with an arrangement of folds and rupture lines.
Figure 21:
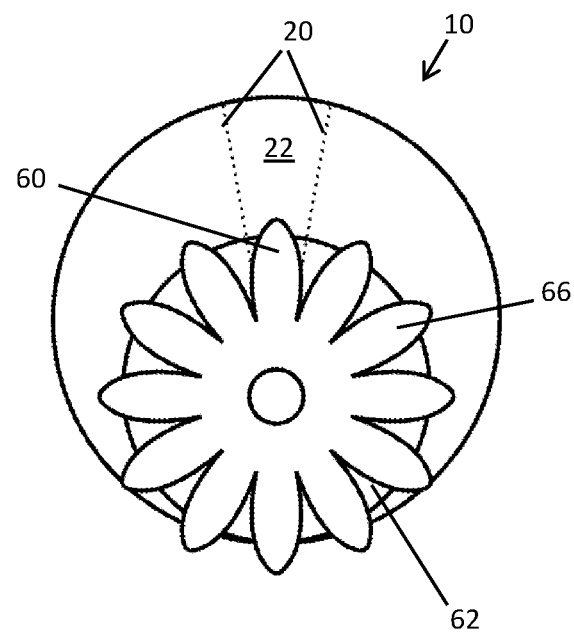
FIG. 21 is a bottom view of a baking container with an arrangement of folds and rupture lines, where the folds are part of a decoration.
Figure 22:
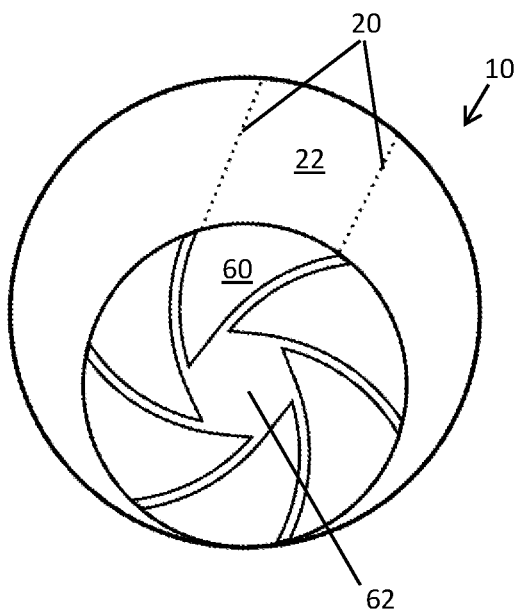
FIG. 22 is a bottom view of a baking container with an arrangement of folds and rupture lines.

In one embodiment, a baking container has a pull tab or fold located on a bottom side of the planar bottom face, as depicted in FIGS. 16A-22. The pull tab or fold in this arrangement may connect with a strip or ribbon, or may be aligned with one or more rupture lines. A baking container may have any number or arrangement of folds or tabs on its bottom, some of which may be functional pull tabs, though in some cases, all may be functional pull tabs, as shown in FIG. 18. In one embodiment, these bottom folds and tabs may be formed in any shape or arrangement. In some preferred embodiments, bottom folds and tabs may be arranged in decorative patterns. In another embodiment, a pull tab may be formed integral with the sidewall adjacent to a recessed bottom.

Figure 54:
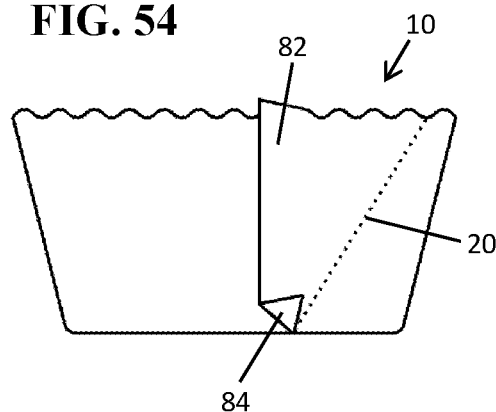
FIG. 54 is a side view of a baking container configured to be opened from a seam, which will then tear along a rupture line.
Figure 55:
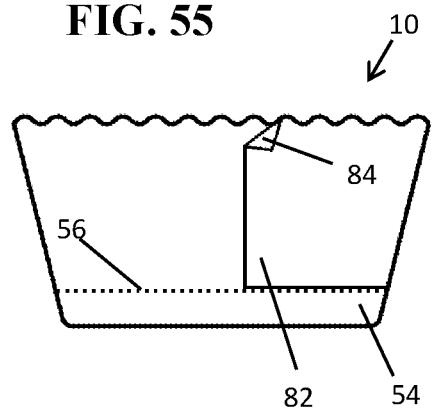
FIG. 55 is a side view of a baking container configured so that opening the container from a seam leads to tearing along a circumferential rupture line.

In some embodiments, a baking container may have a seam from which a sidewall may be opened, torn, or peeled away. In particular embodiments, the sidewall may be formed from a flat piece of material that is wrapped around to adhere or connect opposite ends, similar to the construction of a paper cup (e.g. DIXIE cup). In these embodiments, the sidewall seam may be opened from the top corner, bottom corner, and/or middle part of the seam. A seam may have a portion that is not adhered so that someone can easily start peeling from it. A baking container may be opened from a seam that does not tear along one or more designated rupture lines or a designated path of tearing. However, seams may be easily configured with one or more rupture lines as shown in FIGS. 54 and 55, and with strips. In some cases, the seam may be used as a reinforced ribbon for tearing, as described elsewhere, given that the seam has an overlapping and thus reinforced sidewall. FIG. 55 provides for a baking container that may be opened in a manner similar to removing a soup can label, while leaving a bottom portion of the container.

Figure 56:
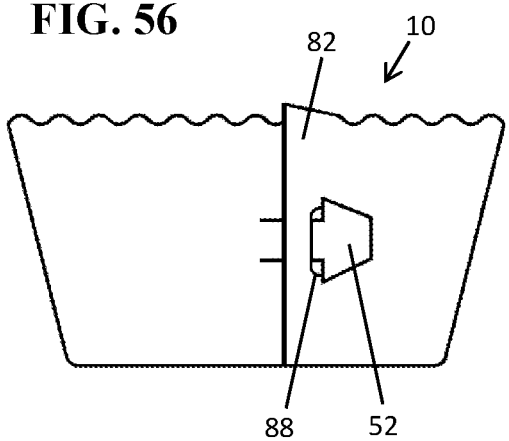
FIG. 56 is a side view of a baking container where the sidewall is fastened by a tab and a slot.
Figure 57:
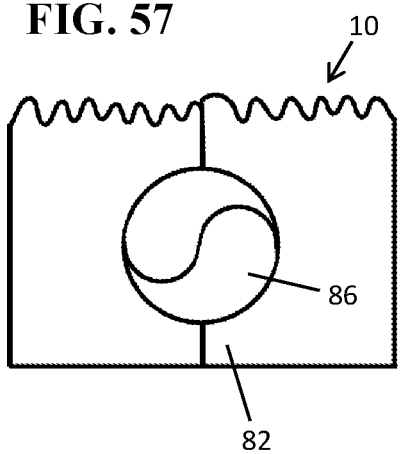
FIG. 57 is a side view of a baking container having a sidewall fastened by a symmetric clasp.

In one embodiment, a seam may be held by an adhesive, though in other embodiments, seams may be held together by structures such as clasps, latches, tabs, twists, or other connectors. The connectors may be asymmetric, such as a male and female connector (FIG. 56), or symmetric, such as a yin-yang shaped clasp (FIG. 57). These structures may be formed from the same material as the sidewall (for instance, cut from a single piece of paper), or may be adhered to the sidewall. In further embodiments, opening the sidewall from these structures may also leave a separated bottom portion of the baking container.

In one embodiment, a height of the sidewall perpendicular to the planar bottom face varies along the periphery. In this embodiment, the rim may enclose a planar shape (for example, a conic section), however, the planar shape may not be parallel with the planar bottom face. However, in another embodiment, the height of the sidewall perpendicular to the planar bottom face varies along the periphery, and the rim does not enclose a planar shape. In this embodiment, the rim may be rolled or beaded, and/or may form waves, dips, points, or a flower shape. In one embodiment, the rim comprises a different material than the sidewall, or may be attached separately to the sidewall. In another embodiment, the rim comprises the same material as the sidewall.

In one embodiment, an average height of the sidewall may be 1-30 cm, preferably 1.5-20 cm, more preferably 2-10 cm, even more preferably 3-8 cm. However, in other embodiments, an average height of the sidewall may be less than 1 cm or greater than 30 cm.

In one embodiment, the rim may be rolled, beaded, flanged, or folded. In a further embodiment, one or more sides of a rectangular baking container may fold over the opening of the baking container, partially or completely, in order to allow two or more baking containers to be stacked without the containers collapsing into each other.

In one embodiment, the planar bottom face is substantially circular, for instance, as a common cupcake or muffin liner. In another embodiment, the planar bottom face may be oblong and rounded, for instance, as an oval or ellipse. In another embodiment, the planar bottom face may be rectangular or substantially square. In alternative embodiments, the planar bottom face may form different shapes with straight and/or curved edges, for instance, a semicircle.

A substantially circular planar bottom face may have a diameter of 2-25 cm, preferably 2.5-20 cm, more preferably 3-15 cm, even more preferably 3.5-10 cm. However, in other embodiments, the planar bottom face may have a diameter of less than 2 cm or greater than 25 cm.

In one embodiment, where the rim and the planar bottom face are substantially circular, the ratio of the rim diameter to the ratio of the periphery diameter may be 1:1-2:1, preferably 1.05:1-1.80:1, more preferably 1.08:1-1.20:1, where a ratio of 1:1 may denote that the sidewall forms a right cylinder.

In one embodiment, a baking container with a substantially circular planar bottom face may have a shape and size similar to a common pie tin, a deep-dish pie tin, or a 9-inch round baking pan. In other embodiments, a baking container with a substantially circular planar bottom face may have a shape and size similar to a common muffin or cupcake liner, or a "mini" muffin or "mini" cupcake liner. In one embodiment, a baking container may have a shape as a tube pan, similar to an angel food cake pan or a BUNDT cake pan.

A substantially rectangular planar bottom face may have a width of 4-30 cm, preferably 6-25 cm, more preferably 8-20 cm. A substantially rectangular planar bottom face may have an aspect ratio (length:width) of 1:1-10:1, preferably 1:1-4:1, more preferably 1:1-3:1, though in some embodiments, the aspect ratio may be greater than 10:1.

In one embodiment, where the rim and the planar bottom face are substantially rectangular, the ratio of the diagonal of the rim to the diagonal of the planar bottom face may be 1:1-2:1, preferably 1.05:1-1.80:1, more preferably 1.1:1-1.7:1. In one embodiment, a baking container having a substantially rectangular planar bottom face may have a shape and size similar to an 8-inch square pan, a 9×13-inch pan, or a casserole dish.

In alternative embodiments, a baking container may have a rounded bottom face (i.e. non-planar), which may be used for rounded items like cake pops, dumplings, takoyaki, popcorn balls, or kuih bahulu.

In one embodiment, an angle formed by the sidewall and the planar bottom face is 90°-135°, preferably 92°-105°, more preferably 93°-100°, though in some embodiments, the angle formed may be less than 90° or greater than 135°. In one embodiment, the angle may be relatively constant along the sidewall, for instance the angle may not vary by more than 5° of the average sidewall angle. In other embodiments, the angle may vary by more.

In embodiments where the baking container has a rectangular planar bottom face, the sidewall may be in the form of four quadrilaterals (for instance, four trapezoids), each intersecting the planar bottom face at an angle. This angle may be similar for all four quadrilaterals, or only two or only three quadrilaterals may share similar angles. In an alternative embodiment, all four quadrilaterals may have different angles.

Figure 46:
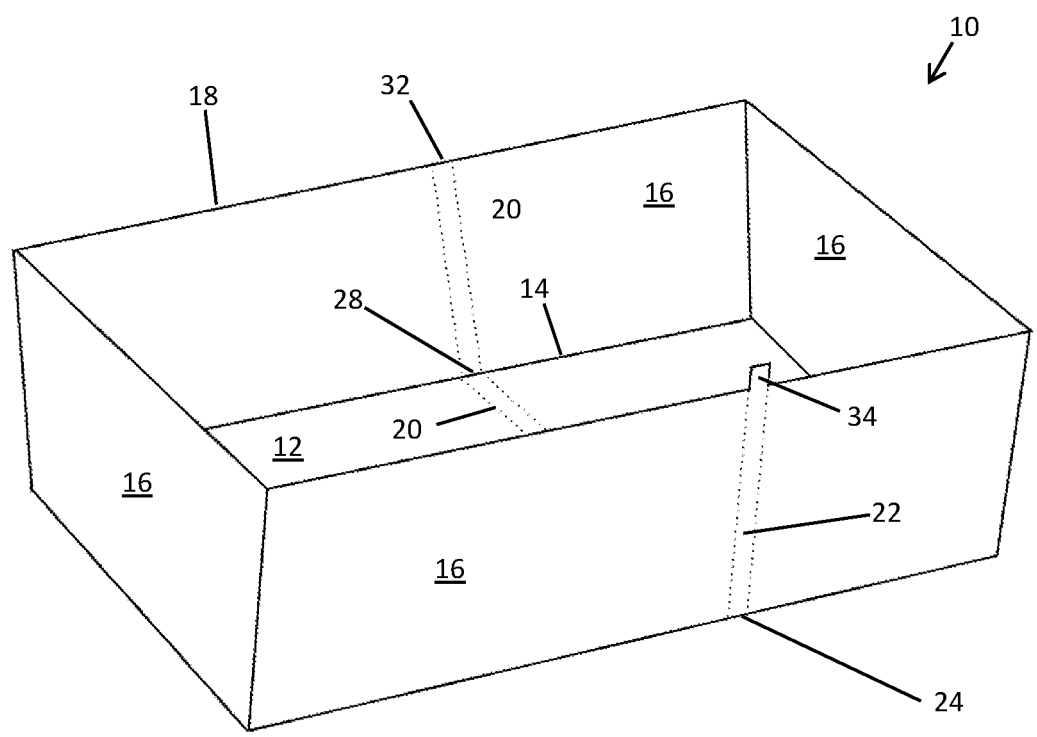
FIG. 46 is a perspective view of a rectangular baking container having an off-center strip.
Figure 90:
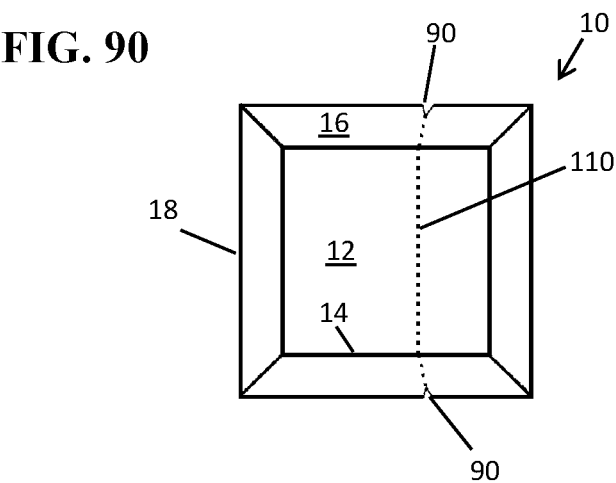
FIG. 90 is a top view of a baking container with a rectangular planar bottom face, and a rim-to-rim rupture line that starts and ends at notches in the rim.

In embodiments where the baking container has a rectangular planar bottom face and the sidewall is in the form of four quadrilaterals, the one or more rupture lines may pass through a central region of one of the four quadrilaterals. In another embodiment, the one or more rupture lines may be off-center, for instance, at a third or a quarter of the length of the quadrilateral. FIG. 46 shows an example embodiment of a baking container with a rectangular planar bottom face and off-center rupture lines. FIG. 90 shows an example embodiment of a baking container with a rectangular planar bottom face and a single off-center rupture line. In another embodiment, the one or more rupture lines may be formed along or within a corner of the sidewall.

In one embodiment, the baking container may be used to hold a cake or muffin batter while baking. However, it is envisioned that that baking container may be used successfully for several other foods, especially those that may be liquid or viscous when added to the baking container, and then hold their shape within the baking container (possibly against the edges of the interior) after baking, cooking, cooling, drying, or setting. For instance, the baking container may be used with yeast dough (e.g. panettone), unleavened dough, grains, grain-free dough, ground meat, pizza, calzone, bar cookies, dried fruit, pudding, gelatin, kuih, custard, flan, cheese cake, baked pasta, pastry, baked egg dishes, cheese, soup dumplings, chocolate, filled or layered chocolate (e.g. REESE'S PEANUT BUTTER CUPS), fudge, candy, butter, ice cream, ice desserts, puffed grain snacks (e.g. RICE KRISPIES TREATS), nut butter, tofu, or some other foodstuff.

In one embodiment, a raw or partially prepared foodstuff may be packaged in a baking container and distributed for sale. Here, the foodstuff may be raw, frozen, refrigerated, dehydrated, partially baked, or may be missing one or more ingredients (such as missing water or eggs). A consumer may then prepare the foodstuff by adding needed ingredients and baking, without having to use additional containers.

In one embodiment, the baking container may comprise a top cover or lid attached to a part of the rim. The top cover or lid may be integral with the sidewall or attached separately. In one embodiment, this top cover or lid may be closed while baking, in order to contain steam. Cooking or baking with the top cover or lid closed may be similar to en papillote or al cartoccio cooking, that is, cooking within a sealed package. In another embodiment, the top cover or lid may be closed after baking in order to contain steam and/or heat for a longer time period. In one embodiment, the top cover or lid may seal or close permanently, so that the baking container may only be opened by pulling on the strip or on a pull tab.

In another embodiment, a baking container may comprise a cover or lid, with holes in the planar bottom face, in order to be used for steaming buns, dumplings, cakes, or puddings. In another embodiment, the baking container may be lined with a susceptor for microwave cooking. The susceptor may comprise a metalized film, metal flakes, or ceramics, which absorb microwave radiation and emit heat to a food by conduction or infrared irradiation, similar in function to a "crisping sleeve." A baking container lined with a susceptor may be helpful for crust-browning within the baking container, for instance, of pastries or pies. A baking container may be used with any type of heat source, for example and without limitation, a wood-fired oven, a convection oven, and electric oven, a gas oven, a charcoal grill, a solar oven, a smoker, a STERNO cooking fuel, a non-combustible chemical reaction, or some other heat source.

In one embodiment, one or more baking containers may be formed attached together. For instance, rather than using a standard metal baking pan for a dozen cupcakes, someone may use an array of cupcake-sized baking containers that are linked together. Preferably the baking containers are linked by an attachment that can easily be torn, for instance, attached by paper having a rupture line. In one embodiment, such attached baking containers may be sold or distributed in arrays larger or smaller than 12 baking containers, and a consumer may remove or separate baking containers as needed before use. In another embodiment, an array of baking containers may be formed not by attaching the baking containers to each other, but to an additional structure, or the baking containers may sit within an additional structure.

In one embodiment, the sidewall and/or planar bottom face of the baking container has a thickness of 0.05-0.70 mm, preferably 0.10-0.50 mm, more preferably 0.15-0.40 mm, though in some embodiments, the thickness may be smaller than 0.05 mm or greater than 0.70 mm. For instance, in some embodiments, the thickness may be 0.75-0.80 mm, 0.80-0.90 mm, 0.90-1.00 mm, or greater than 1.00 mm. In one embodiment, the sidewall and/or planar bottom face may comprise only one layer of material, such as one layer of paper, though in other embodiments, the sidewall and/or planar bottom face may comprise two or more layers of material. These two or more layers of material may be the same or different materials, and may be adhered together or not adhered.

In one embodiment, the baking container may further comprise an outer layer, or an outer sidewall layer. Here, the other layer, being on the interior, may be considered an inner layer. In a related embodiment, the baking container may comprise an inner layer having its own sidewall and planar bottom face and an outer layer having its own sidewall and a planar bottom face. The inner and outer layers may comprise similar or different materials, and may have structures similar to those described herein for the baking container. In one embodiment, the inner and outer layers may be of approximately the same heights, though in other embodiments, the inner layer may have a periphery to rim distance that is 5-60%, 10-50%, or 15-40% longer than that of the outer layer. In one embodiment, one of the two layers may not be torn or substantially deformed after removal, and may be used as a plate for a foodstuff. In some embodiments, the inner and outer layers may be textured differently, for example, one layer may be textured while one is smooth or generally untextured. For instance, the outer layer may be ribbed, while the inner layer is smooth.

In one embodiment, the inner and outer layers may be adhered at a part of the planar bottom face without being adhered at any part of the sidewall. In a further embodiment, the inner and outer layers may be adhered at a part of the planar bottom face, and attached, but not adhered at an upper part of the sidewall or at the rim. Here, the upper part of the sidewall or rim may have the inner and outer layers interleaved and threaded with a string or ribbon. The string or ribbon has an end configured to grasped and pulled, and extracting the string or ribbon allows a portion or all of the inner and outer layers to separate at the sidewall. For instance, a string or ribbon may be woven partway, and pulling out the string or ribbon may free a fold or tab on the outer layer for pulling and tearing off the inner layer. A baking container having inner and outer layers may be thought of as having an inner sidewall layer and an outer sidewall layer. In some embodiments, a single planar bottom face may connect with two sidewalls, which may have an arrangement similar to that shown in FIG. 27.

Figure 48:
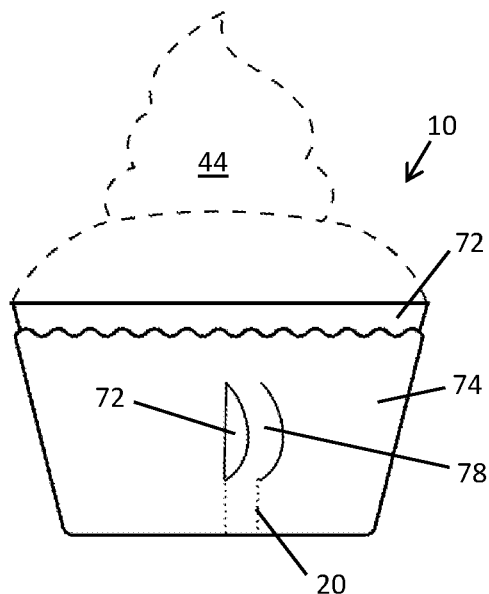
FIG. 48 is a side view of a baking container having inner and outer sidewall layers, with a loop in the outer sidewall layer.
Figure 49:
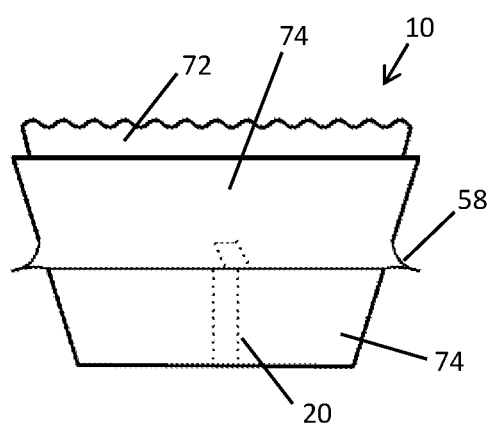
FIG. 49 is a side view of a baking container having inner and outer sidewall layers, where the outer sidewall layer has a circumferential fold.

In one embodiment, the inner sidewall layer may conform to the shape of a baked good, and the outer sidewall layer may protrude further away from the inner sidewall layer at a specific angle or distance. In one embodiment, an outer sidewall layer may comprise one or more folds or protrusions from the inner sidewall layer, and with the layers partly adhered, provides a grip for someone to pull on the outer sidewall layer and tear the inner layer. The folds may be vertical, horizontal, or at some intermediary angle. In one embodiment, the outer sidewall layer may have one or more vertical folds. In particular, the outer sidewall layer may have vertical folds that are each of substantially similar shapes, and may be positioned with rotational symmetry around the sidewall. For instance, an outer sidewall layer may have five vertical folds that provide an aerial view similar to a starfish or five-pointed star, such as that shown in FIGS. 51A-B. In another embodiment, the outer sidewall layer may have a loop protruding outwards, similar to a belt loop, mug handle, or holster, providing a finger grip for pulling and tearing the outer sidewall layer. FIG. 48 shows one such embodiment where the outer sidewall layer has a section forming a loop outwards from the inner sidewall layer. In a related embodiment, rather than a loop, the outer sidewall layer may instead have a pocket to provide a finger grip. In other embodiments, the outer sidewall layer may fold out from the inner sidewall layer, creating a substantially horizontal fold. In one instance, the horizontal fold may encircle a circumference of the inner sidewall layer, as shown in FIG. 49.

Figure 50:
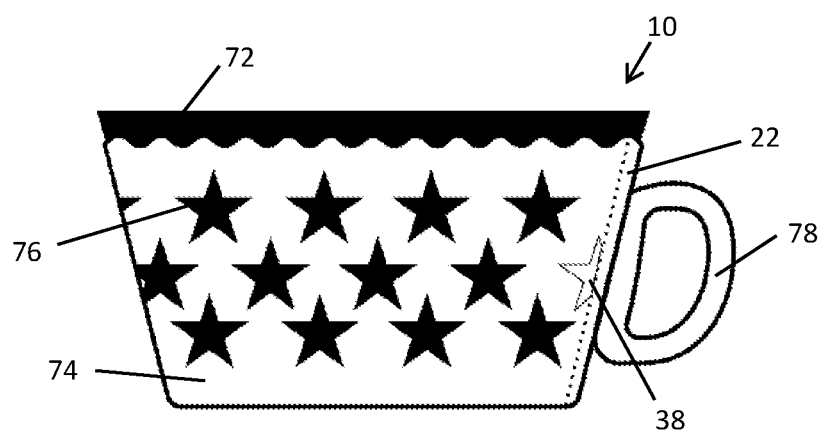
FIG. 50 is a side view of a baking container having inner and outer sidewall layers, where the outer sidewall layer is die cut.

In one embodiment, an outer sidewall layer may have holes through which the inner sidewall layer is visible. Preferably, a different color of the inner sidewall layer is visible. These holes may be formed in decorative shapes or repeating patterns, and may be die cut or laser cut. One such example is shown in FIG. 50. In a related embodiment, a portion or the entire outer sidewall layer may form a mesh, a screen, a transparent film, or a semitransparent film through which the inner layer may be visible.

In one embodiment, the sidewall, planar bottom face, and/or rim of the baking container may be similar to parchment paper, wax paper, greaseproof paper, or bakery release paper. However, in other embodiments, the paper may be similar to a different type of paper, including but not limited to, amate paper, scritta paper, blotting paper, lens paper, bond paper, cardboard, cardstock, cartridge paper, construction paper, cotton paper, crêpe paper, dó paper, glassine paper, India paper, Korean paper (hanji), kraft paper, laid paper, manila paper, newsprint, oatmeal paper (hwangji), onionskin paper, origami paper, butcher paper, rice paper, rolling paper, wrapping paper, copy paper, thermal paper, tissue paper, tracing paper, calendered paper, washi paper, wove paper, paperboard, and xuan paper. In another embodiment, the baking container may comprise non-paper materials that are ovenable and food safe, such as crystallized PET, silicone, or a metal foil, such as aluminum. In other embodiments, the sidewall, planar bottom face, and/or rim may comprise fibers or other materials listed previously for the string and ribbon.

In one embodiment of the baking container, the sidewall is smooth, fluted, folded, ribbed, corrugated, or pleated. In further embodiments, these structures on the sidewall may be decorative, or may be functional, for instance, in providing strength to the sidewall or allowing the baking container to be formed from a single piece of material.

In one embodiment, a baking container has a sidewall that enables a baking container to be self-supporting, meaning that the baking container may be placed on flat surface while a foodstuff within does not adversely deform the sidewall. In this embodiment, the baking container does not have to be used as a liner within a pan, for instance, baking containers in the shape of cupcakes may be placed on a cookie sheet in an oven, rather than being placed within a cupcake pan. As another example, the baking container may be used like a pie plate or a pie tin.

In one embodiment, the baking container may be made of edible material, so that the baking container may optionally be removed prior to consumption. In this embodiment, the baking container may comprise a vegetable starch from rice, potato, corn, cassava, sorghum, wheat, tapioca, arrowroot, yam, sweet potato, or from some other fruit, grain, or vegetable. In a related embodiment, a string, pull tab, or ribbon of a baking container may comprise an edible material, for instance, a pull tab may be made of hard candy or a ribbon may be made of licorice.

In one embodiment, the sidewall and/or planar bottom face of the baking container may have a corrugated layer between two flat layers, similar to corrugated fiberboard or containerboard. In other embodiments, a baking container may not be designed for baking or cooking, but as a food packaging. In this embodiment, other food-safe materials may be used which may otherwise be heat sensitive, such as polyethylene terephthalate (PET), poly (lactic acid) (PLA), or poly (lactic-co-glycolic acid) (PLGA).

In one embodiment, the baking container comprises only materials that are recyclable, or the baking container comprises only materials that are compostable (such as plant fibers and PLGA). In one embodiment, the baking container comprises only materials that are natural or not chemically treated. For instance, the baking container may comprise naturally sourced paper or recycled paper. The baking container may comprise unbleached paper.

In one embodiment, the interior of the baking container may be coated and/or impregnated with a food grade release agent. In some embodiments the food grade release agent may be vegetable oil or starch. In another embodiment, a barrier layer, such as a film consisting of bleached kraft, low density polyethylene, aluminum foil, or a sealant may be added. Alternatively, a liner can be inserted into the baking container after the baking container is fully or partially formed. In related embodiments, the interior of the baking container may be textured so that a foodstuff does not stick to an interior of the sidewall or planar bottom face. Alternatively, the interior may be textured to assist with baking.

In one embodiment, the interior and/or exterior of the baking container may include a graphical treatment or decorative texture. This includes but is not limited to printing, spraying, dipping, dyeing, brushing, embossing, etching, coating, matte coating, gloss coating, high gloss coating, irradiating, burning, embossing, and/or debossing. Additionally, specialty inks can be used such as thermochromic, photochromic, fluorescent, and/or phosphorescent inks. In a related embodiment, the interior and/or exterior of the baking container may include decorations, advertisements, graphics, pictures, text, or different colors. In one embodiment, an interior of the sidewall may include a coupon or a custom message, which may or may not be located on the interior of the strip. In one embodiment, an interior decoration, advertisement, graphic, picture, text, or coloring is not visible from the exterior of the baking container, so that it may not be revealed prior to opening the sidewall. However, in another embodiment, such interior decoration may be partly visible from the exterior.

In some embodiments, the baking container may consist of a limited number of features. While several features described above are combinable, embodiments are possible where some features are not intentionally combined or multiplied. For instance, a baking container may have only one tear strip. In another embodiment, a baking container may have only one fold, ribbon, string, sticker, or pull tab for gripping. In another embodiment, a baking container may be made from only one type of material (such as one type of paper), and/or may have only one sidewall and planar bottom face (i.e. the baking container is not multilayered).

Referring now to the drawings, wherein like reference numerals designate identical or corresponding parts throughout the several views.

FIGS. 1A, 2A, 3A, 4A, and 5A represent side views of baking containers 10 having respective top views of FIGS. 1B, 2B, 3B, 4B, and 5B.

FIGS. 1A and 1B show a baking container 10 having a planar bottom face 12 with a periphery 14, sidewall 16, rim 18, and rupture lines 20 that form a strip 22. Here, the rupture lines 20 extend only from the rim 18 to a first pair of points 24 on the periphery 14. The strip may be configured to be torn from either or both ends.

FIGS. 2A and 2B show a baking container 10 similar to FIGS. 1A and 1B, except that the rupture lines 20 extend from a first pair of points 24 on the periphery 14 to a second pair of points 26 within the periphery 14 of the planar bottom face 12. The strip may be configured to be torn from either or both ends.

FIGS. 3A and 3B show a baking container 10 similar to FIGS. 2A and 2B, except that the rupture lines 20 further extend to a third pair of points 28 located on an opposite side of the periphery from the first pair of points 24. The strip may be configured to be torn from either or both ends.

FIGS. 4A and 4B show a baking container 10 similar to FIGS. 3A and 3B, except that the rupture lines 20 further extend to a fourth pair of points 30 located on an opposite side of the sidewall from the first pair of points 24. The strip may be configured to be torn from either or both ends. In one embodiment, the end of the strip near the third pair of points may form a pinch point from which to be torn, similar to the pinch point 36 shown in FIG. 13.

FIGS. 5A and 5B show a baking container 10 similar to FIGS. 4A and 4B, except that the rupture lines 20 further extend to a fifth pair of points 32 located on an opposite side of the rim from where the rupture lines first extended. The strip may be configured to be torn from either or both ends, and may be designed symmetrically so that each end is indistinguishable.

Figure 6A:
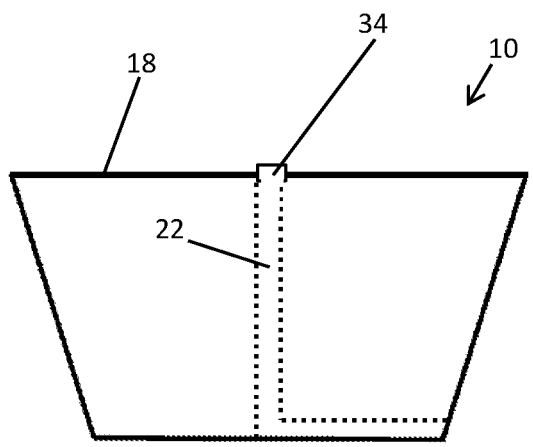
FIG. 6A is a side view of baking container with a pull tab.
Figure 6B:
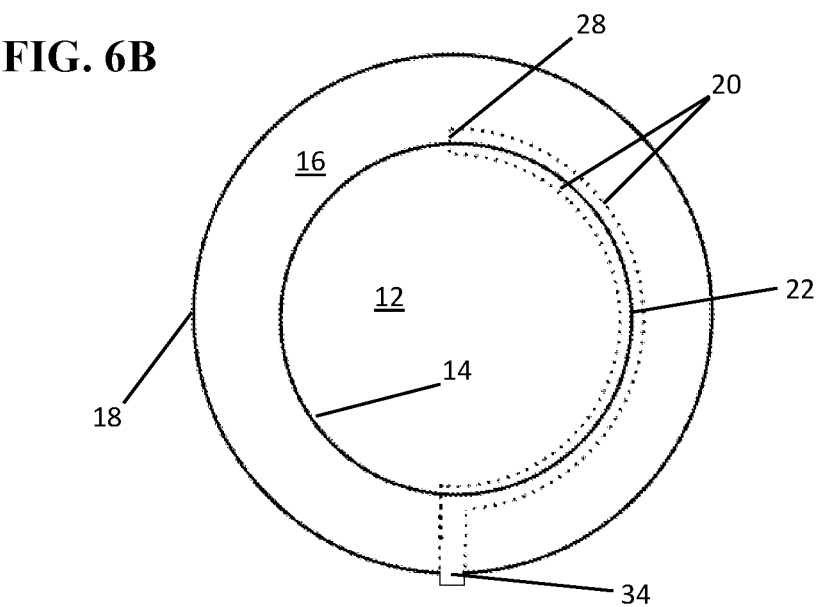
FIG. 6B is an above view of the baking container of FIG. 6A, showing the rupture lines following along a portion of the periphery.
Figure 7A:
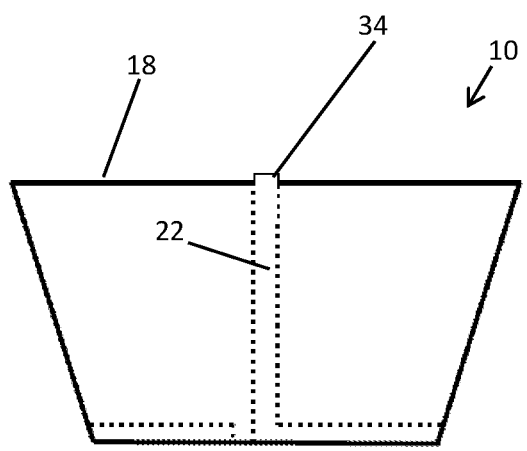
FIG. 7A is a side view of baking container with a pull tab.
Figure 7B:
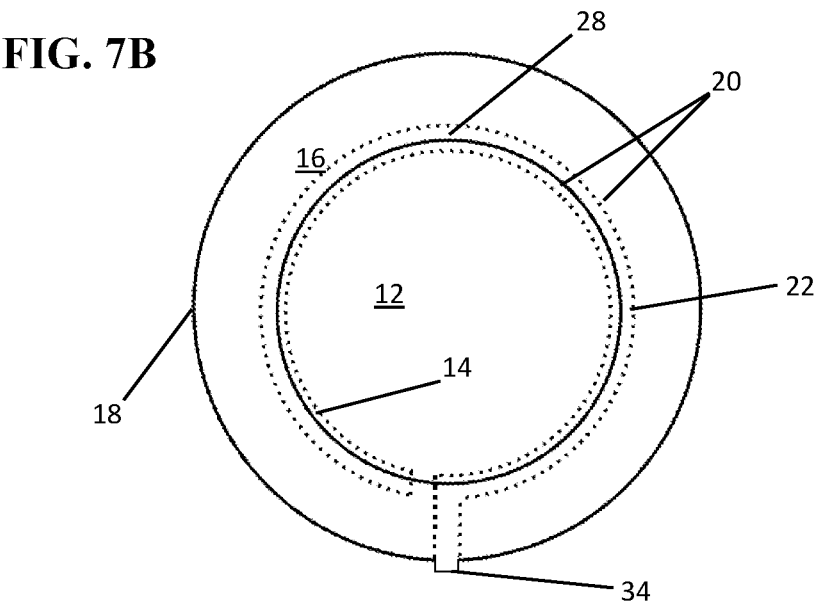
FIG. 7B is an above view of the baking container of FIG. 7A, showing the rupture lines following along a majority of the periphery.
Figure 9:
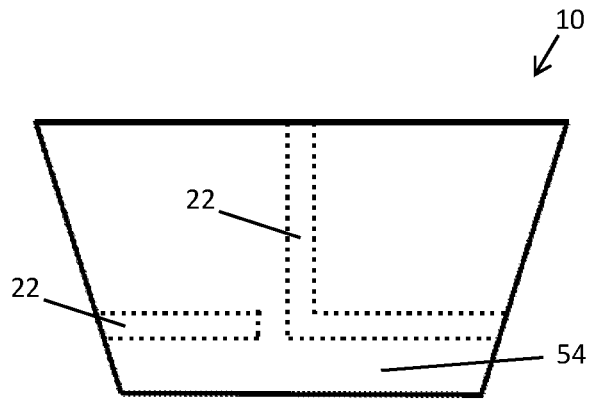
FIG. 9 is a side view of a baking container having a strip in a path similar to FIG. 8A.

FIGS. 6A and 6B show respective side and top views of a baking container 10. This embodiment features a pull tab 34, which extends slightly beyond the rim 18. The strip 22 formed by the rupture lines in this embodiment traverse from the rim to the periphery, and then continues along a part of the periphery. In effect, someone pulling on the pull tab 34 will pull out the strip 22, partly separating the bottom planar face 12 from the sidewall 16. In some embodiments, a strip following the periphery or a circumference of the sidewall may follow a complete circle, a major arc, or a minor arc. FIGS. 7A-B and 9 show embodiments where the strip follows almost a complete circle.

Figure 8B:
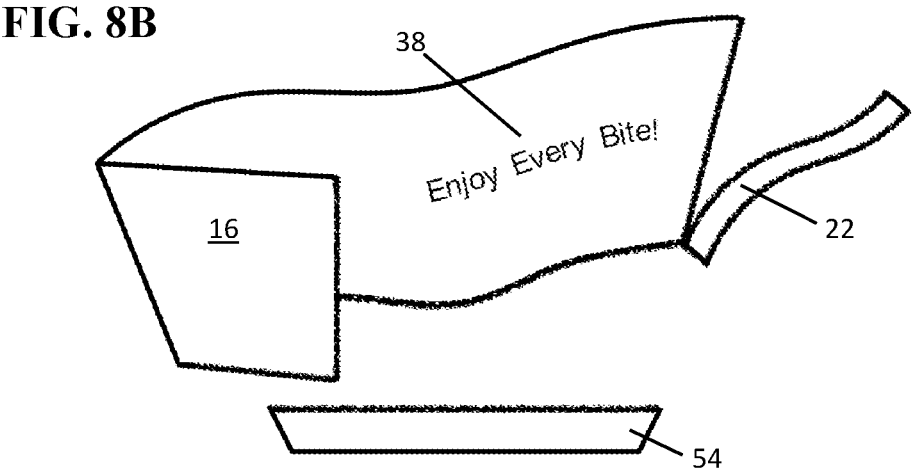
FIG. 8B shows the baking container of FIG. 8A after being opened.

In one embodiment, a strip 22 may intersect with a single rupture line that crosses a complete perimeter of the sidewall. One such example is shown in the baking container 10 of FIG. 8A. Removing the strip and sidewall may leave a bottom portion 54 (FIG. 8B), which may still be attached to a baked good, or used as a plate. FIG. 8B also shows the separated upper portion of the sidewall 16 with a printed label 38 on the inside surface. FIGS. 9 and 55 show related embodiments were the baking container 10 may be configured to tear and leave a bottom portion 54 completely separated from the sidewall. In these embodiments, the bottom portion may have a height of 5-50%, preferably 10-45%, more preferably 15-40% of the total height of the sidewall, though in some embodiments the bottom portion may have a height of less than 5% or greater than 50%. In some embodiments, completely separating the bottom planar face of the baking container may be similar to opening a springform pan.

FIGS. 10 and 11 show different baking containers 10 in which two or more strips 22 are present and cross paths. In FIG. 10, the strips may be configured so that one strip 22 (for instance, the vertical strip), can be completely torn off without pulling out the sides of the orthogonal strip 22 (for instance, the horizontal strip). In another embodiment, both strips 22 may be reinforced together so that all strips 22 are torn out together. In FIG. 11, the strips 22 may be reinforced or connected together so that pulling out one strip 22 pulls out the other two. However, in some embodiments, two or more strips 22 may be parallel, or may be arranged in an off-center or asymmetric pattern. In related embodiments, a baking container may have strips arranged radially in order to enable even cutting or proportioning. For instance, the baking container may be the size of a standard pie tin, and may have three radially-arranged strips to form six central angles of approximately 60° each, or four radially-arranged strips to form eight central angles of about 45° each.

FIG. 12 shows an embodiment of a baking container 10 with a strip 22 having a pull tab 34, where the strip 22 traverses the sidewall 16 to the planar bottom face 12, and then traverses the sidewall at the other end. In this embodiment, the strip is not centered across the planar bottom face 12. As this arrangement completely separates the baking container into two parts, either of the two parts may be left on the foodstuff. In other embodiments, both or neither end of the strip may have pull tabs.

FIG. 13 shows a baking container 10 where the rupture lines and strip follow a path similar to that of FIG. 3B or FIG. 4B. The difference here is that the end of the strip near the planar bottom face 12 forms a pinch point 36, so that the strip may be easily grasped and pulled off from that part of the baking container. In this embodiment, the pinch point 36 is designed to protrude by a fold, a wrinkle, or an extension created by adhering extra material, for example, as a sticker. In one embodiment, the pinch point 36 has an elongated sticker adhered at one end, where lifting and pulling from the other end creates a tear in a specific direction. In another embodiment, the pinch point may not be designed to protrude, but the end of the strip in that location may be easily pinched flat due to its location on the bottom edge of the baking container. In some embodiments, the pinch point 36 may be colored differently than the rest of the baking container so that a consumer may more easily locate it. In other embodiments, the pinch point may have a roughened or treated surface to make it easier to grip, especially if the exterior of the baking container is contacted with oil or grease.

FIG. 14 shows a baking container 10 having a pinch point 36 partway up the sidewall 16. As in FIG. 13, the pinch point may protrude by a fold, wrinkle, or by a material attached directly to the sidewall. FIG. 14 allows the baking container to be torn down and along the bottom, though this structure may also be configured with additional rupture lines to enable an upward tear from the pinch point.

FIG. 15 shows a baking container 10 with a circumferential fold 58 or pinch point. This fold may extend all the way around the baking container, though in some embodiments, folds may be possible along part of the sidewall. FIG. 15 shows the circumferential fold being substantially parallel with the planar bottom face, though in other embodiments, the fold may be at an angle. In some embodiments, a circumferential fold may be decorated as rings of a planet, or shaped like flower petals. FIG. 15 shows a tear strip 22 that starts from the fold, and in some embodiments, multiple tear strips may be present from the circumferential fold. In some embodiments, the circumferential fold may not protrude, but may be folded up or down, along the surface of the sidewall. In some embodiments, the circumferential fold may be thought of as a cuff, and there may be more than one circumferential fold present, similar to a ruffle or the neck of a flexible straw.

Figure 16A:
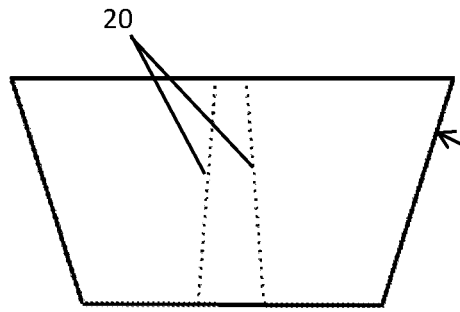
FIG. 16A is a side view of a baking container having rupture lines that start from a bottom fold.
Figure 16B:
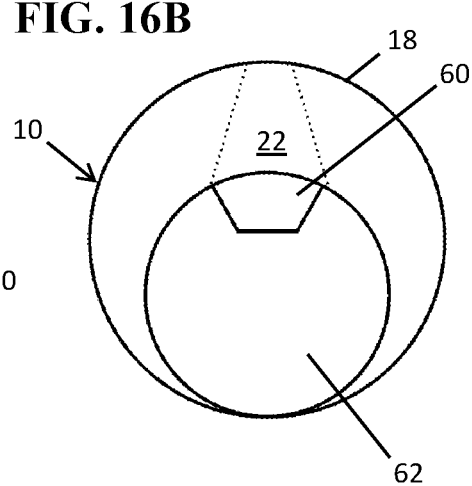
FIG. 16B is a bottom view of the baking container of FIG. 16A, showing the bottom fold.

FIGS. 16A and 16B show a baking container 10 having a bottom folded pull tab 60 at the bottom side 62 of the planar bottom face. Along with the pinch point depicted in FIG. 13, this bottom fold configuration may provide a means of concealing a pull tab connected to a strip 22.

FIG. 17A shows a sagittal view of a baking container 10 having a recessed bottom 64 with a bottom folded pull tab 60. It should be noted that in this embodiment, the bottom folded pull tab 60 does not lie flat against the bottom of the baking container, which enables it to be more easily lifted by a finger. FIG. 17B shows the bottom view of the baking container 10 of FIG. 17A. Here, the bottom folded pull tab 60 may first tear across the bottom of the planar bottom face 62, and then up the sidewall, similar to the path of the strip 22 shown in FIG. 3B.

FIGS. 18-22 show different embodiments of baking containers 10 having a bottom folded pull tab 60 attached to a strip 22. FIGS. 19-22 show baking containers having one strip, though it is equally envisioned that more than one bottom folded pull tab 60 may be present, with each attached to a strip. In particular, every fold at the bottom 62 may be a bottom folded pull tab 60 attached to a strip, as depicted in FIG. 18. Bottom folds on a baking container may have straight edges, or curved edges. In some instances, the bottom folds may be similar in design to flower petals, as in FIGS. 20 and 21, where tearing a strip 22 may mimic picking off a flower petal. In some cases, extra decoration 66 may be added to the bottom side 62 of the planar bottom face to emphasize this effect. For some baking containers, the bottom folds may be intrinsic to the shaping of the sidewall and planar bottom face. For example, a cylindrical or frustoconical baking container may be shaped from a single piece of parchment paper. This shaping may involve folding parts of the sidewall and planar bottom face, and here, one or more folds on the bottom may be made at locations corresponding to rupture lines.

Figure 23:
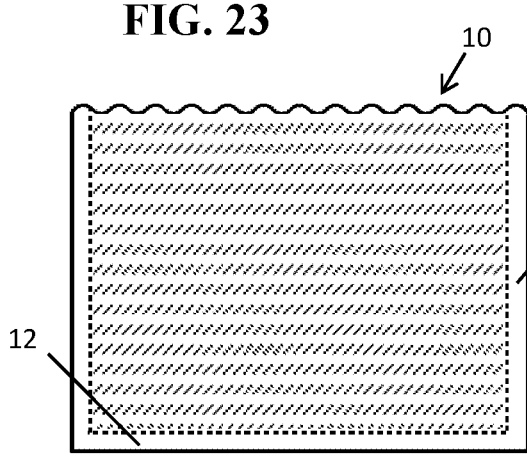
FIG. 23 is a sagittal view of a baking container shaped from a continuous piece of material.
Figure 24:
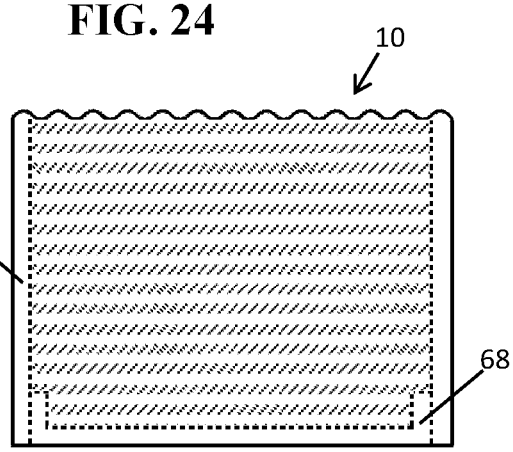
FIG. 24 is a sagittal view of a baking container having an interior, upturned bottom portion.
Figure 25:
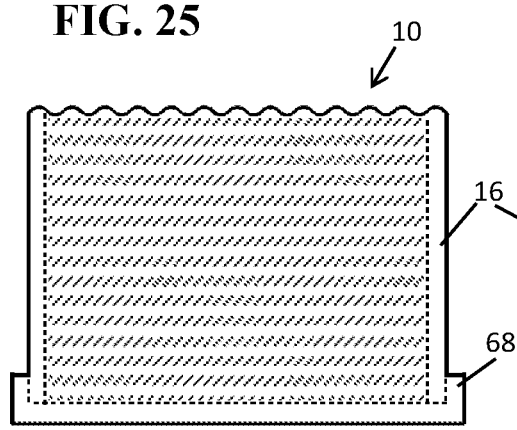
FIG. 25 is a sagittal view of a baking container having an exterior, upturned bottom portion.

FIGS. 23-28 show sagittal views of baking containers 10 having different sidewall constructions. FIG. 23 is a baking container 10 where the sidewall 16 and planar bottom face 12 are formed from one piece of material. FIGS. 24, 25, 27, and 28 show different embodiments were the baking container 10 is formed from two pieces of material that are connected together, for instance, by an adhesive and/or a beaded fold. FIGS. 24 and 25 show U-shaped planar bottom portions 68, which may be enclosed by the sidewall 16, as in FIG. 24, or may be located outside of the sidewall 16, as in FIG. 25.

Figure 26:
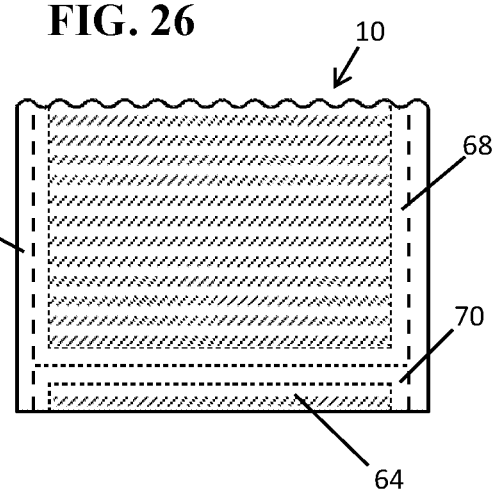
FIG. 26 is a sagittal view of a baking container having a sidewall with an interior upturned bottom portion, and an inverted-U shaped bottom portion.
Figure 27:
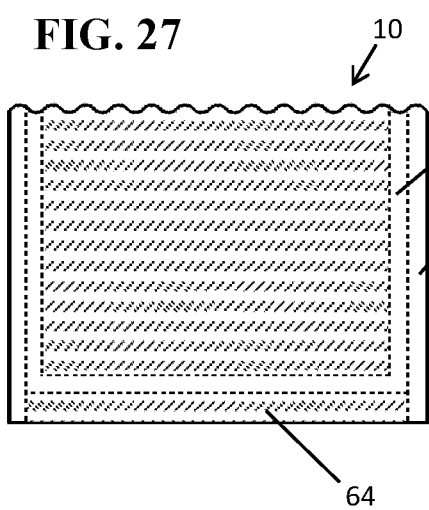
FIG. 27 is a sagittal view of a baking container having a recessed bottom and an interior, upturned portion.
Figure 28:
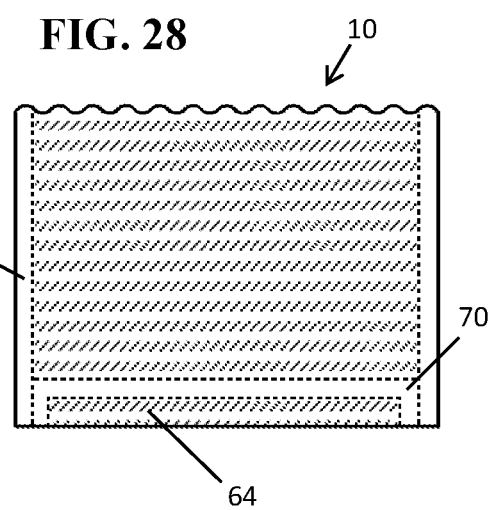
FIG. 28 is a sagittal view of a baking container having a recessed bottom and an inverted-U shaped bottom portion.

FIGS. 26-28 depict baking containers 10 having recessed bottom spaces 64, which are created by positioning the planar bottom face at a height above the bottom edge of the sidewall 16. This construction of the recessed bottom, as well as the construction of the baking containers 10 of FIGS. 24 and 25, may be similar to common paper cups, and the sidewall may be formed by rolling a flat piece of material into a cylinder.

FIG. 26 shows a baking container 10 having a sidewall 16, an inverted U-shaped bottom portion 70, and a U-shaped inner portion 68. It is equally envisioned that a baking container 10 may be fashioned similar FIG. 26, but with only the two U-shaped and inverted U-shaped inner portions (68,70) connected together.

FIG. 27 shows an embodiment of a baking container 10 where the U-shaped planar bottom 68 may have sides extending upwards from its periphery, along the sidewall interior.

FIG. 28 shows another embodiment where the planar bottom portion 70 is in an inverted-U position.

Figure 30:
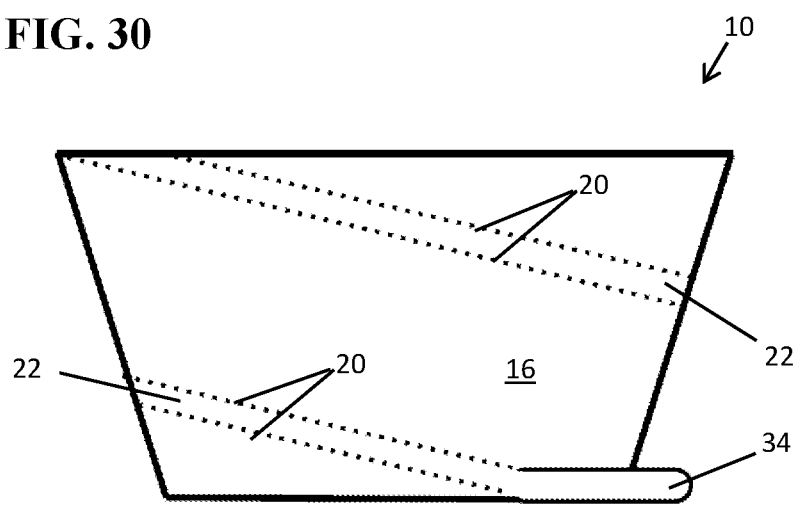
FIG. 30 is a side view of another baking container having a pull tab attached to a strip that winds around the sidewall.

FIG. 29 is a baking container 10 in which the rupture lines 20 and strip 22 traverse the sidewall at an angle, so that they additionally follow the curvature of sidewall. In this embodiment, a continuous piece of the sidewall may be peeled off from the foodstuff. The strip 22 may wrap around less than one time (for instance, covering an arc of 270°-310°), about one time, or more than one time. In related embodiments, the rupture lines 20 or strip 22 may wrap around sidewalls 16 that are planar faces, for instance, of a rectangular baking container. Rupture lines 20 that wrap around a baking container 10 may or may not maintain a fixed spacing from each other. In one embodiment, rupture lines 20 that wrap around a baking container 10 may have changing spacing or form different patterns. In one embodiment, a baking container 10 with wraparound rupture lines 20 may be twisted by a user, for instance, twisting the top relative to the bottom, similar to opening a jar. This twisting motion may break open one or more segments of one or more rupture lines. The baking container 10 may then be removed more easily. In related embodiments, a baking container may have a strip 22 following a zig-zag path, or a path with several angles and/or turns. Such a strip 22 may be able to cover a significant portion of the baking container surface area, and may be more useful for removing the baking container than a straight strip 22. Preferably, a strip having a zig-zag path or several turns and/or angles is reinforced with a string or ribbon. FIG. 30 is a variation of the baking container 10 of FIG. 29, except that the strip 22 is configured to be pulled from a pull tab 34 at the bottom.

FIGS. 31-37 show baking containers 10, with different designs of strips and pull tabs, some of which may be considered decorative or ornamental.

Figure 31:
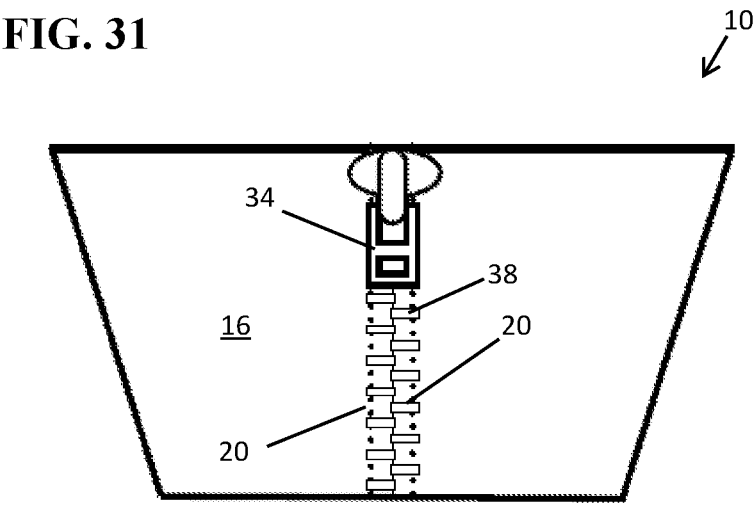
FIG. 31 is a side view of a baking container having a decorative pull tab and strip.

FIG. 31 shows a baking container 10 with a pull tab 34 in the shape of, or having an imprinted image of, a zipper pull tab. Decorative printing 38 may form non-functional zipper teeth.

Figure 32:
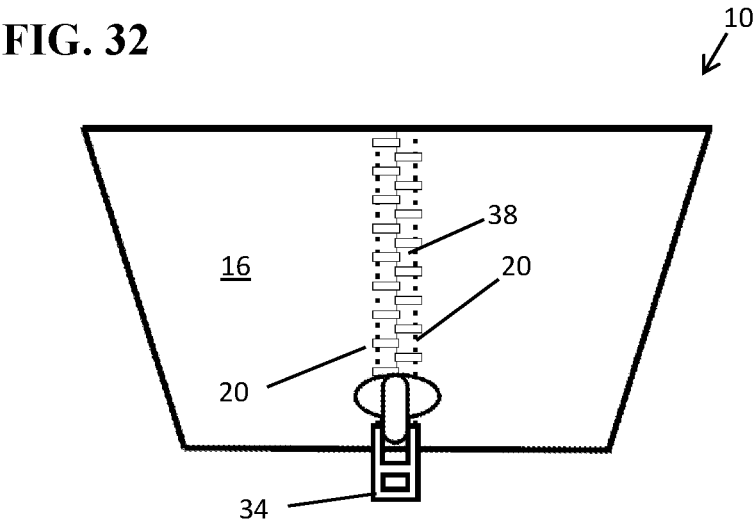
FIG. 32 is a side view of another baking container having a decorative pull tab and strip, which may be opened from a different direction than the baking container of FIG. 31.

FIG. 32 shows a variation of the baking container 10 depicted in FIG. 31, except that the pull tab 34 is configured to be pulled from the bottom.

Figure 33:
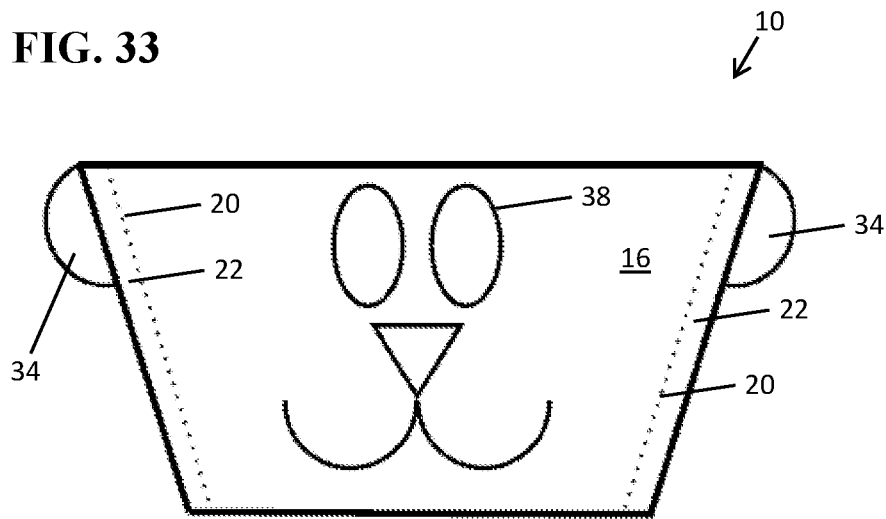
FIG. 33 is a side view of a baking container with a decorative design on the sidewall and two strips, each with decorative pull tabs.

FIG. 33 shows enlarged pull tabs 34 that form a part of decoration with a printed design 38. In this embodiment, either or both pull tabs may be used to open the baking container. Preferably the pull tabs are sized so that young children may easily grasp the pull tab and open the baking container on their own.

Figure 34:
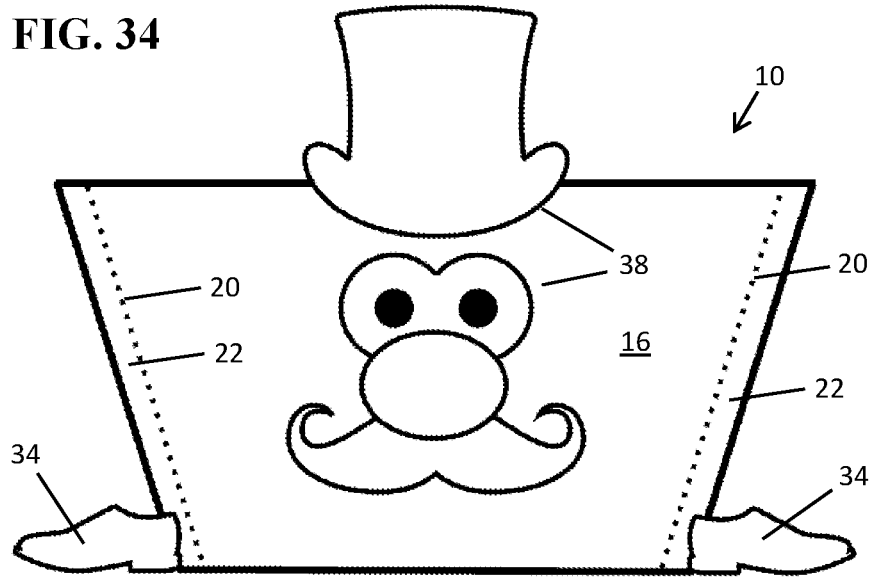
FIG. 34 is a side view of another baking container with a decorative design on the sidewall and two strips, each with decorative pull tabs.

FIG. 34 shows a variation of baking container 10 having decorative elements. Here, one or more stickers may attach to a bottom portion of one or more strips. These stickers may work as decorative and/or enlarged pull tabs 34.

Figure 35:
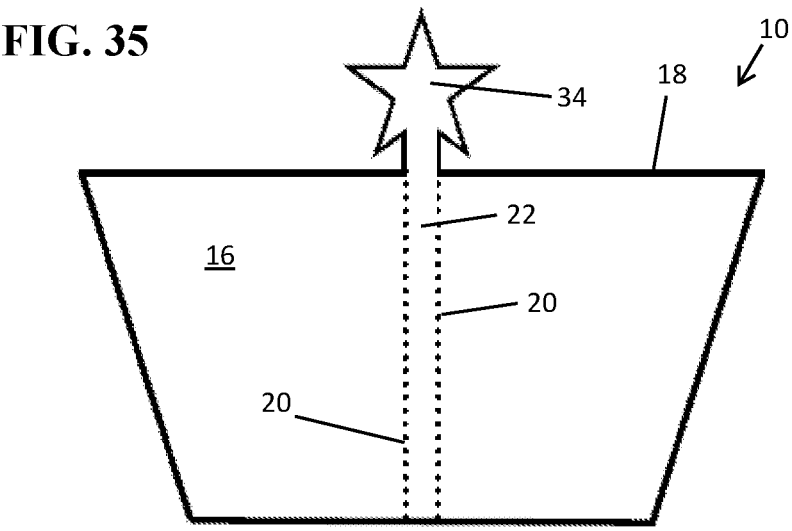
FIG. 35 is a side view of a baking container with a decorative pull tab.

FIG. 35 shows another embodiment of a baking container 10 with an enlarged pull tab 34. It is envisioned that the pull tabs 34 may form any variety of shapes for different occasions. In some embodiments, the pull tabs may be decorated or modified after baking. For instance, a number, message, or a person's name may be written on a pull tab 34. In some embodiments, the pull tabs may not be a flat material, but may be folded or formed into three-dimensional shapes.

Figure 36:
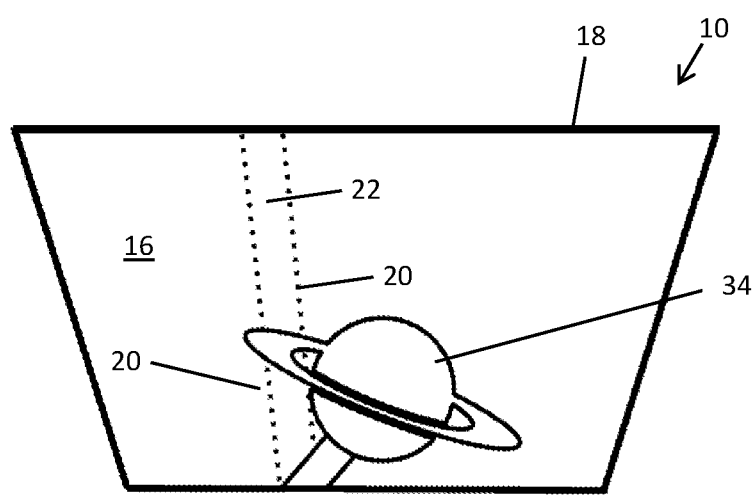
FIG. 36 is a side view of another baking container with a decorative pull tab.

FIG. 36 shows another embodiment of a baking container 10 having an enlarged, decorative pull tab 34. In this case, the pull tab may be more easily pulled from bottom of the baking container.

Figure 37:
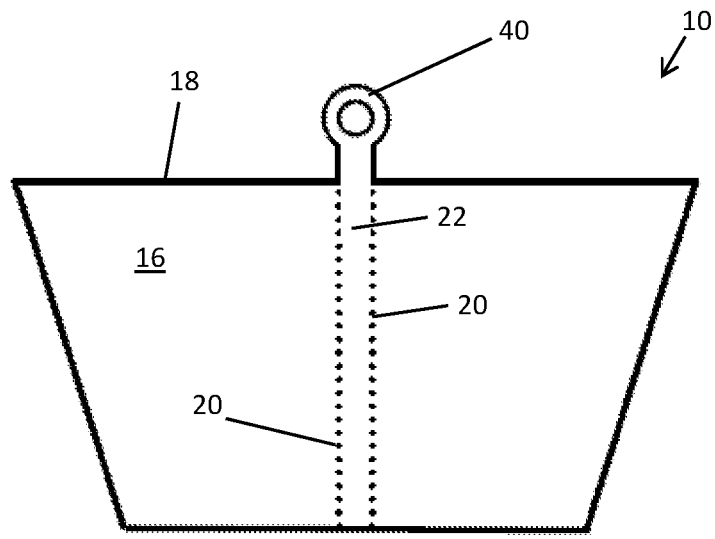
FIG. 37 is a side view of a baking container with a ring attached to the strip.

FIG. 37 shows a pull tab in the form of a ring 40. Other shapes of pull tabs constructed with holes may also be used to provide a grip to the pull tab 34 and ease tearing the strip 22 from the baking container.

Figure 38:
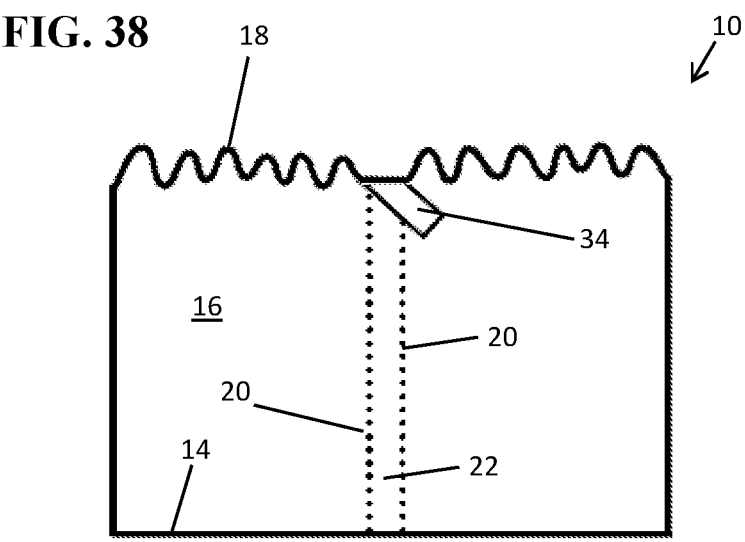
FIG. 38 is a side view of a baking container with a rippled rim and a folded pull tab.

FIG. 38 shows an embodiment of a baking container having straight sides, where the width of the rim 18 is about the same as the width of the periphery. In this embodiment, a pull tab 34 extends from the rim, but is designed to fold downwards or fold flat against the strip 22 or sidewall 16. Additionally, this embodiment shows a rim 18 with ridges or ripples. In a related embodiment, a baking container having an appearance similar to FIG. 38 may not have a pull tab extending from the rim, but extending from the planar bottom face or from the periphery. Additionally, a baking container may have a pull tab folded at any angle relative to the nearest rupture lines 20, for instance, forming a smallest angle in a range of 0°-5°, 5°-10°, 10°-30°, 30°-60°, 60°-90°, 90°-120°, 120°-150°, 150°-170°, 170°-180°. In some embodiments, ridges or ripples in the rim may be created by fluting or crimping the sidewall. In other embodiments, ridges or ripples in the rim may be created by directly cutting those shapes into the baking container. Other baking containers may have rims with other shapes including but not limited to waves, fringes, tears, bumps, grooves, step functions, and saw teeth. In these embodiments, a pull tab, if present, may or may not form a part of the rim pattern.

FIG. 39 shows an embodiment of a baking container 10 having rupture lines 20 that are not parallel. In this particular embodiment, the rupture lines 20 have similar interior angles, but in other embodiments, the rupture lines 20 may have unequal angles, and may be directed towards or away from each other, and may form symmetric or asymmetric shapes of the strip 22. In this embodiment, where the strip 22 increases in width towards the periphery 14, the enlarged strip may enable a person to more quickly remove a large portion of the baking container 10 from the foodstuff, or otherwise open a large part of the baking container 10. In one related embodiment, the strip 22 removed from the baking container 10 may be almost equal in surface area to the surface area of the remaining baking container. In another embodiment, the strip 22 removed from the baking container 10 may have a surface area greater than the remaining baking container 10. In another related embodiment, the strip 22 may continue to enlarge in width as it is removed from the baking container 10. In other related embodiments, the rupture lines 20 may be placed to form strips 22 of different shapes. For instance, the strip 22 may enlarge to form a space to place a logo, or the strip 22 may enlarge to form the outline of a dollar sign ($), with rectangular segments of the strip forming the vertical line in the dollar sign.

In another embodiment, an interior of the strip may be decorated or labeled, and the width of the strip may be sized to allow different decorations or messages. In these embodiments, preferably the message or decoration is not visible from the exterior of the baking container 10. Such interior decorations on the strip may include numbers (for instance, numbers for a lucky draw, a game, or random group assignments), a spirit animal, a fortune, a cartoon character, a religious verse, a math equation, or a custom message. FIG. 8B shows a related embodiment, where an inside portion of the upper sidewall has a label 38. In some embodiments, both the interior of the strip and the inside portion of the sidewall may be decorated or labeled.

Figure 40:
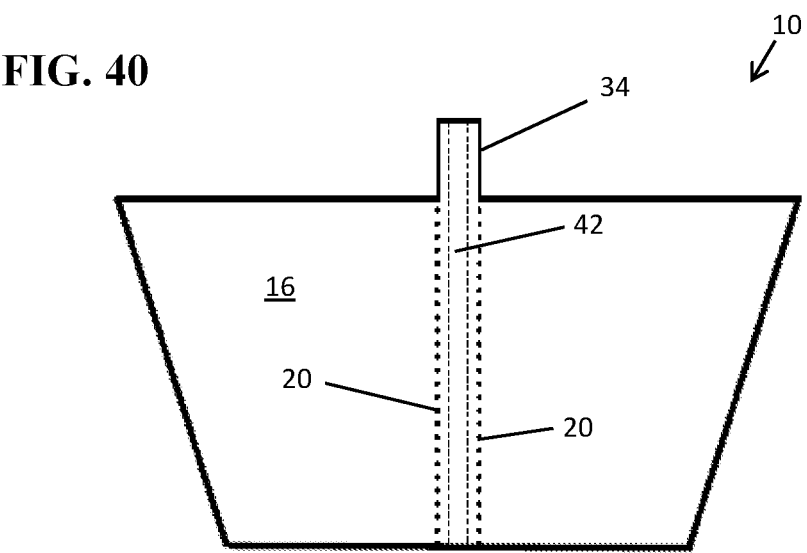
FIG. 40 is a side view of a baking container with a ribbon reinforcing the strip.

FIG. 40 shows an embodiment of a baking container 10 having a reinforcing ribbon 42 which forms the rupture lines 20, with the reinforcing ribbon being located within the sidewall. Here, the reinforcing ribbon 42 adds tensile strength to an otherwise weak sidewall 16 and/or planar bottom face 12 of a baking container 10. In this embodiment, weakened or perforated rupture lines may not be necessary, as the sidewall 16 may tear with a small amount of force. Thus, the sidewall will tear along the sides of the reinforcing ribbon 42.

FIG. 41 shows another baking container 10, this one holding a foodstuff 44. In this embodiment, the rupture lines 20 and strip 22 do not connect with any part of the rim 18. Instead, the rupture lines 20 and pull tab 34 are positioned partway up the sidewall 16. In this and similar embodiments, it is envisioned that the baking container 10 does not require a controlled tear starting or ending at the rim 18. Instead, it is sufficient to use the strip 22 to tear only partway around the baking container 10, at which point an uncontrolled tear may easily complete the remaining path. Alternatively, the strip 22 is only used for a controlled tear partway, and then the consumer is able to tear off or remove the other sides of the baking container by other means. In this embodiment, it is preferred that the strip has a pull tab 34 or a pinch point.

Figure 42:
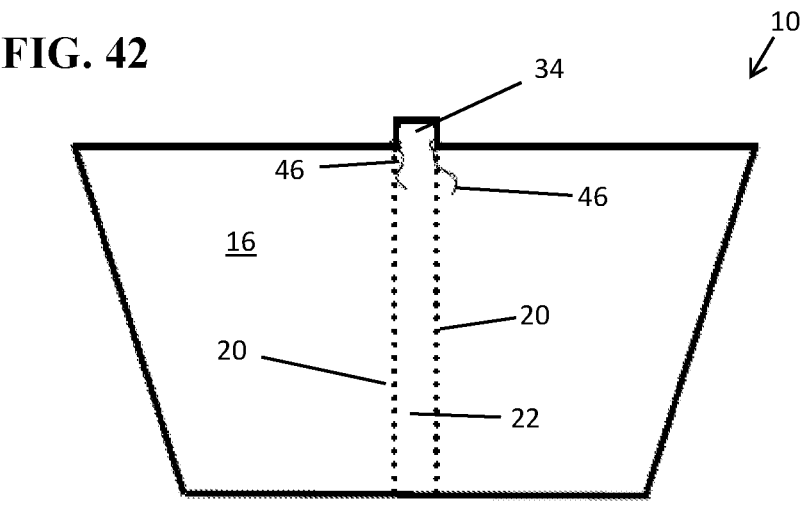
FIG. 42 is a side view of a baking container having a strip reinforced by two strings on each side.

FIG. 42 shows an embodiment of a baking container 10 having rupture lines 20 created by strings 46. In other words, the sides of the strip 22, or the strip itself, is reinforced by the strings 46. Here, the strings are attached within the sidewall 16. In this embodiment, pulling the pull tab 34 indirectly pulls on the strings 46 and tears the strip 22 along the rupture lines 20. However, in other embodiments, the strings 46 themselves may be pulled along the rupture lines 20, and a pull tab 34 may or may not be present. In some embodiments, two rupture lines 20 may not be formed by two strings 46, but a single string that loops over and reverses direction. In this embodiment, the end of a looped string may be pulled directly to tear off the strip 22.

FIG. 43 shows an embodiment of a baking container 10 where a single string 48 reinforces a strip 22 between two rupture lines. In this embodiment, the string may lie against the interior of the sidewall, or may be adhered to the interior of the sidewall, or may be placed within the sidewall. In this embodiment, either the sidewall is weakened along the rupture lines or the strip is reinforced by other material. This rupture line weakening or strip reinforcement is needed to prevent the string from tearing the sidewall directly along its line of contact, and instead induce tears along the rupture lines 20. This embodiment may be similar to FIG. 40, which uses a reinforcing ribbon, but may have the advantage of lower cost or of using less material overall.

FIG. 44 shows an embodiment of a baking container 10 having a single rupture line 20. Here, the rupture line 20 is created by a string 46 having a ring 40. The string may lie against the interior of the sidewall, or may be adhered to the interior of the sidewall, or may be placed within the sidewall. In this embodiment, the rupture line 20 may or may not be weakened. In some embodiments, the sidewall 16 is sufficiently weak that pulling the string against the sidewall will result in a controlled tear just along the path of the string. As with pull tabs discussed in earlier embodiments, the ring 40 may be ornamental, or may be a paper tab attached to the string.

FIG. 45 shows an embodiment of a baking container 10 having a single rupture line 20, and is similar to the embodiment of FIG. 44 with the exception that a ring or other structure is not present on the end of the string. The string may lie against the interior of the sidewall, or may be adhered to the interior of the sidewall, or may be placed within the sidewall. In this embodiment, the rupture line 20 may or may not be weakened. In some embodiments, the sidewall 16 is sufficiently weak that pulling the string against it will result in a controlled tear just along the path of the string. For FIGS. 43, 44, and 45, it is equally envisioned that a string may have a free end near the planar bottom face from which the string may be pulled.

In FIGS. 44 and 45, where a single rupture line is present rather than two rupture lines forming a strip, is envisioned that any of the baking container embodiments discussed herein may have individual strips reduced to single rupture lines, or some portion of individual strips reduced to single rupture lines. These single rupture lines may or may not be created by string.

FIG. 46 shows an embodiment of a baking container 10 having a rectangular periphery 14 and rim 18. Here, the strip 22 wraps from sidewall to opposing sidewall. The strip 22 here is positioned off-center, but in other embodiments, the strip may be centered. This type of baking container 10 may be considered a baking container 10 for loaf cakes. In some embodiments, the strip 22 for such a baking container 10 may traverse at an angle, or more than one strip 22 may be present to sequentially remove portions of the baking container 10, to allow even cutting, or to more easily enable the entire baking container 10 to be removed at once.

Figure 47:
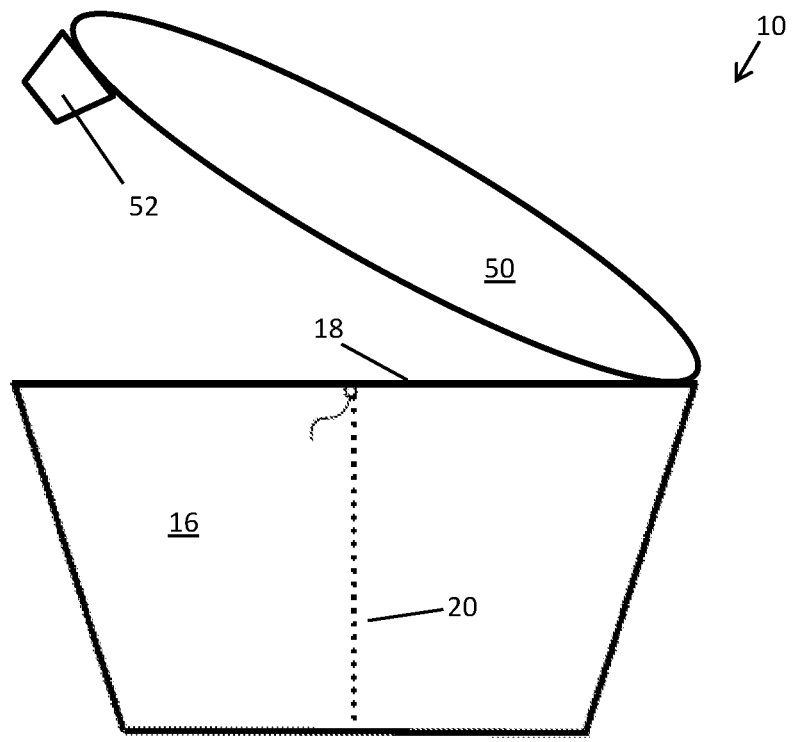
FIG. 47 is a side view of a baking container with a lid.

FIG. 47 shows an embodiment of a baking container 10 having a single rupture line 20 and a lid 50 attached to the rim. Here, the lid is formed as an integral piece of the sidewall 16, though in other embodiments, a lid may be formed separately and attached. The lid may connect by a living hinge, though other arrangements may be used. The end of the lid may have a folded insertion tab 52 to direct closing of the lid or to lock or fasten the lid in a closed position. The insertion tab may insert into a slit or other structure of the sidewall 16, and in some embodiments, this slit or other structure may form part of a strip or rupture lines for tearing and opening the baking container 10. For instance, the insertion tab may lock the lid closed, and then serve the purpose as a pull tab for tearing and opening the baking container 10.

FIGS. 48-51B show different embodiments of baking containers 10 having inner and outer sidewall layers. FIG. 48 shows a baking container 10 having a foodstuff 44. The inner sidewall layer 72 is smooth and protrudes above the outer sidewall layer 74, which may be fluted. The outer sidewall forms a loop 78 that protrudes out from the inner sidewall layer, and the loop is integral with rupture lines 20.

FIG. 49 shows a baking container 10 having a fluted inner sidewall layer 72 and a smooth outer sidewall layer 74. The outer sidewall layer has a circumferential fold 58, similar to FIG. 15, from which the outer sidewall layer may be torn along rupture lines 20.

FIG. 50 shows a baking container 10 in which the inner sidewall layer 72 and the outer sidewall layer 74 are colored differently. The outer sidewall layer 74 has die cut shapes 76 through which the inner sidewall layer is visible. In some embodiments, die cut shapes may form a path or part of a path for tearing open or removing a baking container. However, in other embodiments, the die cut shapes may not intersect the path of tearing, and a printed shape such as the decoration 38 in FIG. 50 may be used to continue a pattern.

Figure 51A:
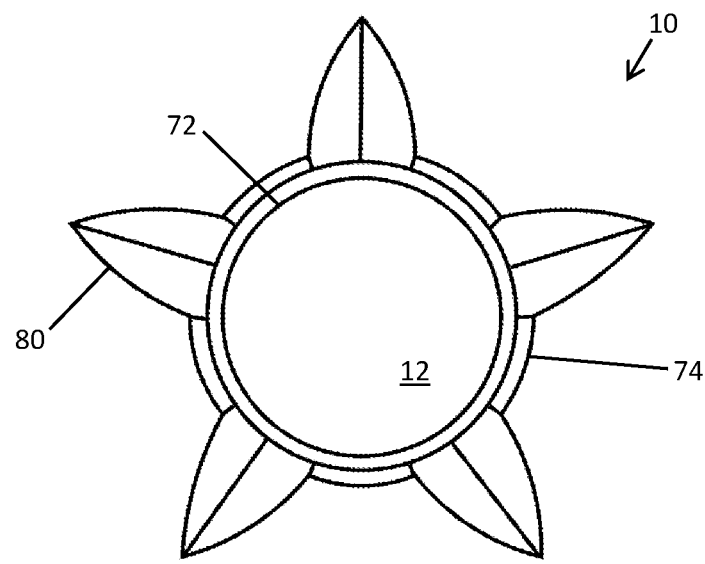
FIG. 51A is a top view of a baking container having inner and outer sidewall layers, where parts of the outer sidewall layer fold outward.
Figure 51B:
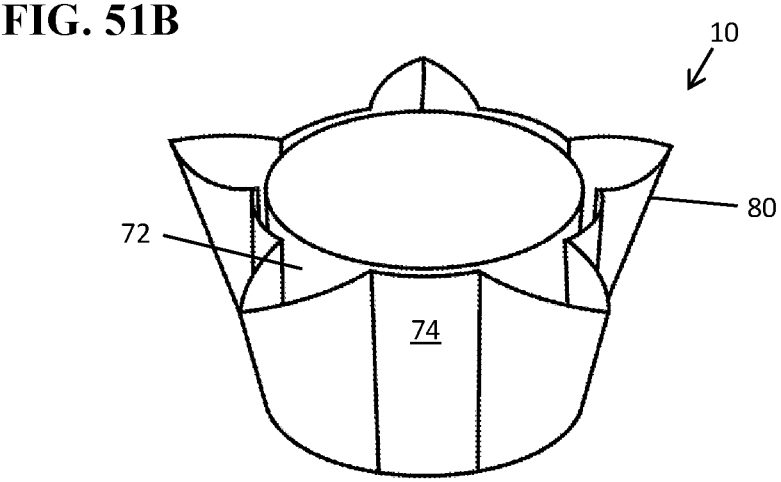
FIG. 51B is a perspective view of FIG. 51A.

FIG. 51A shows a top view of a baking container 10 having a starfish-shaped outer sidewall layer 74 and a cylindrical inner sidewall layer 72. FIG. 51B shows a corresponding perspective view. Here, the outer sidewall layer has protruding folds 80, which may be grasped and pulled for removing or opening the baking container 10. In some embodiments, the inner and/or outer sidewall layers may comprise rupture lines. In similar embodiments, the outer sidewall layer may have one protrusion or any number or arrangement of protrusions from an inner sidewall layer. In some embodiments, the protrusions may be rotationally symmetric, and may form shapes such as propellers, sea creatures, or flowers.

Figure 52:
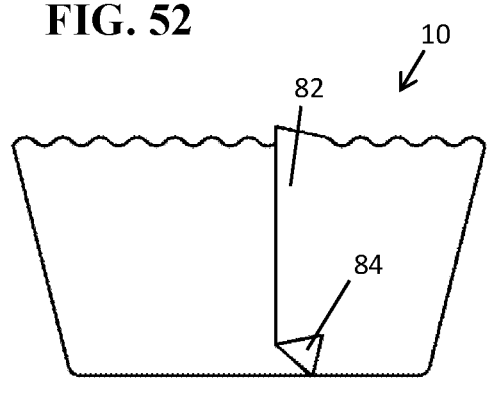
FIG. 52 is a side view of a baking container that may be opened from a seam in the sidewall.
Figure 53:
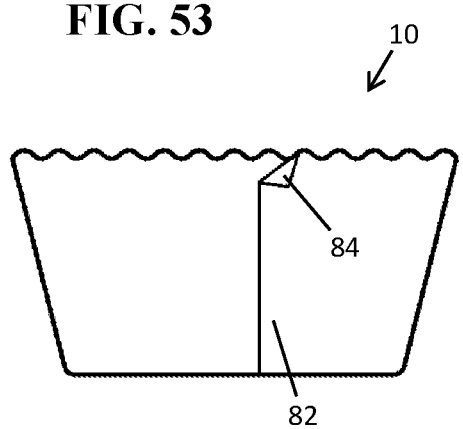
FIG. 53 is a side view of another baking container that may be opened from a seam.

FIGS. 52-57 show embodiments of baking containers 10 having sidewalls held closed at a seam 82. A baking container 10 having a seam may be open, peeled, and torn from a top or bottom corner 84, as shown in FIGS. 52 and 53. In some embodiments, both top and bottom corners 84 may be configured for tearing, or any place along the seam may be peeled open. Such action of opening a baking container from a seam may be similar to turning a page of a book, or similar to peeling off the label of a soup can. In some embodiments, the edge or corner of the seam for peeling may be unadhered, or may have a fold, pull tab, string, or ribbon such as those previously described, to initiate opening the baking container.

While a baking container with a sidewall seam may not need to be configured with perforated rupture lines, or a designated path of tearing, it is preferred. Imagine the difficulty of removing a check from a checkbook or paper towel from its roll without a controlled tear path. FIGS. 54 and 55 each show embodiments where peeling open from a seam may lead to a controlled tear along a designated rupture line, for instance, one formed by perforations. In FIG. 54, tearing upwards from the bottom seam corner will tear the sidewall along a diagonal rupture line 20. In FIG. 55, opening from the seam 82 will lead to tearing along a circumferential rupture line 56, which may leave behind a bottom section 54.

Baking containers having seams may be adhered, though in some embodiments, they may be closed by a tab or clasp at the seam. FIG. 56 shows a baking container 10 being held together by a tab 52 pushed through a slot 88, and FIG. 57 shows a baking container 10 being held together by a symmetric clasp 86. Other structures and fasteners for holding a seam together may be possible. For removing a foodstuff, a consumer may undo a fastener, though in some embodiments, a fastener may be more ornamental than functional, and some other method of removing a foodstuff, such as any of those described previously, may be used.

Figure 59:
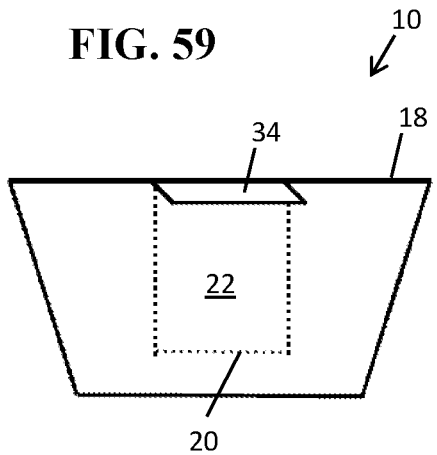
FIG. 59 is a side view of a baking container having a wide tear strip with a rupture line at the bottom of the tear strip.

FIGS. 58-71 show different embodiments of baking containers 10 having pull tabs 34 and notches 90. FIG. 58 shows a rectangular pull tab 34 connected to the end of a wide tear strip 22. The rupture lines 20 are not connected at their ends in the sidewall, and the strip may be pulled down to the ends of the rupture lines only, or may be pulled part way. However, the strip may be pulled further down and around the planar bottom face, past the ends of the rupture lines. FIG. 59 shows an embodiment of a baking container 10 having a rupture line 20 connect the ends of the rupture lines that define a wide tear strip 22. Here, the strip 22 may be torn off with a clean edge, or folded down across the rupture line.

Figure 60:
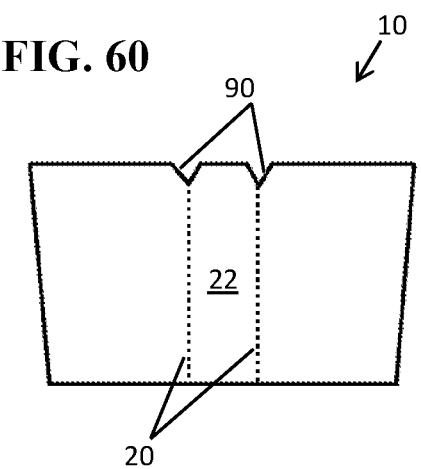
FIG. 60 is a side view of a baking container having a rupture lines starting from notches in the rim.
Figure 62:
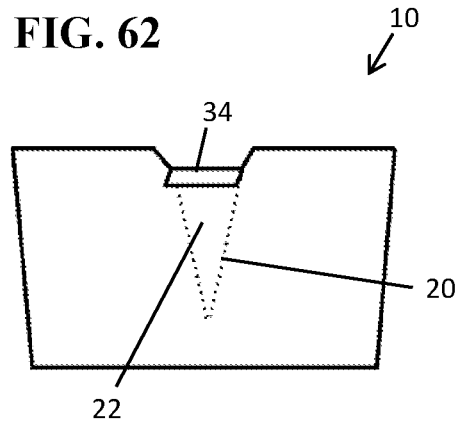
FIG. 62 is a side view of a baking container having an angled tear strip formed from rupture lines that do not intersect the periphery.

FIGS. 60 and 61 each show baking containers 10 that have different arrangement of rupture lines 20 connecting at least the rim and the periphery, and defining the sides of a wide tear strip 22. FIG. 60 shows how notches 90 may define the top of the tear strip, either by denoting the location of the rupture lines or by forming the sides of a pull tab, as in FIG. 61. FIGS. 61 and 62 show paths of rupture lines that are non-parallel with one another, thus forming a strip that has a varying width.

Figure 63:
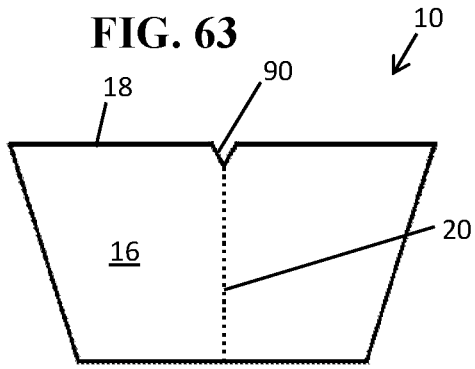
FIG. 63 is a side view of a baking container having a single rupture line connecting to the rim with a notch.

FIG. 63 shows an example of a baking container 10 that has a single rupture line 20 connecting at least from the rim to the periphery, and is denoted by a V-shaped notch 90 in the rim. The notch 90 may help to form a starting tear by weakening the rim at the location of the rupture line, or may form a visual or tactile clue of the rupture line location on the baking container.

FIGS. 64 and 65 show different embodiments of baking containers 10 with different pull tabs and wide tear strips 22. In FIG. 64, the tear strip 22 is defined by notches 90 at the top and a curvy rupture line on the bottom 20. It is equally envisioned that for any baking container, any tear strip on the sidewall may continue to the planar bottom face, and/or may further continue up the sidewall on the opposite side of the baking container. In FIG. 65, the tear strip 22 is defined by a textured and non-rectangular pull tab 92 on the top, and a hinge 96 on the bottom. The tear strip 22 may be torn partway, or all the way to the hinge, or even past the hinge 96.

FIGS. 66 and 67 show embodiments of baking containers with substantially vertical pull tabs and substantially horizontal rupture lines, however, other embodiments may have pull tabs at some angle off the vertical and rupture lines at some angle off the horizontal. In FIG. 66, a textured pull tab 92 connects to a horizontal rupture line 56, which connects to a hinge 96. The sidewall may then be opened like a door. In FIG. 67, a textured pull tab 92 with an extended portion 94 connects to a horizontal and circumferential rupture line 56. Opening the baking container 10 of FIG. 67 along the rupture line leaves a bottom portion 54.

FIGS. 68 and 69 each show baking containers 10 with curved sidewall rupture lines 122. In FIG. 68, the rupture line reaches the rim at both a notch 90 and folded pull tab 34. In FIG. 69, a textured pull tab 92 is located at the bottom of the rupture line 122, so that the baking container 10 may be opened by tearing the rupture line 122 from bottom (i.e. periphery of planar bottom face) to top. In other embodiments, a pull tab may be located on the planar bottom face, rather than the sidewall.

FIG. 70 shows a baking container 10 with a wide tear strip 22 that is defined by two rupture lines 20 connected by a curved rupture line segment. Here, it may also be possible to describe the tear strip as being defined by a single rupture line. Additionally, in this embodiment, the rim 18 has a folded pull tab 34 with a hinge 96, and the pull tab is defined by rectangular notches 90 in the rim.

FIG. 71 shows a baking container 10 having a tear strip 22 defined by rupture lines 20 that connect to notches 90 in the rim 18. The strip furthermore has a bottom pull tab 60 with a hinge 96. The bottom pull tab may be attached by an adhesive.

FIGS. 72A and 72B show views of a baking container 10 having a portion of the sidewall in the form of a shoe tongue 98, which may be tucked and held in place between the sidewall 16 and a foodstuff. This tongue-like portion 98 may be considered similar to a tear strip and may have a pull tab. The bottom of the tongue may be connected to the sidewall interior or to the planar bottom face 12. Here, the bottom of the tongue is connected at a hinge 96, and the tongue 98 is not connected at its sides. In other variations, the tongue may be connected by folded material or by an adhesive. Opening the baking container shown in FIGS. 72A and 72B may be similar to opening those embodiments described for wide tear strips, such as FIGS. 58 and 65.

FIGS. 73A, 74A, 75A, 76A, and 77A represent side views of baking containers 10 having respective top views of FIGS. 73B, 74B, 75B, 76B, and 77B.

FIGS. 73A and 73B show a baking container 10 having a planar bottom face 12 with a periphery 14, sidewall 16, rim 18, and a rupture line 20. Here, the rupture line 20 extends only from the rim 18 to a first point 100 on the periphery 14. The rupture line may be configured to be torn from either or both ends.

FIGS. 74A and 74B show a baking container 10 similar to FIGS. 73A and 73B, except that the rupture line 20 extends from a first point 100 on the periphery 14 to a second point 102 within the periphery 14 of the planar bottom face 12. The rupture line may be configured to be torn from either or both ends.

FIGS. 75A and 75B show a baking container 10 similar to FIGS. 74A and 74B, except that the rupture line 20 further extends to a third point 104 located on an opposite side of the periphery from the first point 100. The rupture line may be configured to be torn from either or both ends.

FIGS. 76A and 76B show a baking container 10 similar to FIGS. 75A and 75B, except that the rupture line 20 further extends to a fourth point 106 located on an opposite side of the sidewall from the first point 100. The rupture line may be configured to be torn from either or both ends.

FIGS. 77A and 77B show a baking container 10 similar to FIGS. 76A and 76B, except that the rupture line 20 further extends to a fifth point 108 located on an opposite side of the rim from where the rupture line first extended. The rupture line may be configured to be torn from either or both ends, and may be designed symmetrically so that each end is indistinguishable. Alternatively, FIGS. 77A and 77B may be considered similar to the baking container 10 of FIGS. 75A and 75B, except that the rupture line further extends from the third point 104 to the fifth point 108.

FIG. 78 shows a baking container 10 similar to FIGS. 77A and 77B, except that the rupture line 110 crossing the planar bottom face 12 does not evenly divide the area of the planar bottom face. The rupture line on the planar bottom face connects two points on the periphery with a straight line, but the straight line is not a diameter.

Figure 80:
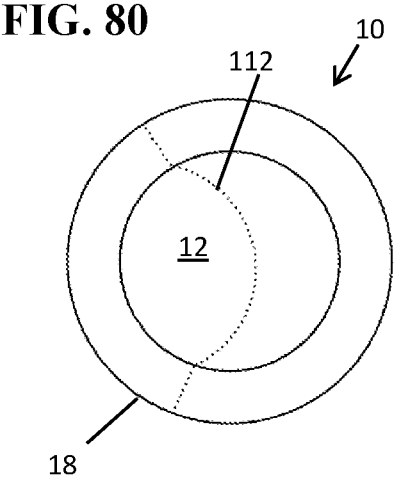
FIG. 80 is a top view of a baking container with an off-center curved rupture line.
Figure 81:
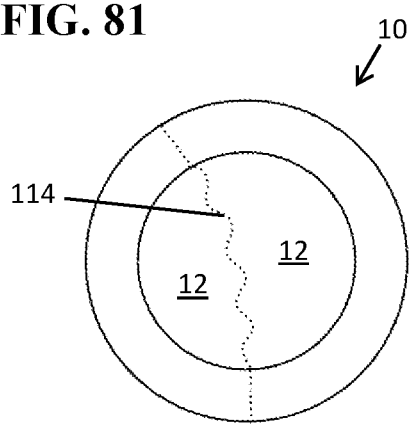
FIG. 81 is a top view of a baking container with a wavy rupture line.
Figure 82:
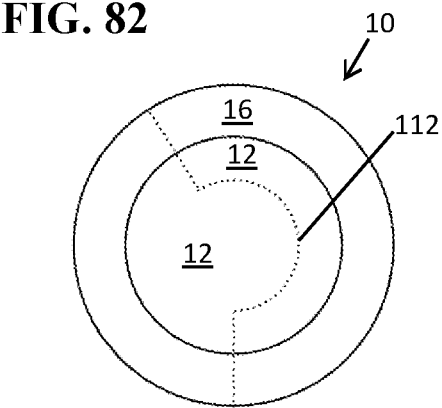
FIG. 82 is a top view of a baking container with a rupture line having straight and curved segments on the planar bottom face.

FIGS. 79-82 show baking containers 10 having a single rupture line that connects from rim 18 to planar bottom face 12 and to opposite rim. FIGS. 79 and 80 more specifically show a curved rupture line 112 similar to an arc or a lune, while FIG. 81 shows a wavy rupture line 114. FIG. 82 has curved rupture lines 112 and straight rupture line segments on the planar bottom face; the curved rupture lines are located on concentric curves.

Figure 83:
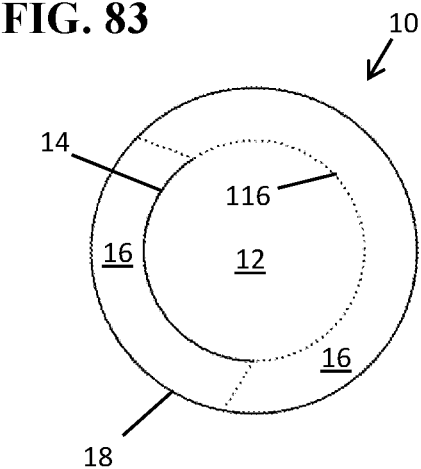
FIG. 83 is a top view of a baking container with a rupture line having a segment coinciding with the periphery.

FIG. 83 shows an embodiment of a baking container 10 with a curved rupture line 116 on the planar bottom face that runs concurrently with a portion of the periphery 14. In some embodiments, a rupture line may run concurrently with the entire periphery, while in other embodiments, a rupture line may only run concurrently with 5-98%, 20-97% or 50-96% of the total length of the periphery. In other embodiments, two or more segments of the periphery may be formed with rupture lines. Additionally, FIG. 83 shows rupture lines connecting the rim to the periphery that do not form substantially perpendicular angles with the rim or the periphery.

Figure 84:
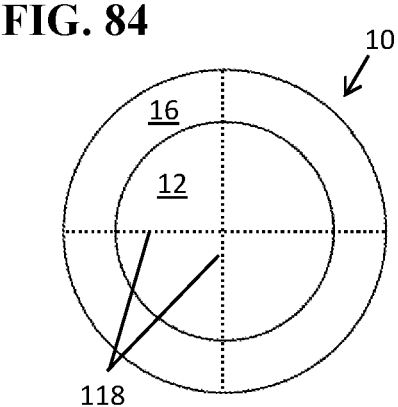
FIG. 84 is a top view of a baking container with intersecting rupture lines.
Figure 85:
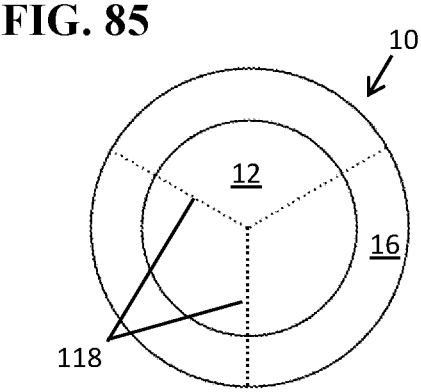
FIG. 85 is a top view of a baking container with intersecting rupture lines.

FIGS. 84 and 85 show baking containers 10 that have rupture lines 118 that intersect on the planar bottom face 12 at the geometric centroid. However, rupture lines that intersect with one another may intersect at any other location on the periphery, sidewall, or planar bottom face.

FIG. 86 shows a baking container 10 with a rupture line 120 that intersects other rupture lines but does not connect to the periphery 14 or the planar bottom face 12.

Figure 87:
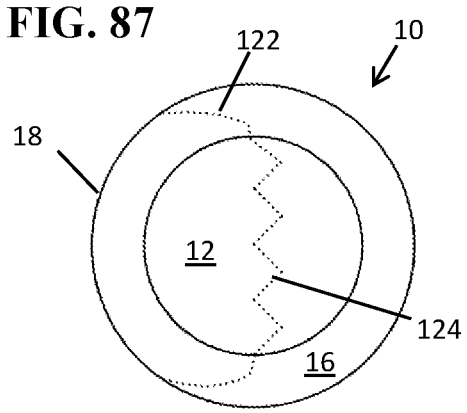
FIG. 87 is a top view of a baking container with curved rupture line segments on the sidewall and a jagged rupture line segment on the planar bottom face.
Figure 88:
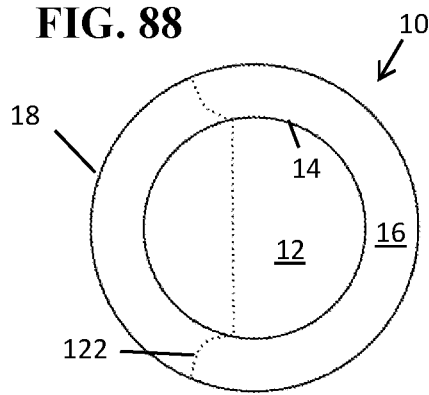
FIG. 88 is a top view of a baking container with curved rupture line segments on the sidewall.
Figure 89:
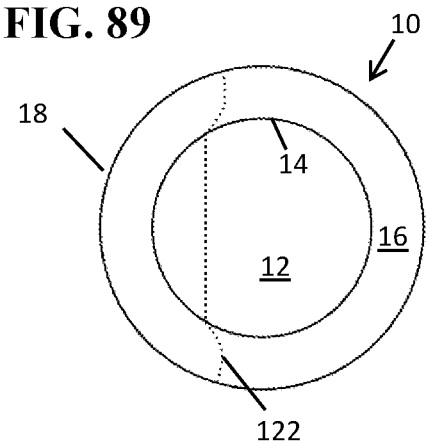
FIG. 89 is a top view of a baking container with curved rupture line segments on the sidewall.

FIGS. 87-89 show embodiments of baking containers 10 that each have some sort of curved sidewall rupture lines 122. FIG. 87 has curved sidewall rupture lines that intersect the rim at a small angle (less than 30°) and intersect the periphery at a substantially perpendicular angle. FIGS. 88 and 89 have curved sidewall rupture lines that intersect the periphery at a small angle and intersect the rim at a substantially perpendicular angle. FIGS. 88 and 89 are differentiated in one aspect by the curved sidewall rupture lines being curved in different directions. While FIGS. 88 and 89 each have a straight rupture line segment on the planar bottom face, 12, FIG. 87 has a jagged, zig-zag rupture line on the planar bottom face. In some embodiments, rupture lines on the sidewall of a baking container may be jagged or zig-zag.

FIG. 90 shows a baking container 10 with a rectangular planar bottom face 12 and an off-centered single rupture line 110 that connects rim-to-rim at notches 90.

Figure 91:
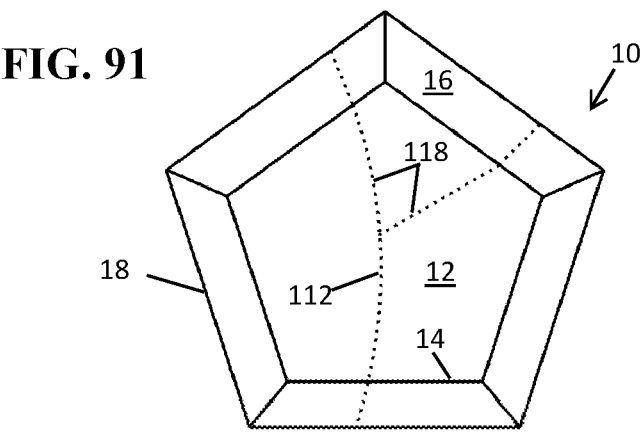
FIG. 91 is a top view of a baking container with a pentagonal planar bottom face having intersecting curved and straight rupture lines.
Figure 92:
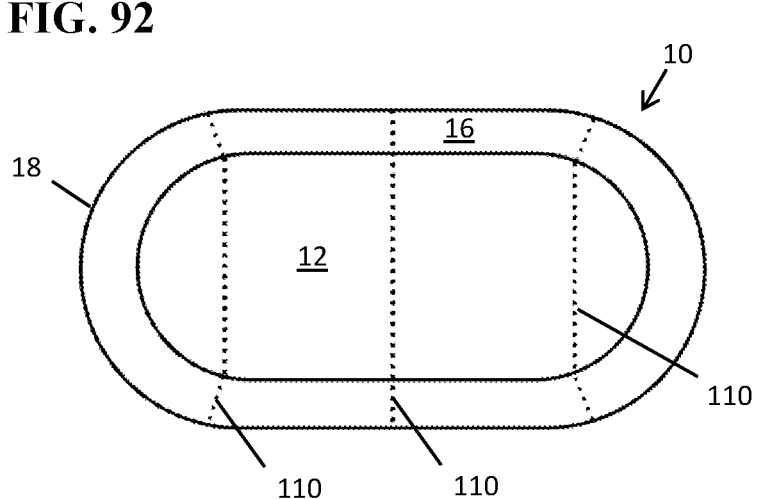
FIG. 92 is a top view of a baking container with an oval shaped planar bottom face and multiple rim-to-rim rupture lines that do not intersect.

FIG. 91 shows a baking container 10 with a pentagonal planar bottom face 12, and a rupture line with a curved segment 112 on the planar bottom face. The curved segment and an additional rupture line are intersecting rupture lines 118.

FIG. 92 shows a baking container 10 with a stadium-shaped planar bottom face 12 and multiple rim-to-rim rupture lines 110 that do not intersect. It is also envisioned that a baking container may have shapes of planar bottom faces that are not convex, and may have sidewalls and rims that are different shapes than the planar bottom face. For instance, a baking container with a rectangular periphery may have a circular or rounded rim. A baking container with an angular rim may have a circular planar bottom face. A sidewall may additionally have protrusions, depressions, and/or pleats.

Figure 93:
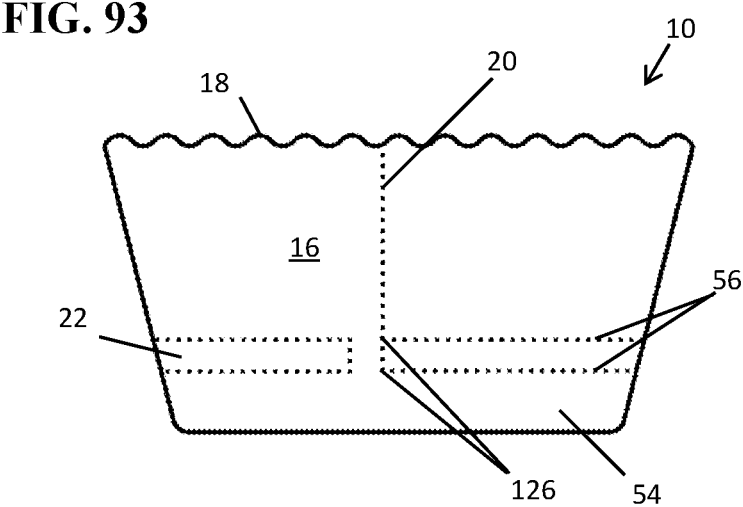
FIG. 93 is a side view of a baking container having a single rupture line from the rim which leads to a horizontal tear strip.

FIG. 93 shows a baking container 10 having a single rupture line 20 from the rim 18 to a first pair of points 126 on the sidewall 16. Horizontal and circumferential rupture lines 56 from the first pair of points form a horizontal strip 22. Opening a baking container in this embodiment may leave a bottom portion 54.

The following are exemplary Embodiments of the present disclosure:

Embodiment 1: A baking container, comprising:
a planar bottom face, having a periphery;
a sidewall extending from the periphery to a rim; and
a rupture line extending from the rim to a first point on the periphery, and extending from the first point on the periphery to a second point on the planar bottom face located within the periphery,
wherein the rupture line is configured to be torn to open the sidewall to ease removal from and/or consumption of a baked foodstuff contained therein.

Embodiment 2: The baking container of Embodiment 1, wherein the rupture line further extends to a third point located on an opposite side of the periphery from the first point.

Embodiment 3: The baking container of Embodiment 1 or 2, wherein the rupture line is not centered across the planar bottom face.

Embodiment 4: The baking container of any one of Embodiments 1 to 3, wherein the rupture line is centered across the planar bottom face.

Embodiment 5: The baking container of any one of Embodiments 1 to 4, wherein the rupture line further extends from the third point to a fourth point located on an opposite side of the sidewall from the first point.

Embodiment 6: The baking container of any one of Embodiments 1 to 5, wherein the rupture line further extends from the third point to a fifth point located on the rim.

Embodiment 7: The baking container of any one of Embodiments 1 to 6, wherein the baking container is configured to be completely separated into two parts.

Embodiment 8: The baking container of any one of Embodiments 1 to 7, wherein one part of the baking container is configured to remain in contact with the foodstuff when the baking container is completely separated into two parts.

Embodiment 9: The baking container of any one of Embodiments 1 to 8, wherein the rupture line follows a shortest path from the rim to the periphery, forming a substantially perpendicular angle with the periphery.

Embodiment 10: The baking container of any one of Embodiments 1 to 8, wherein the rupture line does not follow a shortest path from the rim to the periphery, and does not form a substantially perpendicular angle with the periphery.

Embodiment 11: The baking container of any one of Embodiments 1 to 8, or 10, wherein the rupture line intersects the periphery forming a smallest angle of 20°-70°.

Embodiment 12: The baking container of any one of Embodiments 1 to 11, wherein a part of the sidewall or planar bottom face that does not form the rupture line resists a maximum force that is 0.2-10 times greater than a maximum force resisted at the rupture line.

Embodiment 13: The baking container of any one of Embodiments 1 to 12, wherein the rupture line is formed by weakening the material of the sidewall, the planar bottom face, or both.

Embodiment 14: The baking container of any one of Embodiments 1 to 13, wherein the rupture line is formed by depressions or scores.

Embodiment 15: The baking container of any one of Embodiments 1 to 14, wherein the rupture line is formed by perforations.

Embodiment 16: The baking container Embodiment 15, wherein the perforations are dots, pinholes, or substantially circular holes.

Embodiment 17: The baking container of Embodiment 16, wherein the dots, pinholes, or holes have an inner diameter of 0.05-1.00 mm.

Embodiment 18: The baking container of any one of Embodiments 15 to 17, wherein the perforations on the sidewall, the planar bottom face, or both are spaced by 0.5-1.5 mm.

Embodiment 19: The baking container of Embodiment 15 or 18, wherein the perforations comprise elongated slits having widths of 0.05-1.00 mm and aspect ratios of 1.5:1-5:1.

Embodiment 20: The baking container of Embodiment 19, wherein the elongated slits have an elongated axis along the rupture line.

Embodiment 21: The baking container of Embodiment 19, wherein the elongated slits have an elongated axis that forms an angle of 20°-60° with a path of the rupture line.

Embodiment 22: The baking container of any one of Embodiments 1 to 21, wherein the rupture line is formed by strengthening an adjacent sidewall, an adjacent planar bottom face, or both.

Embodiment 23: The baking container of Embodiment 22, wherein the adjacent sidewall is strengthened by increasing its thickness.

Embodiment 24: The baking container of any one of Embodiments 1 to 23, wherein the sidewall is fluted, folded, ribbed, corrugated, or pleated.

Embodiment 25: The baking container of any one of Embodiments 1 to 24, wherein the sidewall is smooth.

Embodiment 26: The baking container of any one of Embodiments 1 to 25, further comprising a string, a fold, a sticker, or a ribbon located along the rupture line.

Embodiment 27: The baking container of any one of Embodiments 1 to 26, wherein a fold is present, and the fold is configured to be pinched and pulled to rupture the rupture line.

Embodiment 28: The baking container of Embodiment 26 or 27, wherein the string, fold, sticker, or ribbon has a width or diameter of 0.5-6 mm.

Embodiment 29: The baking container of any one of Embodiments 26 to 28, wherein the string, fold, sticker, or ribbon has a total length of 2-40 cm.

Embodiment 30: The baking container of any one of Embodiments 1 to 29, further comprising a pull tab located at the rupture line.

Embodiment 31: The baking container of any one of Embodiments 1 to 30, wherein the rupture line is located by different coloring or texturing.

Embodiment 32: The baking container of any one of Embodiments 1 to 31, further comprising a seam along the rupture line.

Embodiment 33: The baking container of any one of Embodiments 1 to 32, further comprising a lid attached to a part of the rim.

Embodiment 34: The baking container of any one of Embodiments 1 to 33, wherein the sidewall comprises two layers of material.

Embodiment 35: The baking container of any one of Embodiments 1 to 34, wherein an interior of the sidewall comprises a decoration, an advertisement, a graphic, a picture, a text, or a coloring that is not visible from an exterior of the sidewall.

Embodiment 36: The baking container of any one of Embodiments 1 to 35, further comprising a second rupture line, wherein the rupture line and the second rupture line form a tear strip having a substantially constant width along a length of the tear strip.

Embodiment 37: The baking container of any one of Embodiments 1 to 36, wherein the planar bottom face is substantially circular.

Embodiment 38: The baking container of Embodiment 37, wherein a ratio of a diameter of the rim to a diameter of the periphery is 1:1-2:1.

Embodiment 39: The baking container of any one of Embodiments 1 to 36, wherein the planar bottom face is substantially rectangular with an aspect ratio of 1:1-10:1.

Embodiment 40: A baking container, comprising:
a planar bottom face, having a periphery;
a sidewall extending from the periphery to a rim; and
two rupture lines extending from the rim to a first pair of points on the periphery,
wherein the two rupture lines form a strip configured to be torn along the two rupture lines, and
wherein the strip is configured to be torn to open the sidewall to ease removal from and/or consumption of a foodstuff contained therein.

Embodiment 41: The baking container of Embodiment 40, wherein the two rupture lines extend from the first pair of points to a second pair of points on the planar bottom face, the second pair of points located within the periphery.

Embodiment 42: The baking container of Embodiment 40 or 41, wherein the two rupture lines further extend to a third pair of points located on an opposite side of the periphery from the first pair of points.

Embodiment 43: The baking container of any one of Embodiments 40 to 42, wherein the two rupture lines further extend from the third pair of points to a fourth pair of points located on an opposite side of the sidewall from the first pair of points.

Embodiment 44: The baking container of any one of Embodiments 40 to 43, wherein the two rupture lines further extend from the third pair of points to a fifth pair of points located on the rim.

Embodiment 45: The baking container of any one of Embodiments 40 to 44, wherein the strip is formed of a material having an average thickness that is greater by a factor of 1.05-10.00 than a material elsewhere forming the sidewall and/or the planar bottom face.

Embodiment 46: The baking container of any one of Embodiments 40 to 45, wherein the strip further comprises a pull tab or a fold configured to be pinched and pulled to tear the strip.

Embodiment 47: The baking container of any one of Embodiments 40 to 46, wherein a pull tab or fold is located on a bottom side of the planar bottom face.

Embodiment 48: The baking container of Embodiments 46 or 47, wherein a pull tab is present, and the pull tab has a width greater than a width of the strip.

Embodiment 49: The baking container of any one of Embodiments 46 to 48, wherein a pull tab is present and the pull tab is formed by the strip extending beyond the rim and/or beyond the planar bottom face.

Embodiment 50: The baking container of any one of Embodiments 40 to 49, wherein the strip has a substantially constant width.

Embodiment 51: The baking container of any one of Embodiments 40 to 50, wherein the rupture lines follow a shortest path from the rim to the periphery, forming a substantially perpendicular angle with the periphery.

Embodiment 52: The baking container of any one of Embodiments 40 to 51, wherein the rupture lines do not follow a shortest path from the rim to the periphery, and do not form a substantially perpendicular angle with the periphery.

Embodiment 53: The baking container of any one of Embodiments 40 to 52, wherein the strip is formed of a thicker material than a material elsewhere forming the sidewall and/or the planar bottom face.

Embodiment 54: The baking container of any one of Embodiments 40 to 53, further comprising a pull tab, a string, a fold, a sticker, or a ribbon attached along a portion of the strip.

Embodiment 55: The baking container of any one of Embodiments 40 to 54, wherein the rupture lines are formed by perforations.

Embodiment 56: The baking container of any one of Embodiments 40 to 55, further comprising an outer sidewall layer.

Embodiment 57: The baking container of any one of Embodiments 40 to 56, wherein the strip further comprises one or more folds configured to be pinched and pulled to tear the strip.

Embodiment 58: The baking container of any one of Embodiments 40 to 57, wherein the sidewall is smooth, die cut, fluted, folded, ribbed, corrugated, or pleated.

Embodiment 59: The baking container of any one of Embodiments 40 to 58, further comprising a lid attached to a part of the rim.

Embodiment 60: The baking container of any one of Embodiments 1 to 59, wherein the rupture line connects to the rim at a notch.

Embodiment 61: The baking container of any one of Embodiments 1 to 36, wherein the rupture line on the planar bottom face is curved.

Embodiment 62: The baking container of any one of Embodiments 1 to 36 or 61, wherein the baking container is configured to be completely separated into two parts,
wherein one part of the baking container is configured to remain in contact with the foodstuff when the baking container is completely separated into two parts, and
wherein the part of the baking container configured to remain in contact with the foodstuff has a remaining sidewall area that is 55-80% of a total sidewall area of the baking container.

Embodiment 63: The baking container of any one of Embodiments 1 to 36, 61, or 62, wherein the baking container is configured to be completely separated into two parts,
wherein one part of the baking container is configured to remain in contact with the foodstuff when the baking container is completely separated into two parts, and
wherein the part of the baking container configured to remain in contact with the foodstuff has a remaining planar bottom face area that is 10-40% of a total planar bottom face area of the baking container.

Embodiment 64: A baking container, comprising:
a planar bottom face, having a periphery;
a sidewall extending from the periphery to a rim; and
two rupture lines extending from the rim to a first pair of points on the sidewall and from the first pair of points along a circumference of the sidewall,
wherein the two rupture lines form a strip configured to be torn along the two rupture lines, and
wherein the strip is configured to be torn to open the sidewall to ease removal from and/or consumption of a foodstuff contained therein while leaving a bottom portion of the baking container in contact with the foodstuff.

Embodiment 65: The baking container of Embodiment 64, wherein the bottom portion has a height that is 5-50% of the total height of the sidewall.

Embodiment 66: A baking container, comprising:
a planar bottom face, having a periphery;
a sidewall extending from the periphery to a rim;
a first rupture line extending from the rim to a first pair of points on the sidewall; and
a second rupture line and a third rupture line both extending from the first pair of points along a circumference of the sidewall,
wherein the second and third rupture lines form a strip configured to be torn along the second and third rupture lines, and
wherein the strip is configured to be torn to open the sidewall to ease removal from and/or consumption of a foodstuff contained therein while leaving a bottom portion of the baking container in contact with the foodstuff.

Embodiment 67: The baking container of Embodiment 66, wherein the bottom portion has a height that is 5-50% of the total height of the sidewall.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the term "and/or" includes any and all combinations of one or more of the associated listed items and may be abbreviated as "/".

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As used herein, the word "include," and its variants, are intended to be non-limiting, such that recitation of items in a list is not to the exclusion of other like items that may also be useful in the materials, compositions, devices, and methods of this technology. Similarly, the terms "can," and "may," and their variants are intended to be non-limiting, such that recitation that an embodiment can or may comprise certain elements or features does not exclude other embodiments of the present invention that do not contain those elements or features.

Although the terms "first," "second," and the like may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under," "below," "lower," "over," "upper," "in front of," "behind," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected," "attached," or "coupled" to another feature or element, it can be directly connected, attached or coupled to the other feature or element or intervening features or elements may be present. In contrast, when a feature or element is referred to as being "directly connected," "directly attached," or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description, figures, and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

The invention claimed is:

1. A baking container, comprising:
a planar bottom face, having a periphery;
a sidewall extending from the periphery to a rim; and
a rupture line extending from the rim to a first point on the periphery, extending from the first point on the periphery to a second point on the planar bottom face located within the periphery, and further extending to a third point located on an opposite side of the periphery from the first point,
wherein the rupture line is formed by perforations,
wherein the perforations comprise elongated slits having an elongated axis along the rupture line,
wherein the rupture line is configured to be torn to open the sidewall to ease removal from and/or consumption of a foodstuff contained therein,
wherein the baking container is made of a single layer of baking paper, and
wherein the baking container is configured to be completely separated into two distinct parts via the rupture line.

2. The baking container of claim 1, wherein the rupture line is not centered across the planar bottom face.

3. The baking container of claim 1, wherein the rupture line is curved on the planar bottom face.

4. The baking container of claim 1, wherein the rupture line further extends from the third point to a fourth point located on an opposite side of the sidewall from the first point.

5. The baking container of claim 4, wherein the rupture line further extends from the fourth point to a fifth point located on the rim.

6. The baking container of claim 1, wherein one part of the baking container is configured to remain in contact with the foodstuff when the baking container is completely separated into two parts, and wherein the part of the baking container configured to remain in contact with the foodstuff has a remaining sidewall area that is 55-80% of a total sidewall area of the baking container.

7. The baking container of claim 1, wherein one part of the baking container is configured to remain in contact with the foodstuff when the baking container is completely separated into two parts, and wherein the part of the baking container configured to remain in contact with the foodstuff has a remaining planar bottom face area that is 10-40% of a total planar bottom face area of the baking container.

8. The baking container of claim 1, wherein the rupture line does not follow a shortest path from the rim to the periphery, and does not form a substantially perpendicular angle with the periphery.

9. The baking container of claim 1, wherein the elongated slits have widths of 0.05-1.00 mm and aspect ratios of 1.5:1-5:1.

10. The baking container of claim 1, further comprising a string, a fold, a sticker, or a ribbon located along the rupture line.

11. The baking container of claim 1, further comprising a pull tab located at the rupture line.

12. The baking container of claim 11, wherein the rim is an uppermost rim, and
wherein the pull tab extends above the rim.

13. The baking container of claim 1, further comprising a second rupture line, wherein the rupture line and the second rupture line form a tear strip having a substantially constant width along a length of the tear strip.

14. The baking container of claim 1, wherein the planar bottom face is continuous such that the bottom face does not include an opening.

15. The baking container of claim 1, wherein the rupture line connects the first point and the third point with a straight line.

16. The baking container of claim 1, wherein the rupture line on the planar bottom face is not straight.

17. The baking container of claim 1, wherein the rupture line is centered across the planar bottom face.

18. The baking container of claim 1, wherein the rupture line comprises a straight segment and a curved segment on the planar bottom face.

19. The baking container of claim 1, wherein the rupture line intersects the rim at a notch.

20. The baking container of claim 1, wherein the rim comprises two notches that form a pull tab between them, and
 wherein the rupture line intersects the rim at one of the two notches.

\* \* \* \* \*